United States Patent
Cho et al.

(10) Patent No.: US 11,990,140 B2
(45) Date of Patent: *May 21, 2024

(54) USER AUTHENTICATION METHOD AND APPARATUS

(71) Applicant: SAMSUNG ELECTRONICS CO., LTD., Suwon-si (KR)

(72) Inventors: Keunseok Cho, Suwon-si (KR); Jaeyoung Roh, Suwon-si (KR); Donghan Jang, Suwon-si (KR); Jiwon Hyung, Suwon-si (KR); Jaewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,051

(22) Filed: Aug. 15, 2022

(65) Prior Publication Data
US 2022/0392456 A1 Dec. 8, 2022

Related U.S. Application Data

(63) Continuation of application No. 16/700,264, filed on Dec. 2, 2019, now Pat. No. 11,443,750.

(30) Foreign Application Priority Data

Nov. 30, 2018 (KR) .................. 10-2018-0153017
Mar. 28, 2019 (KR) .................. 10-2019-0036377
Aug. 2, 2019 (KR) .................. 10-2019-0094532

(51) Int. Cl.
*G10L 17/24* (2013.01)
*G06F 21/32* (2013.01)
(Continued)

(52) U.S. Cl.
CPC .............. *G10L 17/24* (2013.01); *G06F 21/32* (2013.01); *G10L 15/02* (2013.01); *G10L 15/04* (2013.01); *G10L 17/06* (2013.01)

(58) Field of Classification Search
CPC ......... G10L 17/24; G10L 15/02; G10L 15/04; G10L 17/06; G10L 15/16; G10L 2015/088; G10L 17/20; G06F 21/32
See application file for complete search history.

(56) References Cited

U.S. PATENT DOCUMENTS 9,570,069 B2  2/2017  Lehman et al.
9,626,970 B2  4/2017  Huang et al.
(Continued)

FOREIGN PATENT DOCUMENTS

EP   3100261 A1    12/2016
JP   2015-055835 A  3/2015
(Continued)

OTHER PUBLICATIONS

Communication dated Oct. 22, 2022 by the European Patent Office in European Patent Application No. 19890618.2.
(Continued)

*Primary Examiner* — Linda Wong
(74) *Attorney, Agent, or Firm* — Sughrue Mion, PLLC

(57) ABSTRACT

A method and apparatus for authenticating a user based on an utterance input includes obtaining an input audio signal based on the utterance input of the user; obtaining, from the input audio signal, at least one audio signal of an utterance section and at least one audio signal of a non-utterance section; generating environment information indicating an environment in which the utterance input is received, based on the at least one audio signal of the non-utterance section; obtaining a result of a comparison between the generated environment information and registration environment
(Continued)

information indicating an environment in which a registration utterance input corresponding to a previously registered registration audio signal corresponding to the user is received; adjusting an authentication criterion for authenticating the user based on the result of the comparison; and authenticating the user based on the adjusted authentication criterion and the input audio signal.

19 Claims, 28 Drawing Sheets

(51) Int. Cl.
*G10L 15/02* (2006.01)
*G10L 15/04* (2013.01)
*G10L 17/06* (2013.01)

(56) References Cited

U.S. PATENT DOCUMENTS

| | | | |
|---|---|---|---|
| 9,672,815 B2 | 6/2017 | Ganapathiraju et al. | |
| 9,703,350 B2 | 7/2017 | Nigam et al. | |
| 9,754,584 B2 | 9/2017 | Parada San Martin et al. | |
| 9,852,729 B2 | 12/2017 | Hoffmeister | |
| 9,972,323 B2 | 5/2018 | Foerster et al. | |
| 10,020,009 B1* | 7/2018 | Burke | H04M 1/72454 |
| 10,032,449 B2 | 7/2018 | Chen et al. | |
| 2005/0036589 A1 | 2/2005 | Bossemeyer, Jr. | |
| 2009/0299744 A1 | 12/2009 | Tachimori | |
| 2011/0276331 A1 | 11/2011 | Yamazaki et al. | |
| 2012/0010887 A1 | 1/2012 | Boregowda et al. | |
| 2016/0035350 A1 | 2/2016 | Jung et al. | |
| 2017/0287490 A1 | 10/2017 | Biswal et al. | |
| 2018/0012604 A1 | 1/2018 | Guevara et al. | |
| 2018/0275951 A1 | 9/2018 | Kagoshima | |
| 2018/0293988 A1 | 10/2018 | Huang et al. | |
| 2019/0019511 A1 | 1/2019 | Kawano et al. | |

FOREIGN PATENT DOCUMENTS

| | | |
|---|---|---|
| KR | 10-1824157 B1 | 2/2018 |
| WO | 2017/130474 A1 | 8/2017 |

OTHER PUBLICATIONS

International Search Report and Written Opinion dated Mar. 9, 2020 issued by the International Searching Authority in counterpart International Application No. PCT/KR2019/016762 (PCT/ISA/220, PCT/ISA/210, and PCT/ISA/237).

Ziwon Hyung et al., "A time delay neural network with multi-head self-attention for end-to-end keyword spotting", (4 pages total).

Burke, Signal-to-Noise (S/N or SNR), Jul. 2016, https://searchnetworking.techtarget.com/definition/signal-to-noise-ration, pp. 1-3 (Year: 2016) (Year:2016).

Communication dated Jan. 9, 2023 by the Indian Patent office in Corresponding Indian patent Application No. 202147027720.

* cited by examiner

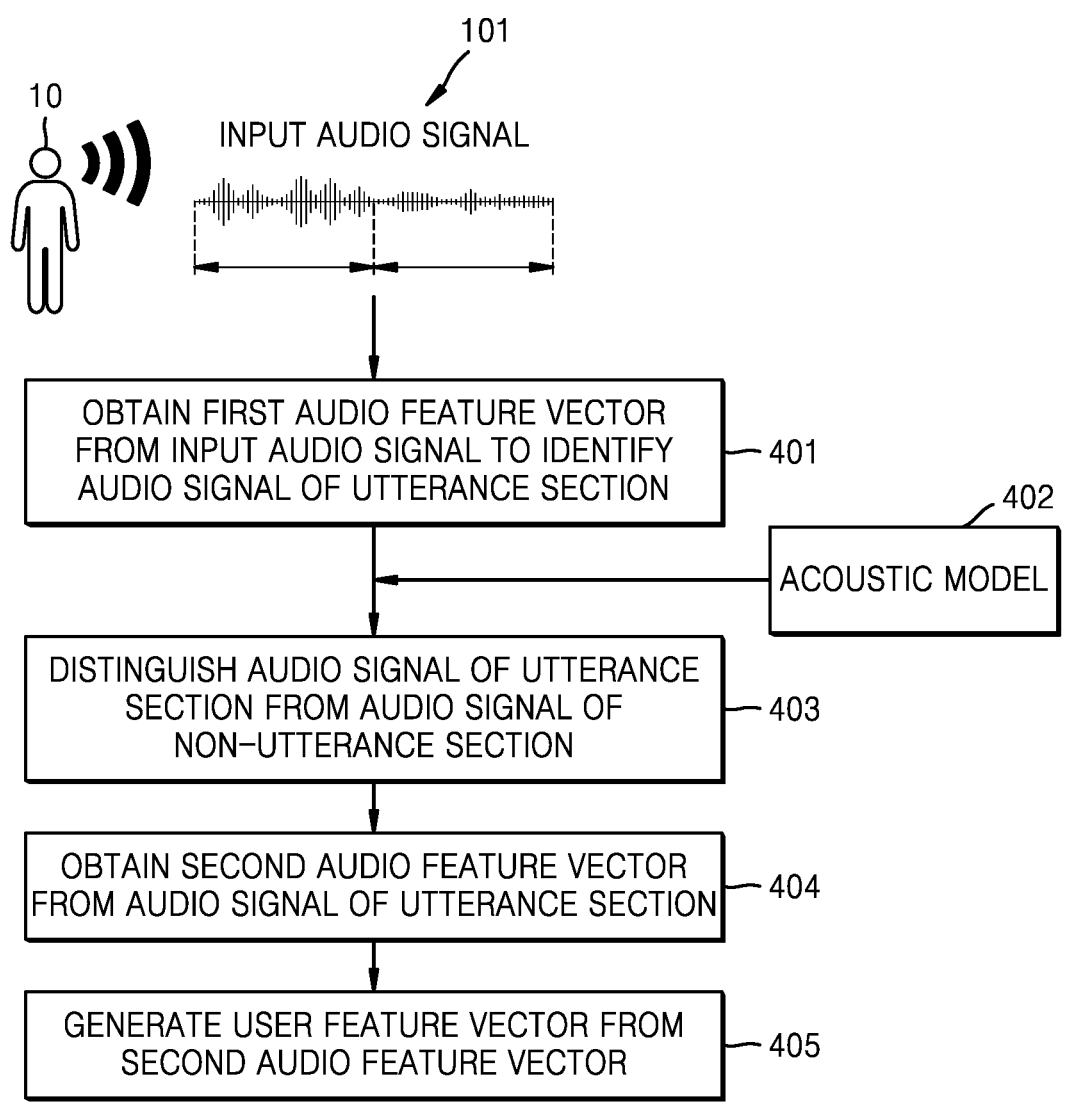

| P2 \ P1 | 5~10 | 10~15 | 15~20 | 20~25 | 25~30 | 30~35 |
|---|---|---|---|---|---|---|
| 0.8~0.9 | 0.044399 | 0.451705 | 0.458639 | 0.479283 | 0.494737 | 0.579344 |
| 0.9~1.0 | 0.542572 | 0.551584 | 0.558125 | 0.570232 | 0.588767 | 0.663911 |
| 1.0~1.1 | 0.607086 | 0.622237 | 0.631457 | 0.643082 | 0.657481 | 0.712343 |
| 1.1~1.2 | 0.668746 | 0.671879 | 0.673734 | 0.686851 | 0.69488 | 0.759335 |
| 1.2~1.3 | 0.713674 | 0.717118 | 0.726211 | 0.741643 | 0.765618 | 0.822646 |
| 1.3~1.4 | 0.777883 | 0.779527 | 0.782089 | 0.790741 | 0.803472 | 0.861621 |
| 1.4~1.5 | 0.803072 | 0.809993 | 0.812509 | 0.817741 | 0.831761 | 0.899217 |
| 1.5~1.6 | 0.854541 | 0.858095 | 0.867721 | 0.870094 | 0.879207 | 0.949844 |

P1 : LENGTH OF REGISTRATION UTTERANCE SECTION [sec]
P2 : LENGTH OF UTTERANCE SECTION [sec]

USER AUTHENTICATION METHOD AND APPARATUS

CROSS-REFERENCE TO RELATED APPLICATIONS

This is a continuation of U.S. application Ser. No. 16/700,264 filed Dec. 2, 2019, which is based on and claims priority under 35 U.S.C. § 119 to Korean Patent Application No. 10-2018-0153017, filed on Nov. 30, 2018, Korean Patent Application No. 10-2019-0036377, filed on Mar. 28, 2019, and Korean Patent Application No. 10-2019-0094532, filed on Aug. 2, 2019, in the Korean Intellectual Property Office, the disclosures of which are incorporated by reference herein in their entireties.

BACKGROUND

1. Field

The disclosure relates to a user authentication method and apparatus.

2. Description of Related Art

Recently, as human computer interaction (HCI) for implementing a user centered interface, the use of electronic devices having a speech recognition function for recognizing speech of a user is increasing.

An electronic device may receive and analyze speech from a previously registered user, and perform user authentication to allow the user to access and control the electronic device. Accordingly, it is important that the speech recognition function accurately recognizes the speech of the user and accurately determines whether the recognized speech of the user corresponds to the previously registered user.

In general, the electronic device performs user registration through speech input from the user, and then compares a speech of the user input during a user authentication process with the registered speech to perform user authentication.

However, the surrounding environment of the electronic device at the time of performing user authentication may be different from the surrounding environment at the time of performing user registration. Therefore, even speech input by the same user may not be recognized due to the influence of an external environment, such as a distance between the electronic device and the user, noise present around the electronic device, etc. As a result, in order to prevent degradation of user authentication performance, it is necessary to consider a change in the external environment of the electronic device.

SUMMARY

Provided are a user authentication method and apparatus for comparing an environment at the time of user registration and an environment at the time of user authentication, and adjusting an authentication criterion used for user authentication, thereby preventing degradation of user authentication performance.

Additional aspects will be set forth in part in the description which follows and, in part, will be apparent from the description, or may be learned by practice of the presented embodiments.

In accordance with an aspect of the disclosure, In accordance with an aspect of the disclosure, a user authentication method of authenticating a user based on an utterance input is performed by an electronic apparatus and includes obtaining an input audio signal based on the utterance input of the user; obtaining, from the input audio signal, at least one audio signal of an utterance section and at least one audio signal of a non-utterance section; generating environment information indicating an environment in which the utterance input is received, based on the at least one audio signal of the non-utterance section; obtaining a result of a comparison between the generated environment information and registration environment information indicating an environment in which a registration utterance input corresponding to a previously registered registration audio signal of the user is received; adjusting an authentication criterion for authenticating the user based on the result of the comparison; and authenticating the user based on the adjusted authentication criterion and the input audio signal.

The obtaining of the at least one audio signal of the utterance section and the at least one audio signal of the non-utterance section may include splitting the input audio signal into a plurality of frames; extracting an audio feature of the plurality of frames; and based on the extracted audio feature, distinguishing frames corresponding to the utterance section from frames corresponding to the non-utterance section among the plurality of frames.

The environment information may be generated based on an audio feature of the frames corresponding to the non-utterance section.

The environment information may include information about a plurality of situations, information indicating the situation in which the audio signal is received, and information about a plurality of vectors corresponding to the plurality of situations.

The authenticating of the user may include obtaining the previously registered registration audio signal; obtaining an audio signal of a registration utterance section from the registration audio signal; and authenticating the user by comparing the at least one audio signal of the utterance section and the audio signal of the registration utterance section.

The registration audio signal may include at least one audio signal of a registration utterance section and at least one audio signal of a registration non-utterance section, and the at least one audio signal of the registration non-utterance section may be used to generate registration environment information indicating a situation in which the utterance input corresponding to the registration audio signal is received.

The adjusting of the authentication criterion may include adjusting a threshold corresponding to a similarity between the at least one audio signal of the utterance section and the at least one audio signal of the registration utterance section.

The adjusting of the threshold may include: selecting the threshold from a preset threshold table based on a length of the utterance section and a length of the registration utterance section; and adjusting the threshold based on a result of a comparison between the environment information and the registration environment information.

The selected threshold may be adjusted based on a similarity between a vector corresponding to the environment information and a vector corresponding to the registration environment information.

The adjusting of the threshold may further include: calculating first average energy value of the at least one audio signal of the utterance section; calculating a second average energy value of the at least one audio signal of the registration utterance; and adjusting the threshold based on a result of a comparison between the first average energy value and the second average energy value.

The threshold may be adjusted based on at least one of a parameter value previously set based on a timbre of a voice of the user or a parameter value previously set based on a characteristic of the electronic apparatus.

In accordance with an aspect of the disclosure, an electronic apparatus includes a microphone; a memory; and at least one processor, wherein the at least one processor is configured to obtain an input audio signal based on an utterance input of a user received through the microphone, distinguish, from the input audio signal, at least one audio signal of an utterance section and at least one audio signal of a non-utterance section, generate environment information indicating an environment in which the utterance input is received, obtain a result of a comparison between the generated environment information and registration environment information indicating an environment in which a registration utterance input corresponding to a previously registered registration audio signal of the user is received, based on a result of the comparison, adjust an authentication criterion for authenticating the user, and authenticate the user based on the adjusted authentication criterion and the input audio signal.

The at least one processor may be further configured to: split the input audio signal into a plurality of frames, extract an audio feature of the plurality of frames, and based on the extracted audio feature, distinguish frames corresponding to the utterance section from frames corresponding to the non-utterance section among the plurality of frames.

The at least one processor may be further configured to generate the environment information based on an audio feature of the frames corresponding to the non-utterance section.

The at least one processor may be further configured to: obtain the previously registered registration audio, obtain an audio signal of a registration utterance section from the registration audio signal, and authenticate the user by comparing the at least one audio signal of the utterance section and the audio signal of the registration utterance section.

The registration audio signal may include at least one audio signal of a registration utterance section and at least one audio signal of a registration non-utterance section, and the at least one audio signal of the registration non-utterance section may be used to generate registration environment information indicating a situation in which the utterance input corresponding to the registration audio signal is received.

The at least one processor may be further configured to adjust a threshold corresponding to a similarity between the at least one audio signal of the utterance section and the at least one audio signal of the registration utterance section.

The at least one processor may be further configured to: select the threshold from a preset threshold table based on a length of the utterance section and a length of the registration utterance section, and adjust the threshold based on a result of a comparison between the environment information and the registration environment information.

The at least one processor may be further configured to adjust the threshold based on a similarity between a vector corresponding to the environment information and a vector corresponding to the registration environment information.

In accordance with an aspect of the disclosure, a non-transitory computer-readable recording medium has recorded thereon a program for executing a user authentication method, the user authentication method including obtaining an input audio signal based on an utterance input of a user; obtaining, from the input audio signal, at least one audio signal of an utterance section and at least one audio signal of a non-utterance section; generating environment information indicating an environment in which the utterance input is received, based on the at least one audio signal of the non-utterance section; obtaining a result of a comparison between the generated environment information and registration environment information indicating an environment in which a registration utterance input corresponding to a previously registered registration audio signal of the user is received; adjusting an authentication criterion for authenticating the user based on the result the comparison; and authenticating the user based on the adjusted authentication criterion and the input audio signal.

In accordance with an aspect of the disclosure, a user authentication method of authenticating a user based on an utterance input, is performed by an electronic apparatus, and includes obtaining an input audio signal based on the utterance input of the user; obtaining, from the input audio signal, an audio signal of an utterance section; identifying a user account from among a plurality of user accounts based on a computed similarity between the audio signal of the utterance section and an audio signal of a registration utterance section corresponding to the user account; and authenticating the user based on the computed similarity being higher than a threshold similarity.

The method may further include obtaining, from the input audio signal, an audio signal of a non-utterance section; generating environment information indicating an environment in which the utterance input is received, based on the audio signal of the non-utterance section; obtaining a result of a comparison between the generated environment information and registration environment information corresponding to the user account; and adjusting the threshold similarity based on based on the result of the comparison.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating a method of obtaining a user feature vector from an input audio signal, according to an embodiment;

FIG. 9 is a diagram illustrating a preset threshold table according to an embodiment;

DETAILED DESCRIPTION

Figure 1:
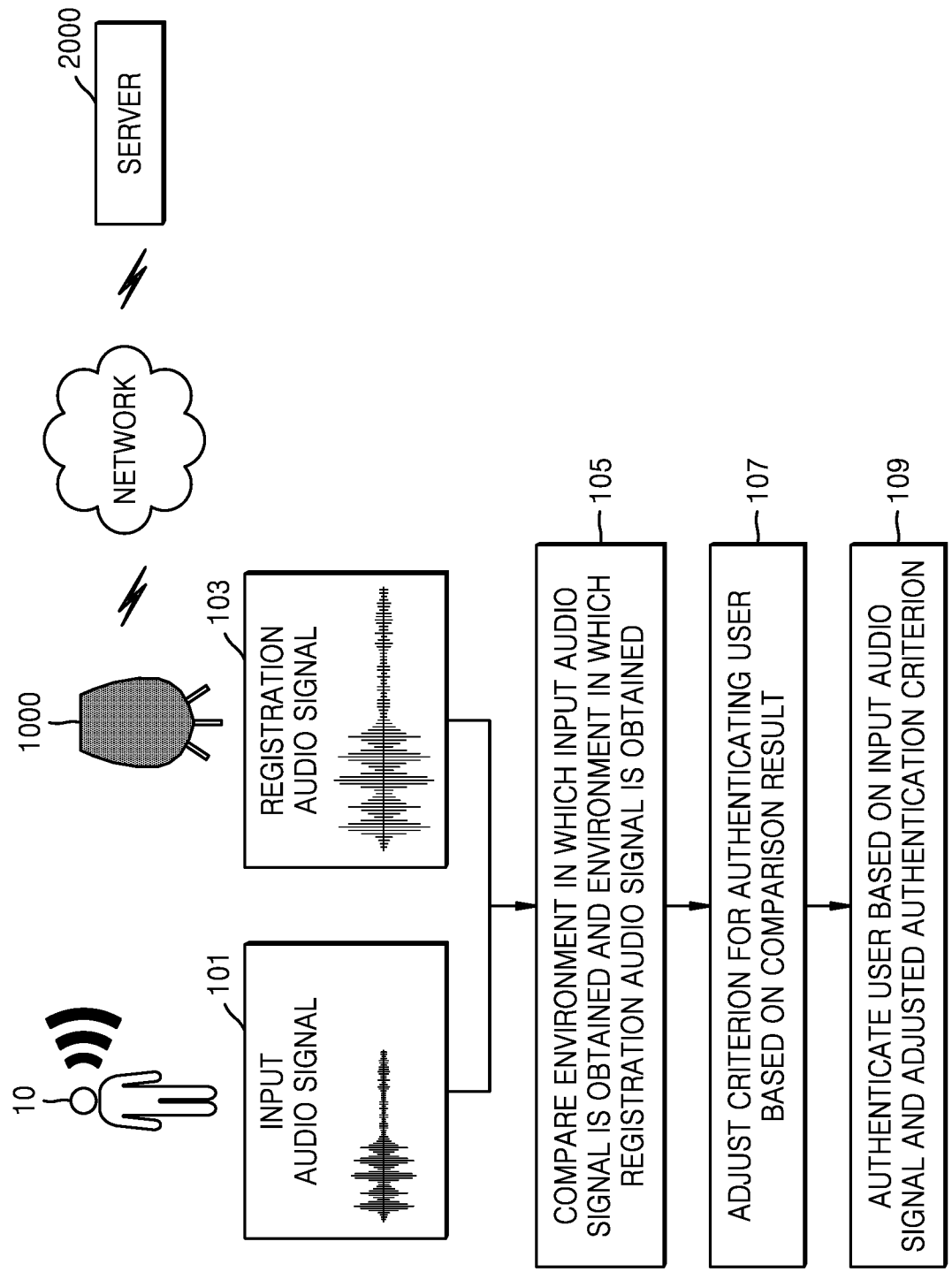
FIG. 1 is a diagram illustrating a method performed by an electronic apparatus of performing authentication based on an utterance input of a user, according to an embodiment.

Hereinafter, embodiments will be described in detail with reference to the accompanying drawings so that those of ordinary skill in the art can easily carry out the disclosure. However, the disclosure may be embodied in many different forms and is not limited to the embodiments described herein. In order to clearly describe the disclosure, portions that are not relevant to the description of the disclosure are omitted, and like reference numerals in the drawings denote like elements.

Throughout the disclosure, the expression "at least one of a, b or c" indicates only a, only b, only c, both a and b, both a and c, both b and c, all of a, b, and c, or variations thereof.

It will be understood that when region is referred to as being "connected to" another region, the region may be directly connected to the other region or electrically connected thereto with an intervening region therebetween. It will be further understood that the terms "comprises" and/or "comprising" used herein specify the presence of stated features or components, but do not preclude the presence or addition of one or more other features or components.

Hereinafter, the disclosure will be described in detail with reference to the attached drawings.

FIG. 1 is a diagram conceptually illustrating a method performed by an electronic apparatus 1000 of performing authentication based on an utterance input of a user 10 according to an embodiment.

Referring to FIG. 1, the electronic apparatus 1000 according to an embodiment may obtain an input audio signal 101 based on the utterance input of the user 10. The utterance input is based on sound input through a microphone of the electronic apparatus 1000 when the user speaks, and the sound input through the microphone of the electronic apparatus 1000 when the user speaks may include at least one of, for example, a speech of the user or noise around the electronic apparatus 1000.

For example, the electronic apparatus 1000 may obtain an audio signal by converting the sound input through the microphone of the electronic apparatus 1000 into an electrical waveform signal while the user 10 speaks. In the disclosure, the audio signal may refer to the electrical waveform signal obtained by the electronic apparatus 1000 based on vocalization of the user 10 and sound generated by the surrounding environment of the electronic apparatus 1000 while the user 10 speaks.

The electronic apparatus 1000 may be any apparatus for receiving the audio signal from the user 10, for example, a mobile phone, a smartphone, a smart TV, a smart audio, a smart speaker, an artificial intelligence speaker, a personal computer (PC), a notebook computer, a tablet PC, or a navigation terminal, but is not limited thereto.

The electronic apparatus 1000 may perform user authentication using the input audio signal 101 obtained based on the utterance input of the user 10.

The electronic apparatus 1000 may obtain a registration audio signal 103 based on the utterance input of the user 10 in a user registration operation before the input audio signal 101 is obtained.

For example, as the registration audio signal 103 is obtained, the electronic apparatus 1000 may generate a user database (DB) corresponding to the user 10 that has performed the utterance input corresponding to the registration audio signal 103. The electronic apparatus 1000 may obtain the registration audio signal 103 based on the utterance input of the user 10 and store the obtained registration audio signal 103 in the user DB.

The electronic apparatus 1000 may compare the registration audio signal 103 with the input audio signal 101 to perform user authentication.

The input audio signal 101 and the registration audio signal 103 may be, for example, audio signals obtained by the electronic apparatus 1000 based on an utterance input of the user 10 that uses a specific sentence, which may be for example a specific word or a specific combination of words.

Content of the sentence used to obtain the input audio signal 101 may be the same as content of the sentence used to obtain the registration audio signal 103. For example, when the sentence used to obtain the registration audio signal 103 for user registration is "Hi, Bixby.", the sentence used to obtain the input audio signal 101 for user authentication is also "Hi, Bixby.", which may be the same sentence as the sentence used to obtain the registration audio signal 103.

Meanwhile, the content of the sentence used to obtain the input audio signal 101 may be partially different from the content of the sentence used to obtain the registration audio signal 103. For example, when the sentence used to obtain the registration audio signal 103 for user registration is "Hi, Bixby.", the sentence used to obtain the input audio signal 101 for user authentication may also be "Wake up, Bixby.", which may be a sentence partially different from the sentence used to obtain the registration audio signal 103.

Meanwhile, for another example, the content of the sentence used to obtain the input audio signal 101 may be completely different from the content of the sentence used to obtain the registration audio signal 103. For example, when the sentence used to obtain the registration audio signal 103 for user registration is "Hi, Bixby.", the sentence used to obtain the input audio signal 101 for user authentication may also be "Hello, buddy.", which may be a sentence completely different from the sentence used to obtain the registration audio signal 103.

Meanwhile, for another example, when the sentence used to obtain the registration audio signal 103 for user registration is "Hi, Bixby.", the sentence used to obtain the input audio signal 101 for user authentication may also be "Hello, Bixby, let me know the weather today", which may be the sentence including a wakeup command for activating the speech recognition function of the electronic apparatus 1000 and a command for executing a certain function of the electronic apparatus 1000.

As such, the electronic apparatus 1000 according to an embodiment may perform user authentication based on various audio signals corresponding to not only the same sentence as the sentence used to obtain the registration audio signal 103 but also a sentence having different content from the content of the sentence used to obtain the registration audio signal 103, that is, the sentence for executing the certain function of the electronic apparatus 1000, etc.

To perform user authentication, the electronic apparatus 1000 may extract and use only partial information matching a speech recognition purpose among all information included in the audio signal. The partial information matching the speech recognition purpose may be extracted from the audio signal, for example, through a statistical method.

Information extracted from the audio signal for use in speech recognition may be referred to as an audio feature. The audio feature may be extracted from the audio signal such that, for example, a spectrum distribution over frequency includes a plurality of different components.

The electronic apparatus 1000 may extract an audio feature from each of the input audio signal 101 and the registration audio signal 103 to compare the input audio signal 101 and the registration audio signal 103 with each other.

The electronic apparatus 1000 may remove audio information that is redundant in a process of extracting the audio feature from the audio signal and obtain an audio feature vector as information for increasing consistency between the same audio signals and simultaneously increasing discrimination from other audio signals.

Such an audio feature vector may be extracted from the audio signal through a method of calculating at least one of, for example, a linear predictive coefficient, cepstrum, mel frequency cepstral coefficient (MFCC), or frequency band energy (filter bank Energy), but is not limited thereto.

The input audio signal 101 obtained by the electronic apparatus 1000 may include an audio signal of an utterance section and an audio signal of a non-utterance section. The electronic apparatus 1000 may distinguish any one of the audio signal of the utterance section and the audio signal of the non-utterance section from the input audio signal 101 based on the audio feature vector extracted from the input audio signal 101.

The audio signal of the utterance section refers to an audio signal of a section classified as being generated based on a speech of the user 10 in the entire section of the input audio signal 101 obtained by the electronic apparatus 1000. The audio signal of the utterance section may include the audio signal generated from the speech of the user 10.

The audio signal of the non-utterance section refers to an audio signal of a section classified as being generated by the noise around the electronic apparatus 1000, other than the speech of the user 10, in the entire section of the input audio signal 101 obtained by the electronic apparatus 1000. The audio signal of the non-utterance section may not include the audio signal generated from the speech of the user 10.

Meanwhile, the registration audio signal 103 obtained by the electronic apparatus 1000 may include an audio signal of a registration utterance section and an audio signal of a registration non-utterance section. The electronic apparatus 1000 may distinguish any one of the audio signal of the registration utterance section and the audio signal of the registration non-utterance section from the registration audio signal 103 based on the audio feature vector extracted from the registration audio signal 103.

The audio signal of the registration utterance section refers to an audio signal of a section classified as being generated based on the speech of the user 10 in the entire section of the registration audio signal 103 obtained by the electronic apparatus 1000. The audio signal of the registration utterance section may include the audio signal generated from the speech of the user 10.

The audio signal of the registration non-utterance section refers to an audio signal of a section classified as being generated by the noise around the electronic apparatus 1000, other than the speech of the user 10, in the entire section of the registration audio signal 103 obtained by the electronic apparatus 1000. The audio signal of the registration non-utterance section may not include the audio signal generated from the speech of the user 10.

To perform user authentication by comparing the registration audio signal 103 and the input audio signal 101, the electronic apparatus 1000 may obtain a user feature vector indicating a feature of the user speech from each of the audio signal of the registration utterance section and the audio signal of the utterance section.

The electronic apparatus 1000 may obtain the user feature vector using the audio feature vector obtained from the audio signal. The electronic apparatus 1000 may generate the user feature vector from the audio feature vector, for example, using a deep neural network (DNN) model for obtaining the user feature vector.

The DNN model used to generate the user feature vector may be a model for identifying the feature of the user speech from the audio signal. The DNN model used to generate the user feature vector may be trained through, for example, a process of receiving audio feature vectors with respect to a plurality of users in different environments and outputting a user feature vector with respect to each user.

In the disclosure, a DNN used by the electronic apparatus 1000 to generate the user feature vector may include at least one of, for example, a convolution neural network (CNN), a recurrent neural network (RNN), or a generative adversarial network (GAN), but is not limited thereto, and all kinds of DNNs that may be used to generate the user feature vector may be used.

For example, the electronic apparatus 1000 may obtain a registration user feature vector with respect to the user 10 who has performed an utterance input corresponding to the registration audio signal 103 from the audio signal of the registration utterance section. The electronic apparatus 1000 may store the obtained registration user feature vector in the user DB.

For example, the electronic apparatus 1000 may obtain the plurality of registration audio signals 103 based on utterance inputs of a plurality of users, and generate user DBs with respect to the plurality of users. The electronic apparatus 1000 may obtain the registration user feature vector with respect to each of the plurality of users from the plurality of registration audio signals 103 obtained based on the utterance inputs of the plurality of users. The electronic apparatus 1000 may store the obtained registration user feature vector with respect to each of the plurality of users in each user DB.

When the input audio signal 101 is obtained, the electronic apparatus 1000 may obtain, for example, the user feature vector with respect to the user 10 who has performed the utterance input corresponding to the input audio signal 101 from the audio signal of the utterance section.

When the input audio signal 101 is obtained, the electronic apparatus 1000 may obtain, for example, the registration audio signal 103 from a user DB generated previously in a user registration operation, and obtain the registration user feature vector from the audio signal of the registration utterance section. When the input audio signal 101 is obtained, the electronic apparatus 1000 may, for another example, obtain the registration user feature vector directly from the user DB generated previously in the user registration operation.

When the input audio signal 101 is obtained, the electronic apparatus 1000 may obtain, for example, the registration user feature vector of each user from a plurality of user DBs, and obtain the user feature vector from the audio signal of the utterance section to perform user identification.

The user identification means determining a user among the plurality of users who has the most similar feature of speech to the speech used in the utterance input corresponding to the input audio signal 101. That is, the user identification is merely to determine a user who has the highest similarity of a speech feature among registration users as the user who performed the utterance input even if the input audio signal is obtained by an utterance input of an unregistered user.

For example, the electronic apparatus 1000 may obtain a similarity between the registration user feature vector with respect to each user obtained from the plurality of user DBs and the user feature vector obtained from the audio signal of the utterance section.

The electronic apparatus 1000 may confirm any one user DB including the registration user feature vector having the highest similarity with the user feature vector obtained from the audio signal of the utterance section among the plurality of user DBs, thereby determining any one user among the plurality of users as the user 10 who has performed the utterance input corresponding to the input audio signal 101.

In the disclosure, obtaining the similarity between vectors may be performed using at least one of a dot product method between vectors, a similarity obtaining method based on a log likelihood calculation, or a method of using a trained DNN model for obtaining the similarity between vectors, but is not limited thereto, and all methods that may be used to obtain the similarity between vectors may be used.

When any one of the plurality of users is determined as the user 10 who has performed the utterance input corresponding to the input audio signal 101 in the user identification process, the electronic apparatus 1000 may perform, for example, user authentication based on the registration user feature vector and the user feature vector obtained with respect to the user 10.

User authentication refers to determining whether the user who has performed the utterance input corresponds to a specific user. That is, the user authentication determines whether the user who has performed the utterance input corresponds to the specific user, and may be used to reject an access of the user or command when the user who has performed the utterance input is not the specific user.

The electronic apparatus 1000 may use an authentication criterion for authenticating the user. The authentication criterion used by the electronic apparatus 1000 may be a certain criterion for determining that the user who has performed the utterance input corresponding to the input audio signal 101 corresponds to the specific user.

For example, the electronic apparatus 1000 may obtain a similarity between the registration user feature vector obtained from the audio signal of the registration utterance section and the user feature vector obtained from the audio signal of the utterance section. The electronic apparatus 1000 may perform authentication on the user 10 by comparing the obtained similarity with the criterion for performing user authentication.

The criterion used for user authentication may be, for example, a threshold for the similarity between the registration user feature vector obtained from the audio signal of the registration utterance section and the user feature vector obtained from the audio signal of the utterance section.

The user feature vector may include, for example, information about features of various phonemes vocalized by the user 10. The sentence used to obtain the input audio signal 101 including the sentence having the different content from the content of the sentence used to obtain the registration audio signal 103 may include some of the same phonemes as those included in the sentence used to obtain the registration audio signal 103. Based on some of the same phonemes, the electronic apparatus 1000 may perform user authentication based on the input audio signal 101 corresponding to the same sentence as the sentence used to obtain the registration audio signal 103 as well as a sentence different from the sentence used to obtain the registration audio signal 103.

Meanwhile, an environment in which the user 10 performs the utterance input corresponding to the registration audio signal 103 and an environment in which the user 10 performs the utterance input corresponding to the input audio signal 101 may be different environments. The electronic apparatus 1000 may adjust the criterion used for user authentication to prevent a degradation of user authentication performance due to such an environment difference.

To adjust the criterion used for user authentication, the electronic apparatus 1000 may compare an environment in which the registration audio signal 103 is obtained and an environment in which the input audio signal 101 is obtained at operation 105. That is, when the environment in which the registration audio signal 103 is obtained and the environment in which the input audio signal 101 is obtained are different from each other, the electronic apparatus 1000 may adjust the criterion used for user authentication based on such a comparison result of environments, thereby preventing the degradation of user authentication performance of the electronic apparatus 1000 due to the environment difference.

To compare the environment in which the registration audio signal 103 is obtained and the environment in which the input audio signal 101 is obtained, the electronic apparatus 1000 may obtain environment information indicating an environment in which the utterance input is received, from each of the audio signal of the registration non-utterance section and the audio signal of the non-utterance section.

The environment information may be information indicating an environment at a time when the utterance input of the user is input to the electronic apparatus 1000. The environment information may include, for example, information related to the noise around the electronic apparatus 1000, information about a location of the electronic apparatus 1000 and a distance between the electronic apparatus 1000 and the user, but is not limited thereto.

The noise generated around the electronic apparatus 1000 may be distinguished based on at least one of, for example, whether the noise continues for a certain period of time (e.g., a one-time utterance by other person, a continuous utterance by a conversation between other persons), whether the noise repeats (e.g., a periodic wave sound of the beach, a periodic driving sound in a subway, etc.) or a pitch of a sound included in the noise (e.g., a siren sound having a periodically changing pitch).

The environment information may include, for example, vector information indicating a situation in which the audio signal is obtained. The electronic apparatus 1000 may obtain, for example, an environment feature vector as the environment information indicating the environment in which the utterance input is received, using the audio feature vector obtained from the audio signal. The electronic apparatus 1000 may obtain, for example, the environment feature vector from the audio feature vector, using a DNN model for obtaining the environment feature vector.

The DNN model used to obtain the environment feature vector may be, for example, the same DNN model as the DNN model for obtaining the user feature vector described above. The DNN model used to obtain the environment feature vector may be a model for identifying the feature of the environment in which the utterance input of the user 10 is performed from the audio signal of the non-utterance section. The DNN model used to obtain the environment feature vector may be trained through, for example, a process of receiving audio feature vectors with respect to a plurality of users in different environments and outputting a user feature vector with respect to each user.

For example, the electronic apparatus 1000 may obtain environment information corresponding to the registration audio signal 103 from the audio signal of the registration non-utterance section. For example, the electronic apparatus 1000 may obtain a registration environment feature vector as environment information indicating an environment in which the utterance input corresponding to the registration audio signal 103 is received, from the audio signal of the registration non-utterance section. The electronic apparatus 1000 may store the obtained registration environment feature vector in the user DB corresponding to the user 10.

In an embodiment, the user DB may include, for example, at least one of the registration audio signal 103, a registration user feature vector corresponding to the user 10 who has input the registration audio signal 103, or the registration environment feature vector indicating the environment in which the utterance input corresponding to the registration audio signal 103 is received.

For example, the electronic apparatus 1000 may obtain the plurality of registration audio signals 103 based on the utterance inputs of the plurality of users, and generate the user DBs with respect to the plurality of users. The electronic apparatus 1000 may obtain a registration environment feature vector with respect to each of the plurality of users from the plurality of registration audio signals 103 obtained based on the utterance inputs of the plurality of users. The electronic apparatus 1000 may store the obtained registration environment feature vector with respect to each of the plurality of users in each user DB.

When the input audio signal 101 is obtained, the electronic apparatus 1000 may, for example, obtain environment information corresponding to the input audio signal 101 from the audio signal of the non-utterance section. For example, the electronic apparatus 1000 may obtain an environment feature vector as environment information indicating the environment in which the utterance input corresponding to the input audio signal 101 is received, from the audio signal of the non-utterance section.

When the input audio signal 101 is obtained, the electronic apparatus 1000 may obtain, for example, the registration audio signal 103 from the user DB generated previously in the user registration operation, and obtain the registration environment feature vector from the audio signal of the registration non-utterance section. When the input audio signal 101 is obtained, the electronic apparatus 1000 may, for another example, obtain the registration environment feature vector directly from the user DB generated previously in the user registration operation.

The electronic apparatus 1000 may compare the environment in which the input audio signal 101 is obtained and the environment in which the registration audio signal 103 is obtained, based on the registration environment feature vector obtained from the audio signal of the registration non-utterance section and the environment feature vector obtained from the audio signal of the non-utterance section. The electronic apparatus 1000 may adjust a criterion for authenticating the user 10, based on a comparison result of the environment in which the input audio signal 101 is obtained and the environment in which the registration audio signal 103 is obtained at operation 107.

For example, the electronic apparatus 1000 may obtain a similarity between the registration environment feature vector obtained from the audio signal of the registration non-utterance section and the environment feature vector obtained from the audio signal of the non-utterance section. The electronic apparatus 1000 may adjust the criterion for authenticating the user 10 based on the obtained similarity.

The electronic apparatus 1000 may authenticate the user 10 based on the adjusted authentication criterion and the input audio signal 101 at operation 109.

In an embodiment, the electronic apparatus 1000 may obtain, for example, the similarity between the registration user feature vector obtained from the obtained audio signal of the registration utterance section and the user feature vector obtained from the audio signal of the utterance section. The electronic apparatus 1000 may perform authentication on the user 10 by comparing the obtained similarity with the adjusted authentication criterion.

Meanwhile, in other embodiments, the electronic apparatus 1000 may transmit the input audio signal 101 obtained based on the utterance input of the user 10 to the server 2000 over a network. The server 2000 may perform user authentication using the input audio signal 101 received from the electronic apparatus 1000.

The server 2000 may store, for example, the registration audio signal 103 received through the electronic apparatus 1000 in a memory of the server 2000. In another example, the server 2000 may generate a user DB based on the registration audio signal 103 received through the electronic apparatus 1000, and store the generated user DB in the memory of the server 2000.

After performing user authentication, the server 2000 may transmit an authentication result to the user 10 through the electronic apparatus 1000.

A specific method performed by the server 2000 of performing user authentication using the input audio signal 101, the registration audio signal 103, and the user DB may be the same as a method performed by the electronic apparatus 1000 according to an embodiment described above, and thus a detailed description thereof will be omitted.

Figure 2:
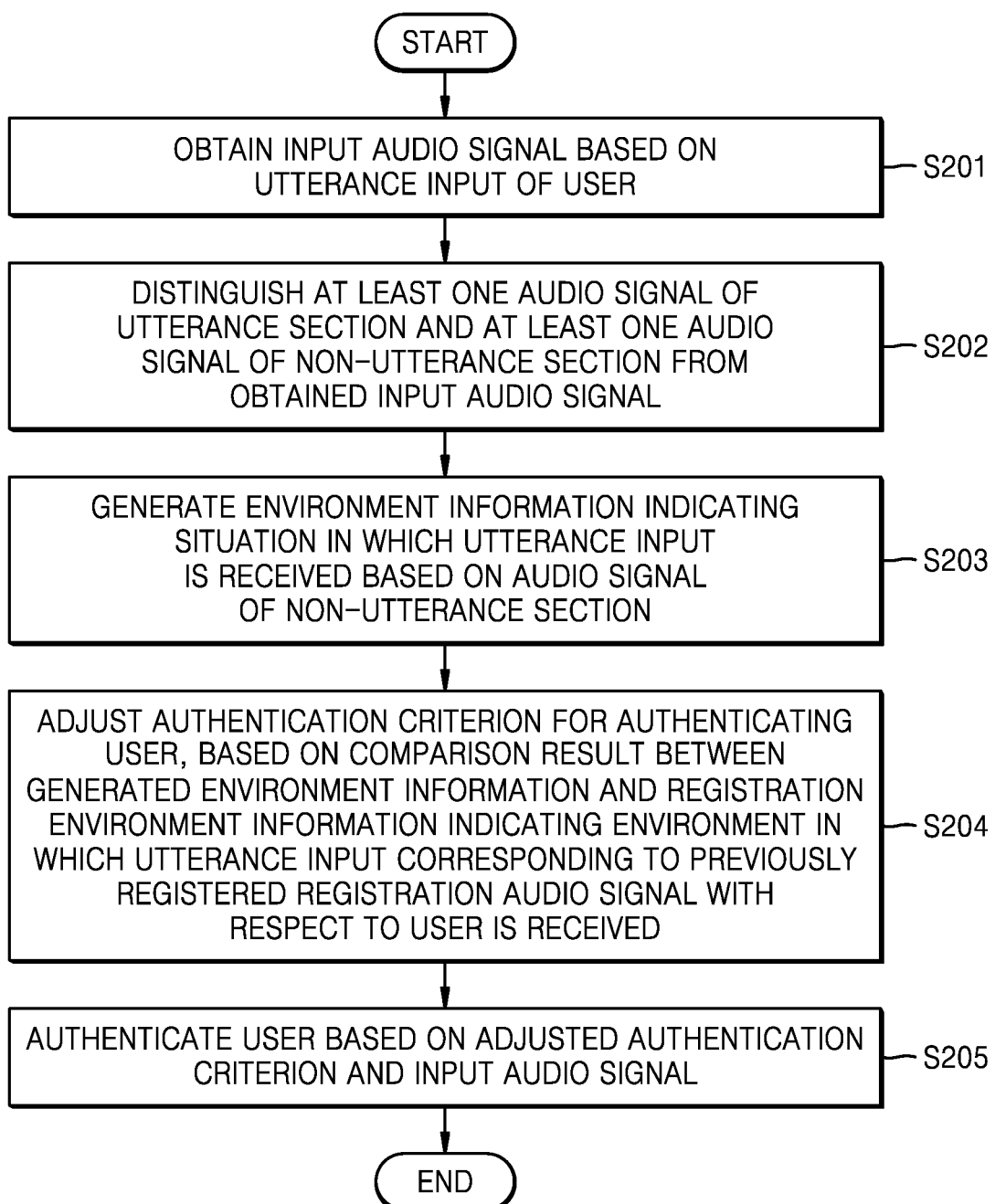
FIG. 2 is a flowchart illustrating a user authentication method according to an embodiment.

FIG. 2 is a flowchart illustrating a user authentication method according to an embodiment.

Referring to FIG. 2, in operation S201, the electronic apparatus 1000 may obtain the input audio signal 101 based on an utterance input of the user 10.

In operation S202, the electronic apparatus 1000 may distinguish at least one audio signal of an utterance section and at least one audio signal of a non-utterance section from the obtained input audio signal 101.

For example, the electronic apparatus 1000 may split the obtained input audio signal 101 into units of frames. The electronic apparatus 1000 may distinguish and obtain the audio signal of the utterance section and the audio signal of the non-utterance section from the input audio signal 101 split into units of frames.

For example, the electronic apparatus 1000 may perform peak value analysis of a voice activity detection (VAD) or a signal to noise ratio (SNR) in a preprocessing operation, etc. to obtain the audio signal of the utterance section and the audio signal of the non-utterance section from the input audio signal 101.

In another example, the electronic apparatus 1000 may obtain the audio signal of the utterance section and the audio signal of the non-utterance section by using an audio feature vector obtained with respect to the input audio signal 101 and an acoustic model (AM). An example of a detailed method performed by the electronic apparatus 1000 of obtaining the audio signal of the utterance section and the audio signal of the non-utterance section using the AM will be described later with reference to the embodiments of FIGS. 3 and 4.

In operation S203, the electronic apparatus 1000 may generate environment information indicating a situation in which an utterance input corresponding to the input audio signal 101 is received, based on the audio signal of the non-utterance section.

In operation S204, the electronic apparatus 1000 may adjust an authentication criterion for authenticating the user 10, based on a comparison result between the generated environment information and registration environment information indicating an environment in which an utterance input corresponding to the previously registered registration audio signal 103 with respect to the user 10 is received.

In operation S205, the electronic apparatus 1000 may perform user authentication based on the adjusted authentication criterion and the input audio signal 101. For example, the electronic apparatus 1000 may obtain a similarity between a registration user feature vector obtained from a registration utterance section and a user feature vector obtained from the audio signal of the utterance section, and compare the obtained similarity with an adjusted threshold to perform user authentication.

Meanwhile, in other embodiments, at least one of operation S201 of obtaining the input audio signal 101 or an operation S205 of performing user authentication based on the adjusted authentication criterion and the input audio signal 101 may be performed by the server 2000.

Figure 3:
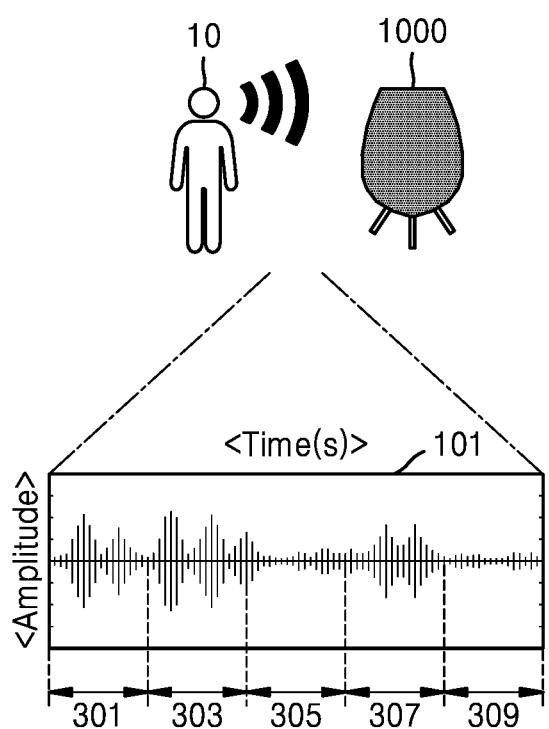
FIG. 3 is a diagram illustrating an audio signal of an utterance section and an audio signal of a non-utterance section included in an input audio signal, according to an embodiment.

FIG. 3 is a diagram illustrating an audio signal of an utterance section and an audio signal of a non-utterance section included in the input audio signal 101 according to an embodiment.

For example, the electronic apparatus 1000 may split the input audio signal 101 into units of preset frames. The electronic apparatus 1000 may extract an audio feature vector from the audio signal of each split frame.

Generally, in a speech recognition field, each frame of the audio signal used for extracting the audio feature vector may have a length of 20 milliseconds (ms) on a temporal domain, and each frame is split to overlap with each other by a length of 10 ms, but an audio feature vector extraction method of the disclosure is not limited to such a standard.

The input audio signal 101 may include, for example, at least one audio signal of an utterance section and at least one audio signal of a non-utterance section. When the user 10 pauses vocalization while performing an utterance input, the input audio signal 101 may include the audio signal of the utterance section corresponding to each vocalization section, and simultaneously may include the audio signal of the non-utterance section corresponding to a section before the beginning of vocalization, a section of the interruption of vocalization, and a section after the end of vocalization.

The electronic apparatus 1000 may classify an audio signal of each frame as the audio signal of the utterance section and the audio signal of the non-utterance section, based on the audio feature vector extracted from the audio signal of each frame.

For example, the electronic apparatus 1000 may accumulate all audio feature vectors with respect to audio signals of a plurality of utterance sections regardless of whether the audio feature vectors are included in a plurality of consecutive frames and use the audio feature vectors to generate a user feature vector.

In addition, the electronic apparatus 1000 may accumulate all audio feature vectors with respect to audio signals of a plurality of non-utterance sections regardless of whether the audio feature vectors are included in the plurality of consecutive frames and use the audio feature vectors to generate an environment feature vector.

Referring to FIG. 3, the input audio signal 101 may include a first section audio signal 301, a second section audio signal 303, a third section audio signal 305, a fourth section audio signal 307, and a fifth section audio signal 309. Each section audio signal may include, for example, at least one frame.

For example, the electronic apparatus 1000 may obtain the audio feature vector with respect to each of the at least one frame included in each section audio signal.

The electronic apparatus 1000 may, for example, distinguish the first section audio signal 301, the second section audio signal 303 and the fourth section audio signal 307 as audio signals of the utterance section and distinguish the third section audio signal 305 and the fifth section audio signal 309 as audio signals of the non-utterance section, based on an audio feature vector obtained with respect to each of the first section audio signal 301 to the fifth section audio signal 309.

The electronic apparatus 1000 may obtain, for example, the user feature vector by using the audio feature vector of audio signals of a plurality of utterance sections, that is, the first section audio signal 301, the second section audio signal 303, and the fourth section audio signal 307.

Meanwhile, the electronic apparatus 1000 may obtain, for example, the environment feature vector using audio feature vectors of the audio signals of the plurality of non-utterance sections, that is, the third section audio signal 305 and the fifth section audio signal 309.

For reference, in the drawings that will be described below, for convenience of description, at least one audio signal of an utterance section and at least one audio signal of a non-utterance section constituting an audio signal will be shown as, respectively, an audio signal of one utterance section and an audio signal of one non-utterance section.

FIG. 4 is a diagram illustrating a method of obtaining a user feature vector from the input audio signal 101 according to an embodiment.

Referring to FIG. 4, the electronic apparatus 1000 may obtain a first audio feature vector from the input audio signal 101 to identify an audio signal of an utterance section at operation 401.

The electronic apparatus 1000 may distinguish the audio signal of the utterance section from an audio signal of a non-utterance section from the input audio signal 101 based on the first audio feature vector at operation 403.

For example, the electronic apparatus 1000 may obtain an acoustic score of each frame of the input audio signal 101 using an AM 402, that is, a probability that each frame corresponds to a specific phoneme, thereby distinguishing each frame of the input audio signal 101 as one of a frame corresponding to the audio signal of the utterance section and a frame corresponding to the audio signal of the non-utterance section.

In general, units of an AM used in a speech recognition field may include a monophone, a diphone, a triphone, a quinphone, a syllable, a word, etc. Monophones may be treated as the same unit when one phoneme is the same. Diphons may be regarded as different units when a phoneme immediately before or after is different. Triphones may be treated as the same unit only when left and right phonemes are simultaneously the same.

For example, the electronic apparatus 1000 may select a phoneme candidate having the highest acoustic score among a plurality of phoneme candidates as a result of analysis of each frame using the AM 402, and when the selected phoneme candidate corresponds to a phoneme candidate having a silence index, classify the corresponding frame into the frame corresponding to the audio signal of the non-utterance section.

For example, the electronic apparatus 1000 may select the phoneme candidate having the highest acoustic score among the plurality of phoneme candidates as the result of analysis of each frame using the AM 402, and when the selected phoneme candidate corresponds to a phoneme candidate other than a phoneme candidate having a silence index, classify the corresponding frame into the frame corresponding to the audio signal of the utterance section.

In an embodiment, the electronic apparatus 1000 may classify all frames of the input audio signal 101 into any one of frames corresponding to the audio signal of the non-utterance section based on the acoustic score of each frame, thereby distinguishing the audio signal of the utterance section and the audio signal of the non-utterance section from the input audio signal 101.

The electronic apparatus 1000 may obtain a second audio feature vector from the audio signal of the utterance section at operation 404. For example, the electronic apparatus 1000 may obtain the second audio feature vector from the audio signal of the utterance section by using a method different from an audio feature vector extraction method used to obtain the first audio feature vector.

The electronic apparatus 1000 may generate a user feature vector corresponding to the user 10 based on the obtained second audio feature vector at operation 405.

Meanwhile, in other embodiments, at least one from operation 401 of obtaining the first audio feature vector to operation 405 of generating the user feature vector of FIG. 4 may be performed by the server 2000.

Figure 5A:
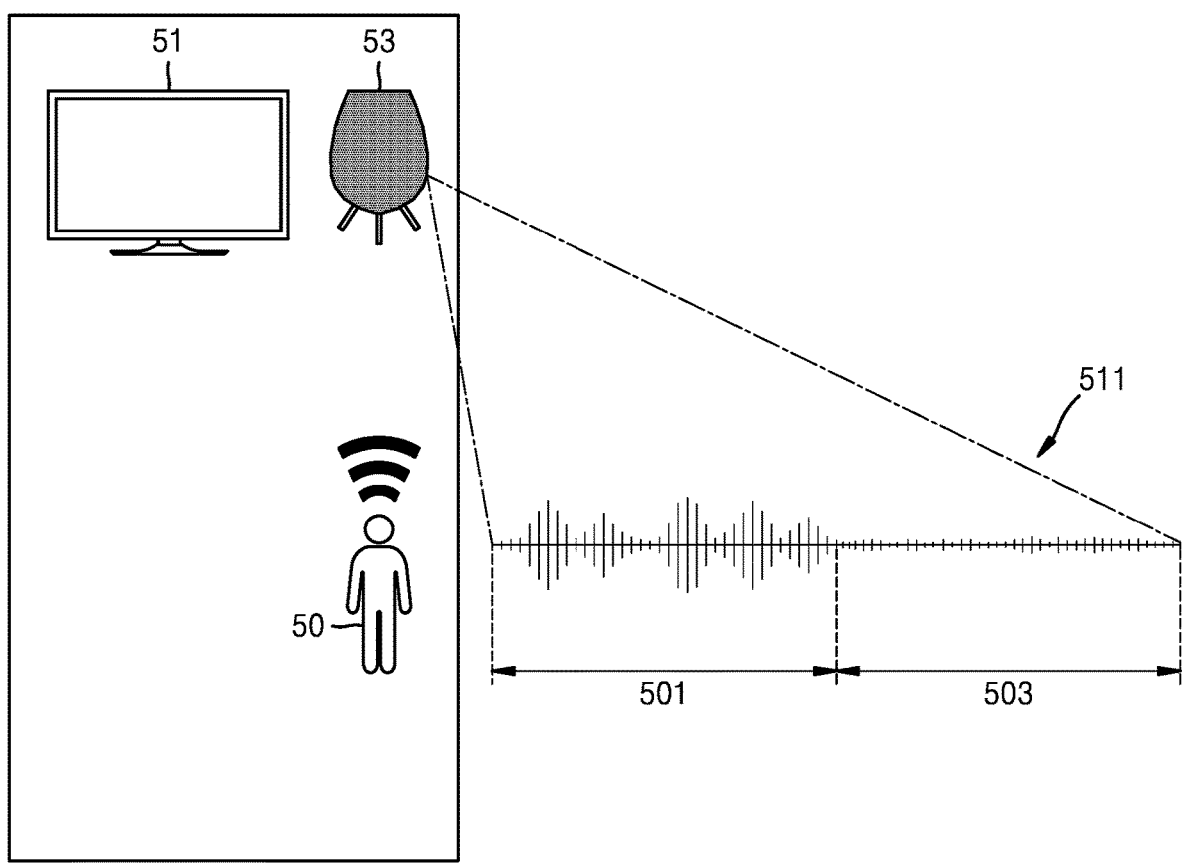
FIG. 5A is a diagram illustrating a relationship between a user registration environment and a registration audio signal, according to an embodiment.

FIG. 5A is a diagram illustrating a relationship between a user registration environment and a registration audio signal according to an embodiment.

Referring to FIG. 5A, a user 50 may register the user 50 as a user of a first electronic apparatus 53. For example, the user 50 may vocalize a certain first sentence to perform an utterance input with respect to the first electronic apparatus 53. The first electronic apparatus 53 may obtain a first registration audio signal 511 based on the utterance input of the user 50.

An environment in which the first electronic apparatus 53 receives the utterance input corresponding to the first registration audio signal 511 from the user 50 may be an indoor space in which the user 50, the first electronic apparatus 53, and a TV 51 located around the first electronic apparatus 53 are present.

At the time when the first electronic apparatus 53 obtains the first registration audio signal 511, power of the TV 51 may be in an off state.

For example, the first electronic apparatus 53 may distinguish the first registration audio signal 511 as an audio signal 501 of a first registration utterance section and an audio signal 503 of a first registration non-utterance section.

Figure 5B:
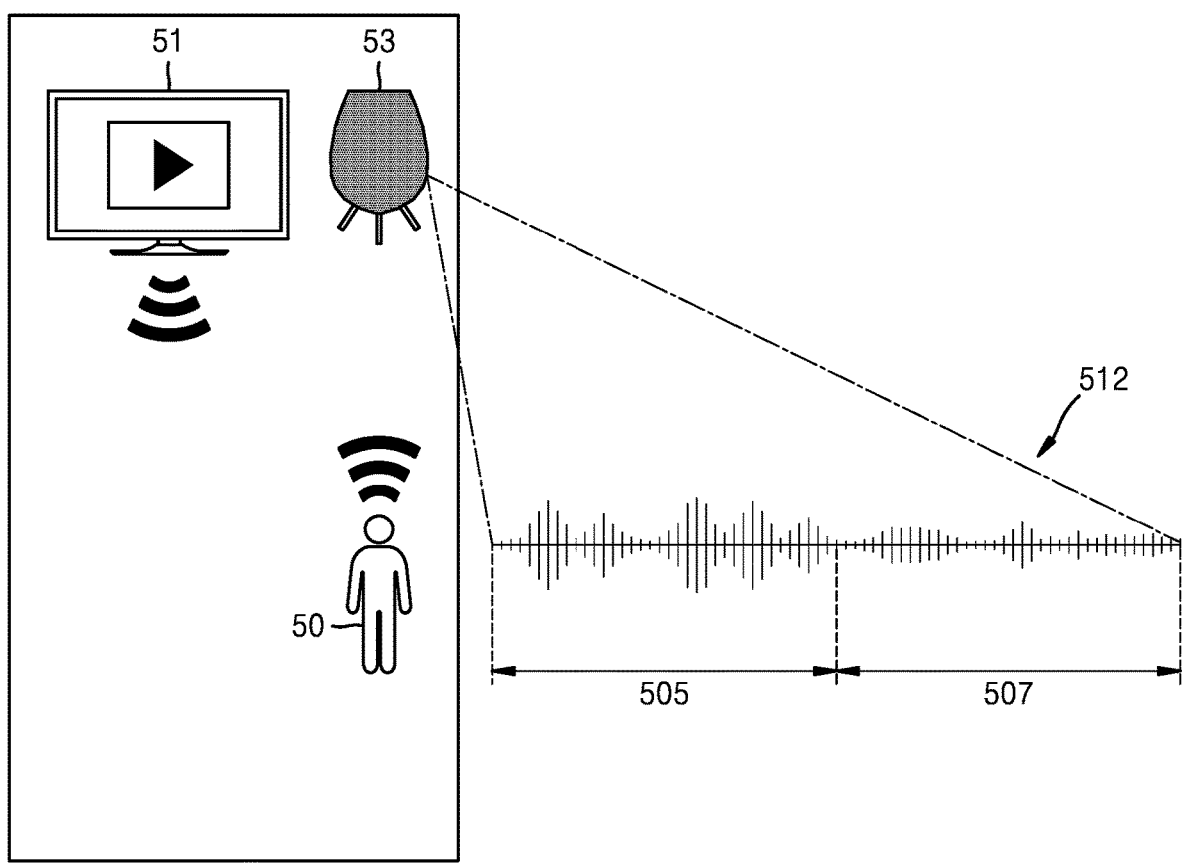
FIG. 5B is a diagram illustrating a relationship between a user authentication environment and an input audio signal, according to an embodiment.

FIG. 5B is a diagram illustrating a relationship between a user authentication environment and an input audio signal according to an embodiment.

Referring to FIG. 5B, the user 50 may, for example, vocalize a second sentence to perform an utterance input with respect to the first electronic apparatus 53. The first electronic apparatus 53 may obtain a first input audio signal 512 based on the utterance input of the user 50. For example, the second sentence may be a sentence different from a first sentence used for registration of the user 50.

An environment in which the first electronic apparatus 53 receives the utterance input corresponding to the first input audio signal 512 from the user 50 may be an indoor space in which the user 50, the first electronic apparatus 53, and the TV 51 located around the first electronic apparatus 53 are present.

However, at the time when the first electronic apparatus 53 receives the utterance input corresponding to the first input audio signal 512 from the user 50, power of the TV 51 may be in an on state, unlike the time when receiving an utterance input corresponding to the first registration audio signal 511, and sound having a volume that may be input to a microphone of the first electronic apparatus 53 may be output from a speaker of the TV 51.

For example, the first electronic apparatus 53 may distinguish the first input audio signal 512 as an audio signal 505 of a first utterance section and an audio signal 507 of a first non-utterance section.

In an embodiment illustrated in FIG. 5A and FIG. 5B, due to an environment in which the sound output through the speaker of the TV 51 is present, the audio signal 503 of the first registration non-utterance section and the audio signal 507 of the first non-utterance section may be different from each other.

In an embodiment, the audio feature of the audio signal 503 of the first registration non-utterance section and the audio feature of the audio signal 507 of the first non-utterance section may be different from each other, and a difference between the audio features may further increase as an output level of the speaker of the first TV 51 increases.

For example, the first electronic apparatus 53 may adjust an authentication criterion for user authentication, based on the audio feature of the audio signal 503 of the first registration non-utterance section and the audio feature of the audio signal 507 of the first non-utterance section that are different from each other.

For example, the first electronic apparatus 53 may obtain environment information indicating the environment in which the utterance input corresponding to the first input audio signal 512 is received, using the audio signal 507 of the first non-utterance section. For example, the first electronic apparatus 53 may obtain a first environment feature vector from the audio signal 507 of the first non-utterance section.

Meanwhile, for example, the first electronic apparatus 53 may obtain environment information indicating the environment in which the utterance input corresponding to the first registration audio signal 511 is received, using the audio signal 503 of the first registration non-utterance section obtained from the previously registered first registration audio signal 511. For example, the first electronic apparatus 53 may obtain a first registration environment feature vector from the audio signal 503 of the first registration non-utterance section.

The first electronic apparatus 53 may determine a degree of similarity between environments in which each audio signal is received through a comparison of the first registration environment feature vector with the first environment feature vector, and adjust the authentication criterion for user authentication based on a determination result. That is, the degree of similarity between the first registration environment feature vector and the first environment feature vector may decrease as the output level of the speaker of the first TV 51 increases.

Meanwhile, in other embodiments, adjustment of the authentication criterion through the comparison of the first registration environment feature vector with the first environment feature vector of FIGS. 5A and 5B may be performed by the server 2000.

As such, the electronic apparatus 1000 and/or the server 2000 using the user authentication method according to an embodiment may determine the degree of adjustment of the authentication criterion in consideration of the similarity between the environment in which the registration audio signal is obtained and the environment in which the input audio signal is obtained, thereby preventing degradation of user authentication performance in response to various input environments of the audio signal.

Figure 6A:
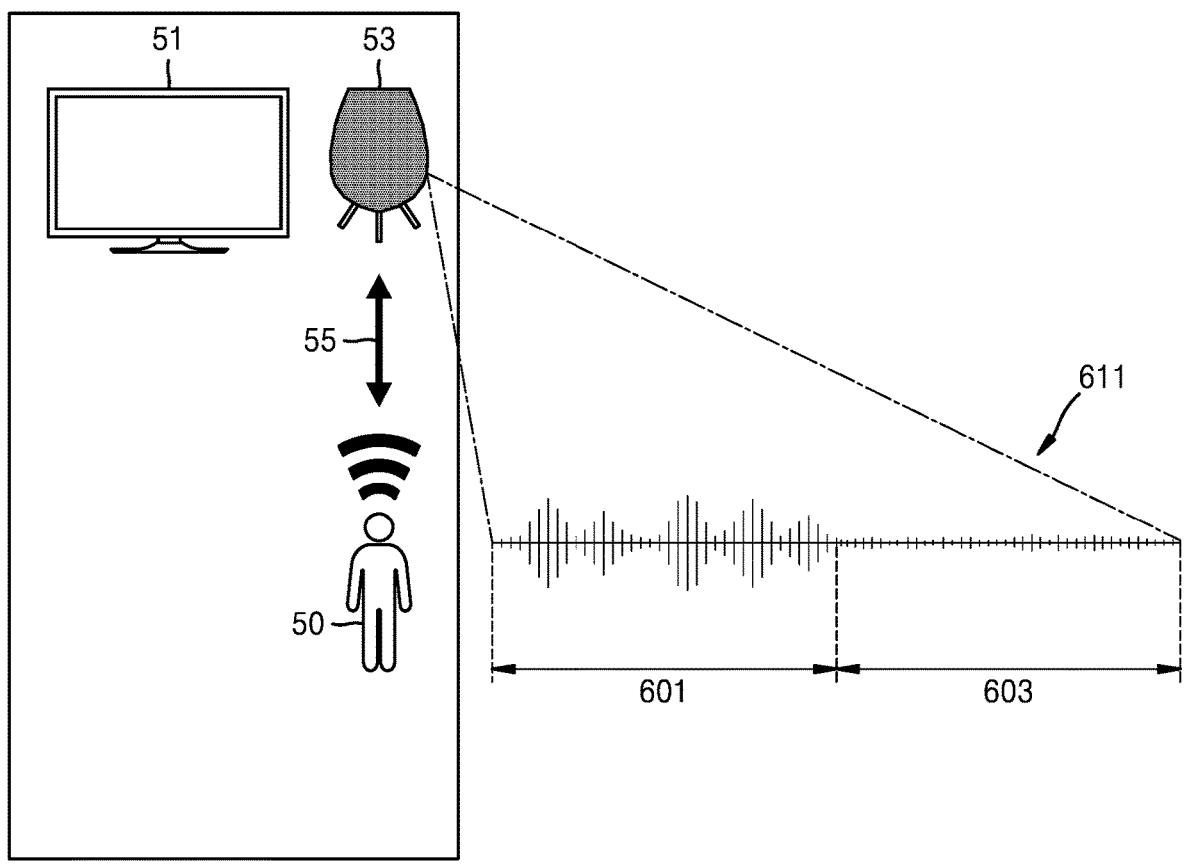
FIG. 6A is a diagram illustrating a relationship between a user registration environment and a registration audio signal, according to an embodiment.

FIG. 6A is a diagram illustrating a relationship between a user registration environment and a registration audio signal according to an embodiment.

Referring to FIG. 6A, a user 50 may register the user 50 as a user of a first electronic apparatus 53. For example, the user 50 may vocalize a certain first sentence to perform an utterance input with respect to the first electronic apparatus 53. The first electronic apparatus 53 may obtain a second registration audio signal 611 based on the utterance input of the user 50.

An environment in which the first electronic apparatus 53 receives the utterance input corresponding to the second registration audio signal 611 from the user 50 may be an indoor space in which the user 50, the first electronic apparatus 53, and the TV 51 located around the first electronic apparatus 53 are present.

At the time when the first electronic apparatus 53 obtains the second registration audio signal 611, the first electronic apparatus 53 and the user 50 may be separated by a first distance 55.

For example, the first electronic apparatus 53 may distinguish the second registration audio signal 611 as an audio signal 601 of a second registration utterance section and an audio signal 603 of a second registration non-utterance section.

Figure 6B:
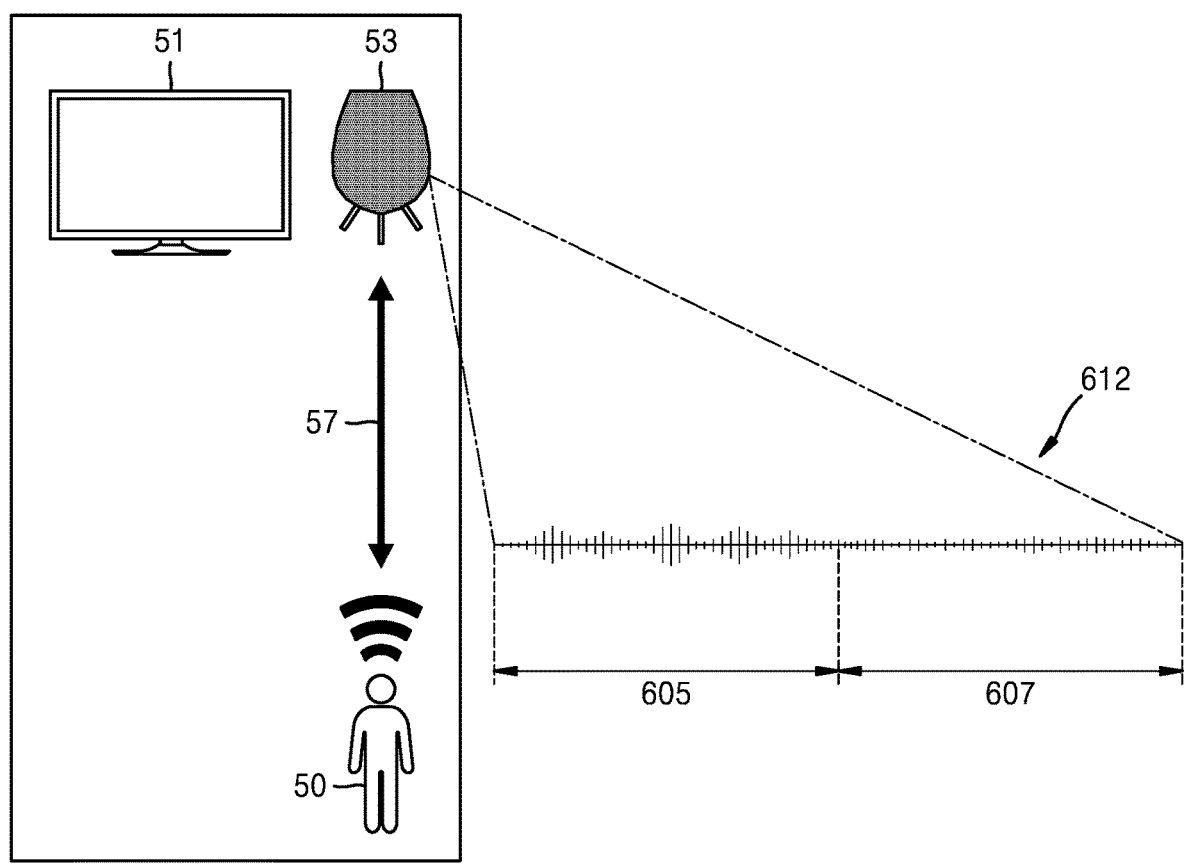
FIG. 6B is a diagram illustrating a relationship between a user authentication environment and an input audio signal, according to an embodiment.

FIG. 6B is a diagram illustrating a relationship between a user authentication environment and an input audio signal according to an embodiment.

Referring to FIG. 6B, the user 50 may, for example, vocalize a second sentence to perform an utterance input with respect to the first electronic apparatus 53. The first electronic apparatus 53 may obtain a second input audio signal 612 based on the utterance input of the user 50. For example, the second sentence may be a sentence different from a first sentence used for registration of the user 50.

An environment in which the first electronic apparatus 53 receives the utterance input corresponding to the second input audio signal 612 from the user 50 may be an indoor space in which the user 50, the first electronic apparatus 53, and the TV 51 located around the first electronic apparatus 53 are present.

However, the first electronic apparatus 53 and the user 50 at the time when the first electronic apparatus 53 receives the utterance input corresponding to the second input audio signal 612 from the user 50 may be separated by a second distance 57, unlike the time when receiving an utterance input corresponding to the second input audio signal 612.

For example, the first electronic apparatus 53 may distinguish the second input audio signal 612 as an audio signal 605 of a second utterance section and an audio signal 607 of a second non-utterance section.

Referring to FIGS. 6A and 6B, as a distance between the user 50 and the first electronic apparatus 53 increases from the first distance 55 to the second distance 57, the audio signal 601 of the second registration utterance section and the audio signal 605 of the second utterance section may be different from each other.

The average energy is a measure of the strength of the audio signal, and the average energy of each utterance section may decrease as the distance between the user 50 and the first electronic apparatus 53 increases. That is, the average energy of the audio signal 601 of the second registration utterance section and the average energy of the audio signal 605 of the second utterance section may be different from each other, and a difference in the average energy may further increase as the distance between the user 50 and the first electronic apparatus 53 increases.

For example, the first electronic apparatus 53 may adjust an authentication criterion for user authentication, based on the average energy of the audio signal 601 of the second registration utterance section and the average energy of the audio signal 605 of the second utterance section.

For example, when the average energy of the audio signal 601 of the second registration utterance section is greater than the average energy of the audio signal 605 of the second utterance section, the first electronic apparatus 53 may determine that the second distance 57 is greater than the first distance 55, and adjust the authentication criterion for user authentication based on an energy ratio of the average energy of the audio signal 601 of the second registration utterance section and the average energy of the audio signal 605 of the second utterance section.

Meanwhile, in other embodiments, adjustment of the authentication criterion based on the energy ratio of the average energy of FIGS. 6A and 6B may be performed by the server 2000.

As such, the electronic apparatus 1000 and/or the server 2000 using the user authentication method according to an embodiment may determine the degree of adjustment of the authentication criterion in consideration of the similarity between the environment in which the registration audio signal is obtained and the environment in which the input audio signal is obtained, thereby preventing degradation of user authentication performance in response to various input environments of the audio signal.

Figure 7:
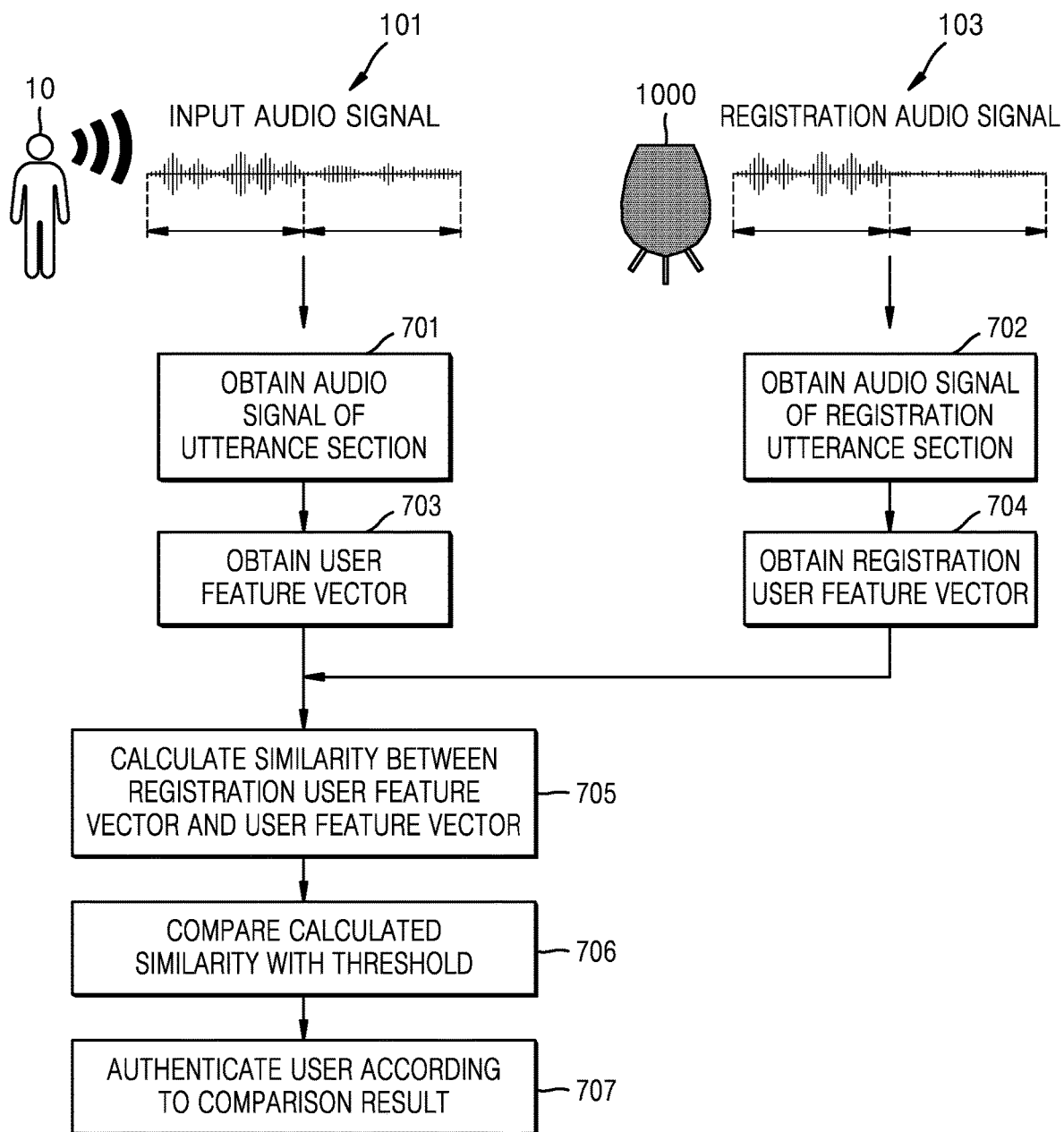
FIG. 7 is a diagram illustrating a process of performing user authentication based on an audio signal of an utterance section and an audio signal of a registration utterance section, according to an embodiment.

FIG. 7 is a diagram illustrating a process of performing user authentication based on an audio signal of an utterance section and an audio signal of a registration utterance section according to an embodiment.

Referring to FIG. 7, when the input audio signal 101 is obtained, the electronic apparatus 1000 may obtain an audio signal of the utterance section from the obtained input audio signal 101 at operation 701. The electronic apparatus 1000 may obtain a user feature vector from the obtained audio signal of the utterance section at operation 703.

In an embodiment, in the process of obtaining the user feature vector from the audio signal of the utterance section, an environment component corresponding to an audio signal generated by a surrounding environment of the electronic apparatus 1000 may not be completely removed but remain in the user feature vector.

To generate the user feature vector from which the environment component has been removed, the electronic apparatus 1000 may perform post-processing on the user feature vector.

For example, the electronic apparatus 1000 may remove the environment component remaining in the user feature vector obtained from the audio signal of the utterance section, using a post-processing model for removing the environment component from the user feature vector.

A DNN model used to remove the environment component from the user feature vector may be trained, for example, through a process of receiving a user feature vector obtained in a plurality of second environments, for example, a plurality of environments in which magnitude of a surrounding noise is less than or equal to a certain threshold, and outputting the same vector as a user feature vector obtained with respect to a specific user in a first environment, for example, an environment in which magnitude of a surrounding noise is less than or equal to the certain threshold and it is determined not to have noise, using a DNN model used to generate the user feature vector.

Meanwhile, for example, the electronic apparatus 1000 may further adjust a threshold value used for user authentication based on the remaining environment component removed from the user feature vector. Further adjustment of the threshold may be performed in the same manner as adjustment of a threshold based on a similarity of environment feature vectors, in addition to adjustment of a threshold based on a similarity of environment feature vectors, an example of which will be described below with reference to FIG. 8.

Meanwhile, when the input audio signal 101 is obtained, the electronic apparatus 1000 may obtain, for example, the registration audio signal 103 from a user DB, and obtain an audio signal of a registration utterance section from the obtained registration audio signal 103, at operation 702. The electronic apparatus 1000 may obtain a registration user feature vector from the obtained audio signal of the registration utterance section, at operation 704.

In an embodiment, when the input audio signal 101 is obtained, the electronic apparatus 1000 may obtain, as another example, the registration user feature vector directly from the user DB.

For example, the electronic apparatus 1000 may calculate a similarity between the registration user feature vector obtained from the audio signal of the registration utterance section and a user feature vector obtained from an audio signal of an utterance section, to perform user authentication at operation 705.

The electronic apparatus 1000 may compare the calculated similarity between the user feature vectors with a threshold at operation 706. The electronic apparatus 1000 may perform user authentication based on a comparison result of the obtained similarity between the user feature vectors and the threshold at operation 707.

Meanwhile, in other embodiments, at least one from operation 710 of obtaining the audio signal of the utterance section to operation 707 of performing user authentication according to comparison of the similarity between the user feature vectors and the threshold may be performed by the server 2000.

Figure 8:
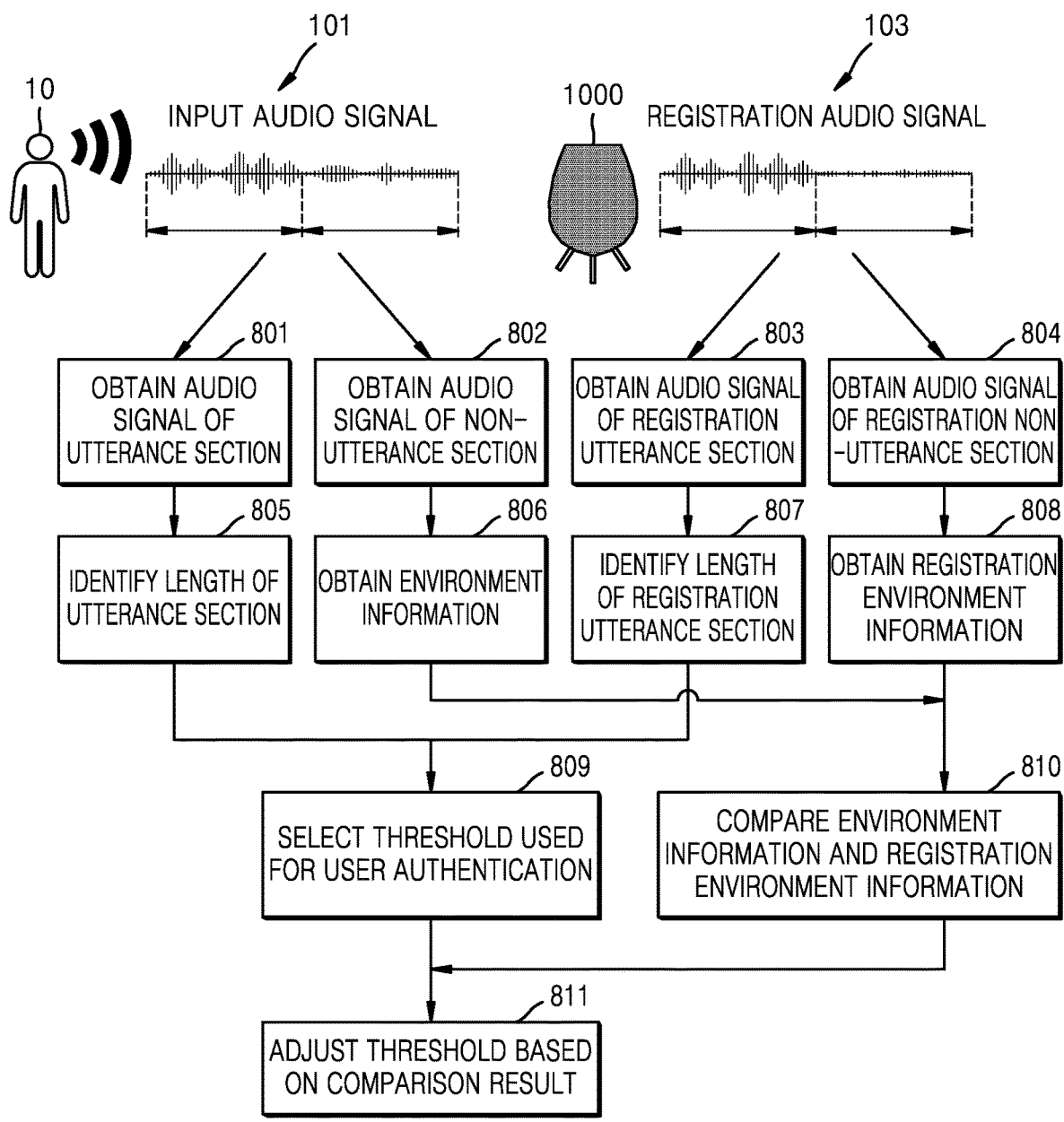
FIG. 8 is a diagram illustrating a method of adjusting a threshold for user authentication using an audio signal of a non-utterance section and an audio signal of a registration non-utterance section, according to an embodiment.

FIG. 8 is a diagram illustrating a method of adjusting a threshold for user authentication using an audio signal of a non-utterance section and an audio signal of a registration non-utterance section according to some embodiments.

Referring to FIG. 8, when the input audio signal 101 is obtained, the electronic apparatus 1000 may obtain an audio signal of an utterance section from the obtained input audio signal 101 at operation 801. When an audio signal of a utterance section is obtained, the electronic apparatus 1000 may identify a length of time, which may be referred to as a length of the utterance section, that the audio signal of the utterance section on a temporal domain continues at operation 805.

Meanwhile, when the input audio signal 101 is input from a user, the electronic apparatus 1000 may obtain, for example, the registration audio signal 103 from a user DB, and obtain the audio signal of the registration utterance section from the obtained registration audio signal 103 at operation 803. When the audio signal of the registration utterance section is obtained, the electronic apparatus 1000 may identify a length of time, which may be referred to as a length of the registration utterance section, that the audio signal of the registration utterance section on the temporal domain continues at operation 807.

The electronic apparatus 1000 may select any one threshold used for user authentication from among a plurality of thresholds included in a threshold table, based on the obtained length of the utterance section and length of the registration utterance section at operation 809.

Meanwhile, when the input audio signal 101 is obtained, the electronic apparatus 1000 may obtain the audio signal of the non-utterance section from the obtained input audio signal 101 at operation 802. The electronic apparatus 1000 may obtain environment information indicating an environment in which an utterance input corresponding to the input audio signal 101 is received, from the obtained audio signal of the non-utterance section at operation 806.

Meanwhile, when the input audio signal 101 is obtained, the electronic apparatus 1000 may obtain, for example, the registration audio signal 103 from the user DB, and obtain the audio signal of the registration non-utterance section from the obtained registration audio signal 103 at operation 804. The electronic apparatus 1000 may obtain registration environment information indicating an environment in which an utterance input corresponding to the registration audio signal 103 is received, from the obtained audio signal of the registration non-utterance section at operation 808.

The electronic apparatus 1000 may compare the environment information and the registration environment information with each other at operation 810. The electronic apparatus 1000 may adjust any one threshold selected at operation 809 from the threshold table based on a comparison result of the obtained environment information and registration environment information at operation 811.

Meanwhile, in other embodiments, at least one from operation 801 of obtaining the audio signal of the utterance section to operation 811 of adjusting the threshold based on the comparison result of the environment information and the registration environment information of FIG. 8 may be performed by the server 2000.

FIG. 9 is a diagram illustrating a preset threshold table 9 according to an embodiment.

The electronic apparatus 1000 according to an embodiment may use at least one threshold with respect to a similarity between a registration user feature vector obtained from an audio signal of a registration utterance section and a user feature vector obtained from an audio signal of an utterance section, as a criterion for user authentication. For example, the at least one threshold may be stored in advance in a memory of the electronic apparatus 1000 before the input audio signal 101 is obtained. For example, a plurality of thresholds used as authentication criteria may be stored in the memory of the electronic apparatus 1000 as the threshold table.

The threshold table may be generated based on, for example, an audio signal corresponding to utterance inputs of a plurality of users. The threshold table may be, for example, obtained through a logistic regression analysis on a binary dependent variable, which may be a binary dependent variable indicating that an obtained audio signal corresponds or does not correspond to a specific user, regarding whether the obtained audio signal corresponds to the specific user. The plurality of thresholds obtained through the logistic regression analysis may have, for example, a normalized scalar value between 0 and 1.

The threshold table may include, for example, the plurality of thresholds generated based on a percentage of authentication errors, that is, a ratio between a false rejection rate (FRR) which recognizes a user as other person and rejects user authentication, and a false acceptance rate (FAR) which recognizes other person as a user and accepts user authentication.

In general, the user authentication accuracy of an electronic apparatus may increase as a length of time that an input audio signal on a temporal domain continues and a length of a registration audio signal increases. When a single threshold is used, the FAR may increase when the length of the input audio signal and the length of the registration audio signal increase, and the FRR may increase when the length of the input audio signal and the length of the registration audio signal decrease.

Because the FRR and the FAR may be in a trade-off relationship, the threshold table may be set to include a plurality of thresholds corresponding to various lengths of the input audio signal and the registration audio signal, and the electronic apparatus 1000 may use the threshold table, thereby preventing a change in user authentication performance due to a decrease or increase in the lengths of the input audio signal and the registration audio signal.

The electronic apparatus 1000 may select, for example, any one threshold corresponding to a length of an utterance section of the input audio signal 101 and a length of a registration utterance section of the registration audio signal 103 from the threshold table including the plurality of thresholds.

For example, the electronic apparatus 1000 may receive an utterance input corresponding to the input audio signal 101 from the user and simultaneously measure the length of the utterance section in real time. For example, the electronic apparatus 1000 may obtain the registration audio signal 103 in a user registration operation and simultaneously measure the length of the registration utterance section and store the measured length of the registration utterance section in a user DB.

Referring to FIG. 9, the threshold table 9 according to an embodiment may include the plurality of thresholds corresponding to each of a length P1 of the registration utterance section classified in units of 5 second (sec) length and a length P2 of the utterance section classified in units of 0.1 sec length. The plurality of thresholds included in the threshold table 9 may, for example, include a normalized scalar value between 0 and 1.

For example, when the length of the utterance section of the input audio signal 101 is 1.15 sec and the length of the registration utterance section of the registration audio signal 103 is 16 sec, the electronic apparatus 1000 may select a threshold for user authentication as 0.673734.

Meanwhile, when the length of the utterance section of the input audio signal 101 is 1.5 sec and the length of the registration utterance section of the registration audio signal 103 is 20 sec, the electronic apparatus 1000 may select a Threshold for user authentication as 0.870094.

When the electronic apparatus 1000 obtains the input audio signal 101 having different lengths of the utterance sections, the electronic apparatus 1000 may use different thresholds with respect to the same length of the registration utterance section by using the threshold table 9, thereby preventing a change in user authentication performance due to a decrease or an increase in the length of the input audio signal 101.

Figure 10:
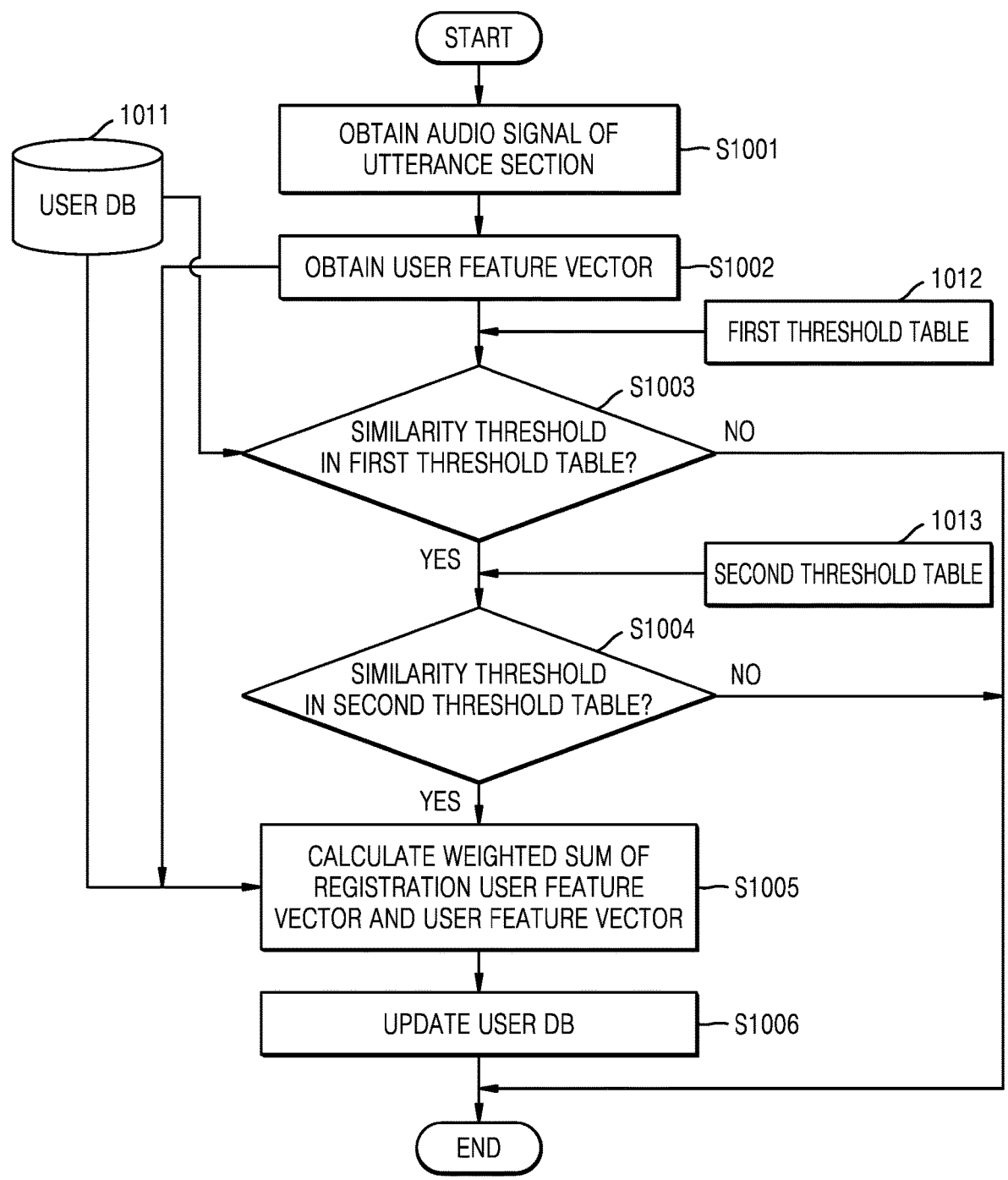
FIG. 10 is a flowchart illustrating a method of updating a user database (DB), according to an embodiment.

FIG. 10 is a flowchart illustrating a method of updating a user DB 1011 according to an embodiment.

Because the electronic apparatus 1000 repeatedly performs authentication on a user, the user DB may be updated. For example, because the electronic apparatus 1000 repeatedly performs authentication on the user, at least one of the registration audio signal 103, a registration user feature vector, a registration environment feature vector, or a length of a registration utterance section stored in the user DB may be updated.

For example, the electronic apparatus 1000 may use a separate threshold table distinguished from a threshold table for user authentication to update the user DB.

The electronic apparatus 1000 may obtain, for example, a similarity between a registration user feature vector obtained from the user DB and a user feature vector obtained from the input audio signal 101 and compare the obtained similarity with any one threshold selected from a threshold table that is a reference for user authentication to perform user authentication.

When the obtained similarity has a value equal to or greater than the selected threshold, the electronic apparatus 1000 may compare, for example, the obtained similarity with any one threshold selected from the threshold table for updating the user DB.

The threshold table for updating the user DB may be set to include, for example, a plurality of thresholds having a relatively lower FAR than that of the threshold table used for user authentication. That is, with respect to the length of the same registration utterance section and the length of the utterance section, the threshold table for updating the user DB may be set to include a relatively higher threshold than the threshold table that is the reference for user authentication.

That is, the electronic apparatus 1000 may use the threshold table for updating the user DB, thereby selecting the input audio signal 101 that satisfies the relatively higher threshold than the threshold table that is the reference for user authentication. The electronic apparatus 1000 may update the user DB based on the selected input audio signal 101, and thus when user authentication is repeated, the user authentication performance of the electronic apparatus 1000 may be improved.

Referring to FIG. 10, for example, the electronic apparatus 1000 may obtain an audio signal of an utterance section from the input audio signal 101 in operation S1001, and, in operation S1002, obtain a user feature vector from the obtained audio signal of the utterance section.

In operation S1003, the electronic apparatus 1000 may calculate a similarity between the registration user feature vector obtained from the user DB 1011 and the user feature vector obtained from the audio signal of the utterance section, and compare the calculated similarity with any one threshold selected from a first threshold table 1012.

The first threshold table 1012 may include, for example, a plurality of thresholds for user authentication. As a result of comparison, when the calculated similarity is equal to or greater than any one threshold selected from the first threshold table 1012, in operation S1004, the electronic apparatus 1000 may compare the calculated similarity with any one threshold selected from a second threshold table 1013. The second threshold table 1013 may include, for example, a plurality of thresholds for updating the user DB.

As a result of comparison, when the calculated similarity is equal to or greater than any one threshold selected from the second threshold table 1013, in operation S1005, the electronic apparatus 1000 may calculate a weighted sum of the registration user feature vector obtained from the user DB 1011 and the user feature vector obtained from the audio signal of the utterance section.

For example, the electronic apparatus 1000 may calculate the weighted sum by applying different weights to the registration user feature vector obtained from the user DB 1011 and the user feature vector obtained from the audio signal of the utterance section, according to a ratio between a length of the registration user feature vector obtained from the user DB 1011 and a length of the utterance section obtained from the input audio signal 101.

For example, when the length of the registration user feature vector obtained from the user DB 1011 is 12 sec and the length of the utterance section obtained from the input audio signal 101 is 3 sec, the electronic apparatus 1000 may obtain a new user feature vector through a weighted sum applying weights of a ratio of 4:1 to the registration user feature vector and the user feature vector.

Based on a result of calculation in operation S1005, the electronic apparatus 1000 may update the user DB 1011 in operation S1006. When the new user feature vector is obtained, the electronic apparatus 1000 may update the registration user feature vector included in the user DB 1011 as the obtained new user feature vector.

Meanwhile, the electronic apparatus 1000 may also update a registration environment feature vector in the same manner as in the user feature vector.

For example, when the calculated similarity is equal to or greater than any one threshold selected from the second threshold table 1013 as a result of calculation in operation S1004, the electronic apparatus 1000 may update the registration user feature vector of the user DB 1011 and simultaneously update the registration environment feature vector.

For example, when a length of a registration non-utterance section obtained from the user DB 1011 is 2 sec and a length of a non-utterance section obtained from the input audio signal 101 is 1 sec, the electronic apparatus 1000 may obtain a new environment feature vector through a weighted sum applying weights of a ratio of 2:1 to the registration environment feature vector and the environment feature vector.

When the new environment feature vector is obtained, the electronic apparatus 1000 may update the registration environment feature vector included in the user DB 1011 by replacing the registration environment feature vector with the obtained new environment feature vector.

Figure 11:
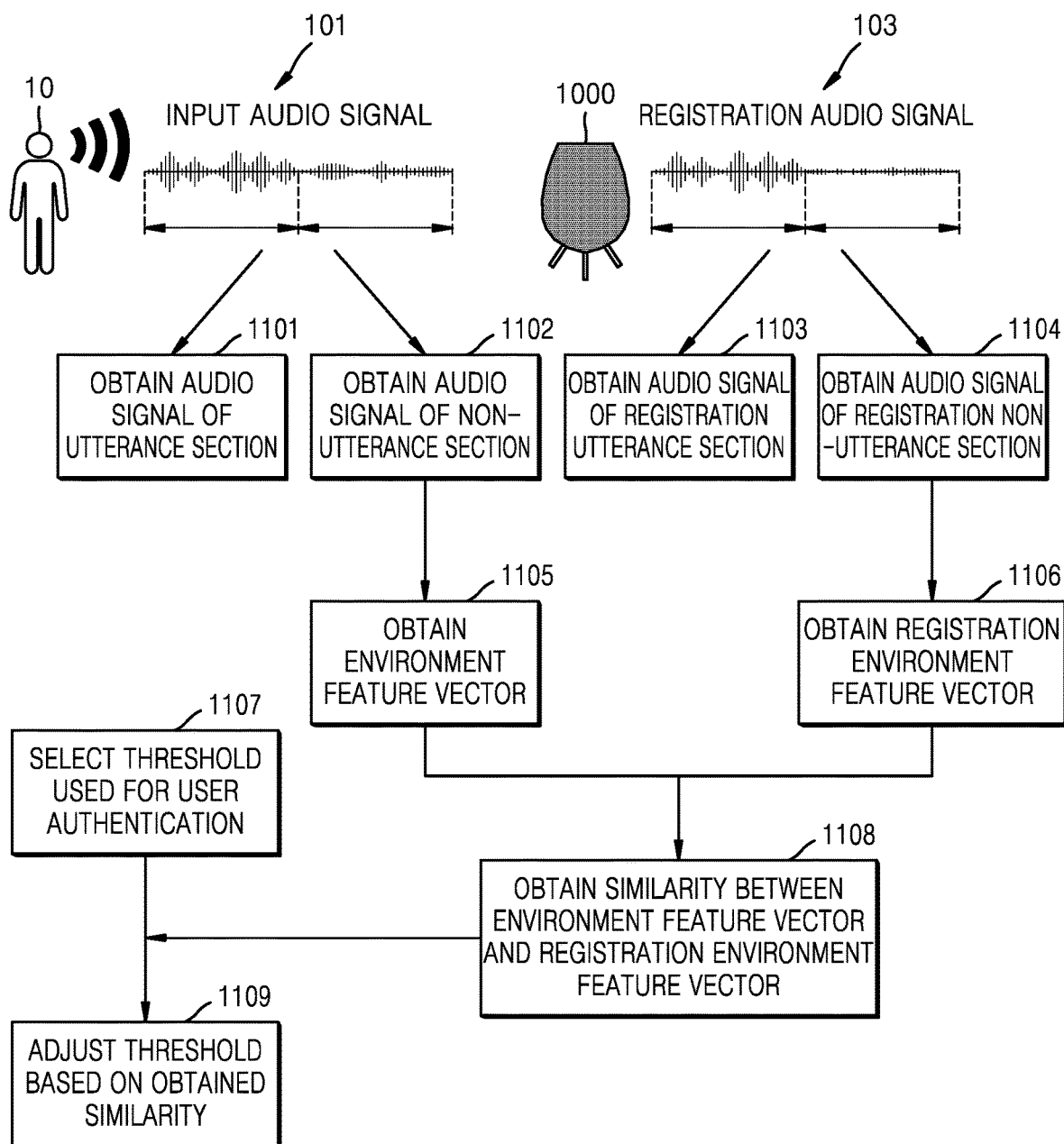
FIG. 11 is a diagram illustrating a method of adjusting a threshold using an audio signal of a non-utterance section and an audio signal of a registration non-utterance section, according to an embodiment.

FIG. 11 is a diagram illustrating a method of adjusting a threshold using an audio signal of a non-utterance section and an audio signal of a registration non-utterance section, according to an embodiment.

Referring to FIG. 11, when the input audio signal 101 is obtained, the electronic apparatus 1000 may obtain an audio signal of an utterance section and the audio signal of the non-utterance section from the obtained input audio signal 101 at operation 1101 and operation 1102.

The electronic apparatus 1000 may obtain environment information indicating an environment in which an utterance input corresponding to the input audio signal 101 is received, from the obtained audio signal of the non-utterance section. For example, the electronic apparatus 1000 may obtain an environment feature vector as the environment in which the utterance input corresponding to the input audio signal 101 is received, from the audio signal of the non-utterance section at operation 1105.

Meanwhile, when the input audio signal 101 is obtained, the electronic apparatus 1000 may obtain an audio signal of a registration utterance section and the audio signal of the registration non-utterance section from the registration audio signal 103 at operation 1103 and operation 1104.

The electronic apparatus 1000 may obtain environment information indicating an environment in which an utterance input corresponding to the registration audio signal 103 is received, from the obtained audio signal of the registration non-utterance section. For example, the electronic apparatus 1000 may obtain a registration environment feature vector as the environment information indicating the environment in which the utterance input corresponding to the registration audio signal 103 is received, from the obtained audio signal of the registration non-utterance section at operation 1106.

For example, the electronic apparatus 1000 may obtain a similarity between the obtained environment feature vector and registration environment feature vector at operation 1108.

The electronic apparatus 1000 may adjust any one threshold used for user authentication selected at operation 1107 from among a plurality of thresholds included in a threshold table, based on the obtained similarity between the environment feature vectors at operation 1109. The adjusted threshold may be used for user authentication in comparison with the similarity between the user feature vector obtained from the audio signal of the utterance section and the registration user feature vector obtained from the audio signal of the registration utterance section.

For example, the electronic apparatus 1000 may adjust the threshold according to the Equation 1 below.

$$TH_{final} = TH_{base}(1.0 - w_s(1.0 - S_r)) \quad \text{[Equation 1]}$$

In Equation 1 above, $S_r$ denotes the similarity between the environment feature vectors, $w_s$ denotes a weighted coefficient of the similarity between the environment feature vectors, $TH_{base}$ denotes the one threshold selected from the threshold table, and $TH_{final}$ denotes the adjusted threshold. The similarity $S_r$ between the environment feature vectors may, for example, have a value of 1 with respect to the same environment feature vectors. The weighted coefficient $w_s$ of the similarity between the environment feature vectors may be set, for example, based on experiment data including a plurality of audio signals obtained at different distances and different environment conditions.

Meanwhile, in other embodiments, at least one from operation 1101 of obtaining the audio signal of the utterance section to operation 1109 of adjusting the threshold based on the similarity between the environment feature vector and the registration environment feature vector of FIG. 11 may be performed by the server 2000.

Figure 12:
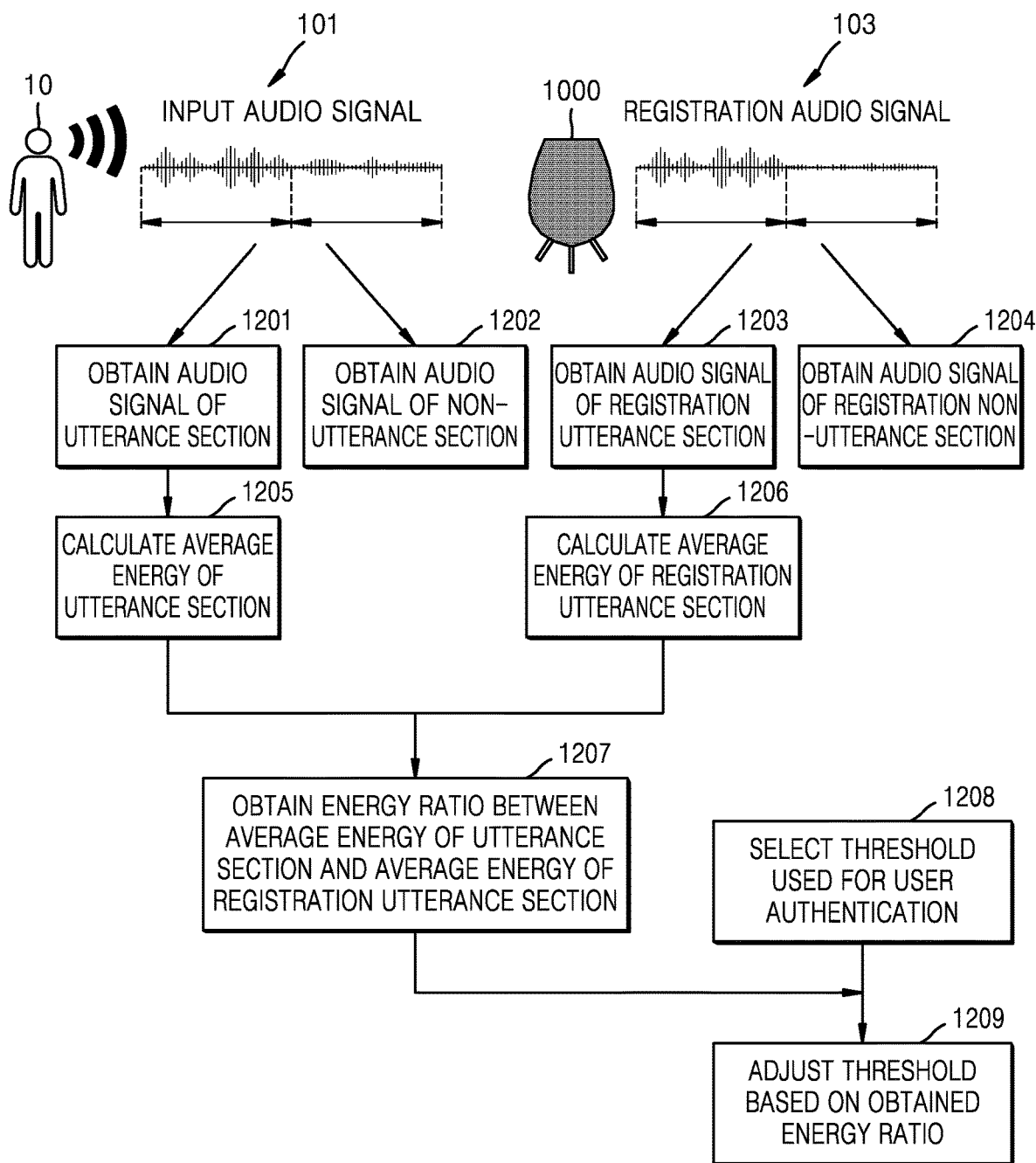
FIG. 12 is a diagram illustrating a method of adjusting a threshold using an audio signal of an utterance section and an audio signal of a registration utterance section, according to an embodiment.

FIG. 12 is a diagram illustrating a method of adjusting a threshold using an audio signal of a utterance section and an audio signal of a registration utterance section according to an embodiment.

Referring to FIG. 12, when the input audio signal 101 is obtained, the electronic apparatus 1000 may obtain the audio signal of the utterance section and an audio signal of a non-utterance section from the obtained input audio signal 101 at operation 1201 and operation 1202.

The electronic apparatus 1000 may calculate an average energy of the utterance section from the obtained audio signal of the utterance section at operation 1205. The average energy of a specific section of the audio signal may correspond to, for example, an average of absolute values with respect to the amplitude of a frame of the audio signal included in the specific section.

Meanwhile, when the input audio signal 101 is obtained, the electronic apparatus 1000 may obtain the audio signal of the registration utterance section and an audio signal of a registration non-utterance section from the registration audio signal 103 at operation 1203 and operation 1204.

For example, the electronic apparatus 1000 may obtain an average energy of the registration utterance section from the obtained audio signal of the registration utterance section at operation 1206. For another example, the electronic apparatus 1000 may obtain the average energy of the registration utterance section directly from a user DB previously generated in a user registration operation.

The electronic apparatus 1000 may obtain an energy ratio by comparing the calculated average energy of the utterance section and average energy of the registration utterance section with each other at operation 1207.

For example, the electronic apparatus 1000 may obtain an energy ratio according to Equation 2 below.

$$E_r = 1.0 - |E_{enroll} - E_{test}|/E_{enroll}(E_{enroll} \geq E_{test}),\ E_r = 1.0 - |E_{enroll} - E_{test}|/E_{enroll}(E_{enroll} \geq E_{test}) \quad \text{[Equation 2]}$$

In Equation 2 above, $E_{enroll}$ denotes an average energy value calculated from the audio signal of the registration utterance section, $E_{test}$ denotes an average energy value calculated from the audio signal of the utterance section, and $E_r$ denotes the energy ratio.

The electronic apparatus 1000 may adjust any one threshold used for user authentication selected at operation 1208 from among a plurality of thresholds included in a threshold table, based on the obtained energy ratio at operation 1209. The adjusted threshold may be used for user authentication in comparison with the similarity between the user feature vector obtained from the audio signal of the utterance section and the registration user feature vector obtained from the audio signal of the registration utterance section.

For example, the electronic apparatus 1000 may adjust the threshold according to Equation 3 below.

$$TH_{final} = TH_{base}(1.0 - w_e(1.0 - E_r)^2) \quad \text{[Equation 3]}$$

In Equation 3 above, $E_r$ denotes the energy ratio, $w_e$ denotes a weighted coefficient of the energy ratio, $TH_{base}$ denotes the one threshold selected from the threshold table, and $TH_{final}$ denotes the adjusted threshold. The weighted coefficient $w_e$ of the energy ratio may be set, for example, based on experiment data including a plurality of audio signals obtained at different distances and different environment conditions.

For example, the electronic apparatus 1000 may adjust the threshold using at least one of the threshold adjustment methods of FIGS. 11 and 12. When both the threshold adjustment methods of FIGS. 11 and 12 are used, the electronic apparatus 1000 may adjust the threshold according to Equation 4 below combined with Equation 1 and Equation 3.

$$TH_{final} = TH_{base}(1.0 - w_s(1.0 - S_r) - w_e(1.0 - E_r)^2) \quad \text{[Equation 4]}$$

Meanwhile, the electronic apparatus 1000 may use a user characteristic parameter value for removing a deviation in authentication performance between users of the electronic apparatus 1000 with respect to a plurality of users. The user characteristic parameter value refers to a parameter value applied to a threshold to remove the deviation in the authentication performance of the electronic apparatus 1000 according to a difference in timbre between users.

For example, when compared with a universal background model (UBM), which is a statistical model for universal speech obtained based on audio signals input from a plurality of users, a similarity between a user feature vector of a first user and an average user feature vector obtained from the UBM may be relatively lower than a similarity between a user feature vector of a second user and the average user feature vector obtained from the UBM. That is, due to the difference in the timbre between users, the authentication performance of the electronic apparatus 1000 with respect to the first user and the second user may be different from each other.

To remove such a deviation in the authentication performance, the electronic apparatus 1000 may obtain a similarity between a user feature vector obtained with respect to a specific user and the average user feature vector obtained from the UBM during a user registration process, and set the user characteristic parameter value with respect to the corresponding user based on the obtained similarity. The electronic apparatus 1000 may adjust a threshold used for authentication of the corresponding user by using the set user characteristic parameter value. For example, the electronic apparatus 1000 may store the set user characteristic parameter value in a user DB with respect to the corresponding user.

Meanwhile, in other embodiments, the setting of the user characteristic parameter value and the adjustment of the threshold based on the set user characteristic parameter value may be performed by the server 2000. A specific example in which the setting of the user characteristic parameter value and the adjustment of the threshold value based on the set user characteristic parameter value is performed by the server 2000 will be described later with reference to the embodiments of FIG. 22 and FIG. 23.

Meanwhile, the electronic apparatus 1000 may normalize the similarity between the registration user feature vector and the user feature vector, to remove the deviation in the authentication performance between users of the electronic apparatus 1000 with respect to the plurality of users.

For example, the first user registered in the electronic apparatus 1000 may be relatively lower than the second user in an average of similarities between the user feature vector obtained from a user DB of the first user and user feature vectors obtained from the input audio signal 101 corresponding to an utterance input of the first user. The electronic apparatus 1000 may normalize the similarity between the user feature vectors to remove a deviation between the similarity average between user feature vectors obtained with respect to the first user and the similarity average between user feature vectors obtained with respect to the second user.

For example, after the user registration of a user A, while the user A performs an utterance input three times, the electronic apparatus 1000 may obtain a registration user feature vector from a user A DB, and obtain a user feature vector from each of three input audio signals corresponding to the utterance input of the user A.

The electronic apparatus 1000 may obtain similarities between the registration user feature vector obtained from the user A DB and the user feature vectors obtained from the three input audio signals. For example, the similarities between the registration user feature vector obtained from the user A DB and the user feature vectors obtained from the three input audio signals may have scalar values of 0.20, 0.30, and 0.25.

For example, the electronic apparatus 1000 may set a scalar value of 0.25 obtained by calculating an average of 0.20, 0.30, and 0.25, which are the similarities between the user feature vectors, as average similarity for normalizing a similarity between registration user feature vector obtained from the user A DB and a registration user feature vector obtained from a new input audio signal of the user A.

When the new input audio signal is obtained based on an utterance of the user A, and the similarity between the user feature vector obtained from the new input audio signal and the registration user feature vector obtained from the user A DB is a scalar value of 0.32, the electronic apparatus 1000 may normalize 0.32 as a scalar value of 0.0128 by dividing 0.32 by the average similarity of 0.25 of the user A.

Meanwhile, for another example, after the user registration of a user B, while the user B performs an utterance input three times, the electronic apparatus 1000 may obtain a registration user feature vector from a user B DB, and obtain a user feature vector from each of three input audio signals corresponding to the utterance input of the user B.

The electronic apparatus 1000 may obtain similarities between the registration user feature vector obtained from the user B DB and the user feature vectors obtained from the three input audio signals. For example, the similarities between the registration user feature vector obtained from the user A DB and the user feature vectors obtained from the three input audio signals may have scalar values of 0.10, 0.20 and 0.15.

For example, the electronic apparatus 1000 may set a scalar value of 0.15 obtained by calculating an average of 0.10, 0.20 and 0.15, which are the similarities between the user feature vectors, as average similarity for normalizing a similarity between registration user feature vector obtained from the user B DB and a registration user feature vector obtained from a new input audio signal of the user B.

When the new input audio signal is obtained based on an utterance of the user B, and the similarity between the user feature vector obtained from the new input audio signal and the registration user feature vector obtained from the user B DB is a scalar value of 0.22, the electronic apparatus 1000 may normalize 0.22 as a scalar value of 0.0147 by dividing 0.22 by the average similarity of 0.15 of the user B.

Meanwhile, the electronic apparatus 1000 may use an apparatus characteristic parameter value for removing a deviation in user authentication performance according to a difference in audio signal processing performance between apparatuses. The apparatus characteristic parameter value refers to a parameter value applied to a threshold to remove the deviation in the authentication performance of the electronic apparatus 1000 according to a difference in hardware characteristic between apparatuses.

For example, audio signal processing performance between different types of electronic apparatuses 1000 may be different from each other according to hardware characteristic of each electronic apparatus 1000. The audio signal processing performance of the electronic apparatus 1000 may vary depending on, for example, the number of microphones included in the electronic apparatus 1000, sensitivity, resolution, etc.

Considering that the audio signal processing performance may vary depending on the type of the electronic apparatus 1000, the electronic apparatus 1000 may use the apparatus characteristic parameter value for removing the deviation in the user authentication performance due to the difference in the audio signal processing performance between apparatuses.

Meanwhile, in other embodiments, at least one from operation 1201 of obtaining the audio signal of the utterance section to operation 1209 of adjusting the threshold based on the energy ratio between the average energy of the utterance section and the average energy of the registration utterance section of FIG. 12 may be performed by the server 2000.

Figure 13A:
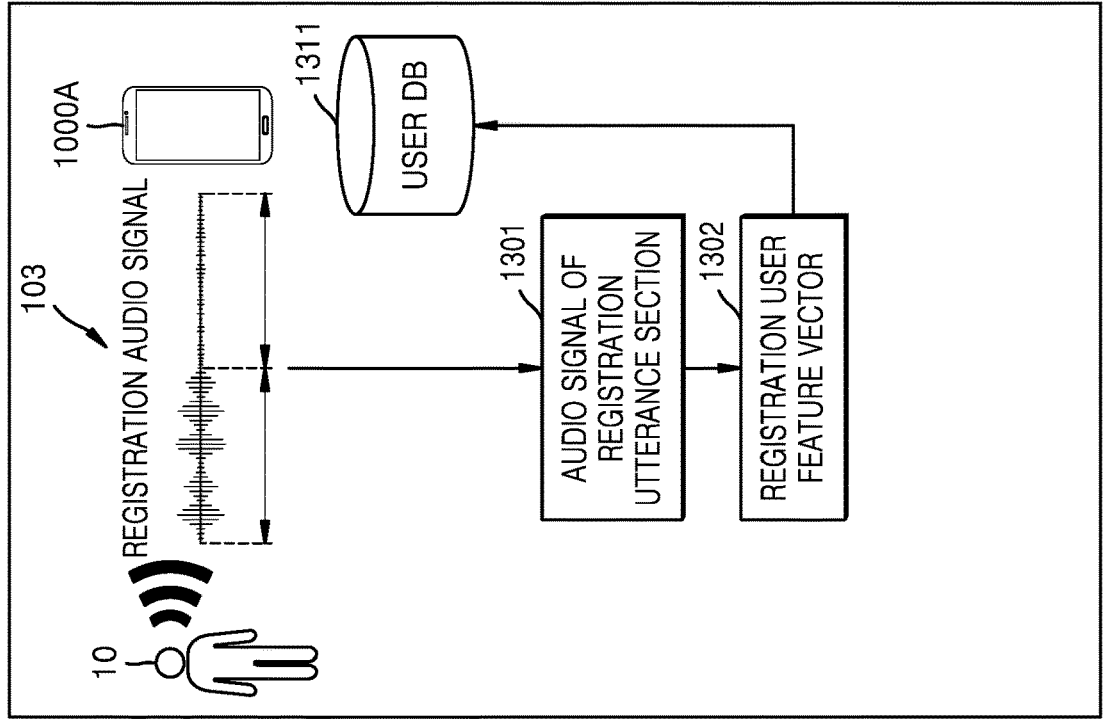
FIG. 13A is a diagram illustrating an environment in which an electronic apparatus is used, according to an embodiment.

FIG. 13A is a diagram illustrating an environment in which the electronic apparatus 1000 is used according to an embodiment.

Referring to FIG. 13A, the electronic apparatus 1000 according to an embodiment may be a smartphone 1000A.

For example, the smartphone 1000A may obtain an input audio signal 1301 of a registration utterance section from the registration audio signal 103 obtained based on an utterance input of the user 10 in a user registration operation. The smartphone 1000A may obtain a registration user feature vector 1302 from the input audio signal 1301 of the registration utterance section, and store the obtained registration user feature vector 1302 in a user DB 1311.

For example, the smartphone 1000A may generate the user DB 1311 in the user registration operation and simultaneously store electronic apparatus ID information indicating that a type of the electronic apparatus 1000 that generates the user DB 1311 is the smartphone 1000A in the user DB 1311. The smartphone 1000A may store, for example, the user DB 1311 in a memory of the smartphone 1000A.

Figure 13B:
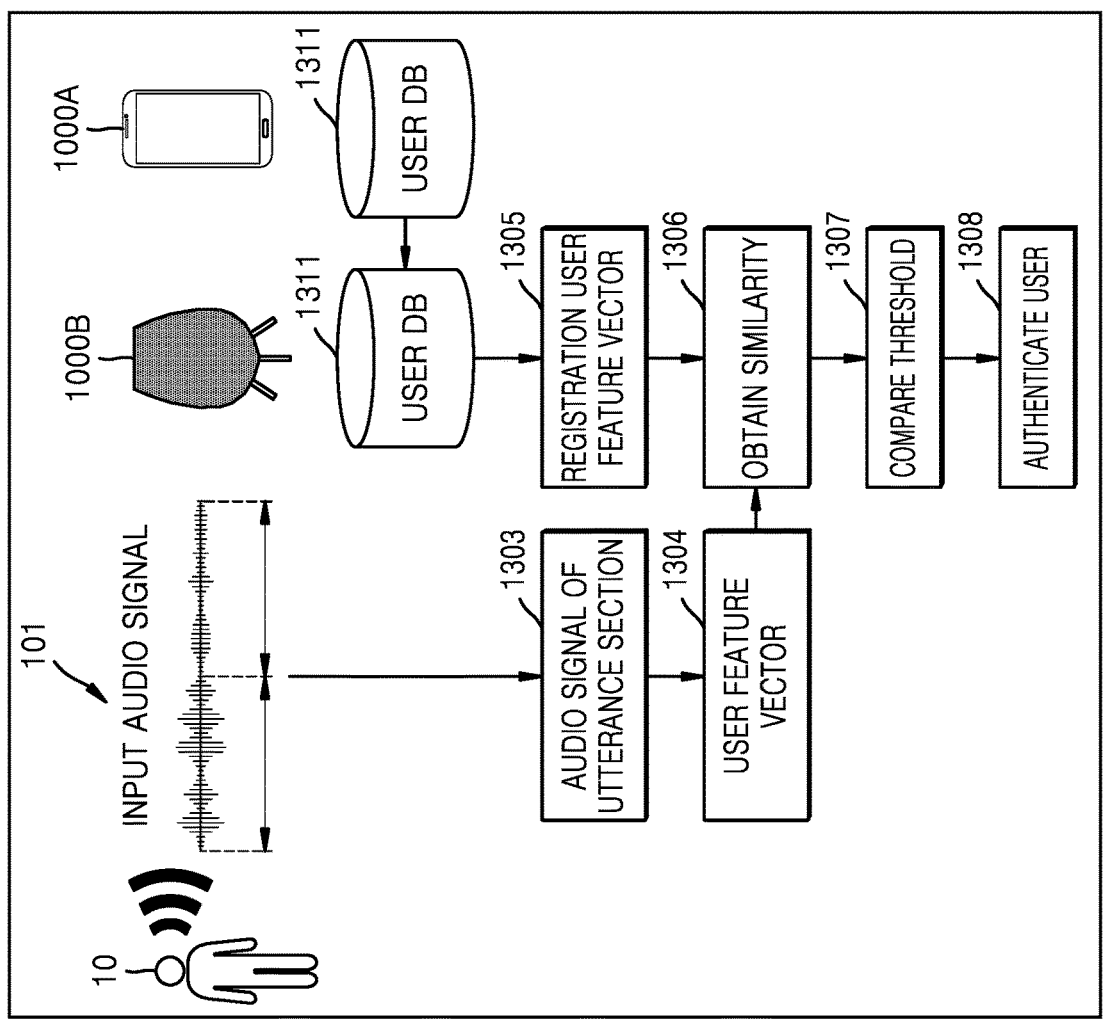
FIG. 13B is a diagram illustrating an environment in which a plurality of electronic apparatuses are used, according to an embodiment.

FIG. 13B is a diagram illustrating an environment in which a plurality of electronic apparatuses are used, according to an embodiment.

Meanwhile, referring to FIG. 13B, the electronic apparatus 1000 according to an embodiment may be an artificial intelligence (AI) speaker 1000B.

The AI speaker 1000B may receive, for example, the user DB 1311 from the smartphone 1000A. The AI speaker 1000B may store the user DB 1311 received from the smartphone 1000A in a memory of an AI speaker 1000B.

When the user 10 performs an utterance input to the AI speaker 1000B, the AI speaker 1000B may obtain the input audio signal 101 based on the utterance input of the user 10.

When the input audio signal 101 is obtained, the AI speaker 1000B may obtain an audio signal 1303 of the utterance section from the input audio signal 101, and obtain a user feature vector 1304 from the audio signal 1303 of the utterance section.

When the input audio signal 101 is obtained, the AI speaker 1000B may obtain a registration user feature vector 1305 from the user DB 1311.

The AI speaker 1000B may obtain a similarity between the user feature vector 1304 and the registration user feature vector 1305 at operation 1306, compare the obtained similarity with a threshold at operation 1307, and perform user authentication at operation 1308.

As described above, when the user 10 uses the plurality of electronic apparatuses 1000, each electronic apparatus 1000 may perform user authentication based on a user DB received from the other electronic apparatus 1000, and thus the user 10 may obtain the same result as registration performed on all the electronic apparatuses 1000 through an initial user registration with respect to any one of the electronic apparatuses 1000.

Meanwhile, in other embodiments, user registration and user authentication with respect to the user 10 of FIGS. 13A and 13B may be performed by the server 2000.

For example, in the user registration operation, the server 2000 may receive the registration audio signal 103 from the smartphone 1000A and obtain the input audio signal 1301 of the registration utterance section from the received registration audio signal 103. The server 2000 may obtain the registration user feature vector 1302 from the input audio signal 1301 of the registration utterance section, and store the obtained registration user feature vector 1302 in the user DB 1311.

For example, the server 2000 may generate the user DB 1311 in the user registration operation and simultaneously store electronic apparatus ID information indicating that the type of the electronic apparatus 1000 that generates the user DB 1311 is the smartphone 1000A in the user DB 1311. The server 2000 may store, for example, the user DB 1311 in a memory of the server 2000.

When the user 10 performs an utterance input to the AI speaker 1000B, the server 2000 may, for example, receive the input audio signal 101 from the AI speaker 1000B. When the input audio signal 101 is obtained, the server 2000 may obtain the audio signal 1303 of the utterance section from the input audio signal 101, and obtain the user feature vector 1304 from the audio signal 1303 of the utterance section.

When the input audio signal 101 is obtained, the server 2000 may obtain the registration user feature vector 1305 from the user DB 1311.

The server 2000 may obtain a similarity between the user feature vector 1304 and the registration user feature vector 1305 at operation 1306, compare the obtained similarity with a threshold at operation 1307, and perform user authentication at operation 1308.

As such, when the user 10 uses the plurality of electronic apparatuses 1000, the server 2000 may perform user authentication based on the same user DB, and thus the user 10 may obtain the same result as registration performed on all the electronic apparatuses 1000 through the initial user registration with respect to any one of the electronic apparatuses 1000.

Meanwhile, the smartphone 1000A and the AI speaker 100B may be different types of the electronic apparatuses 1000 and vary depending on, for example, the number of microphones included in each apparatus, sensitivity, resolution, etc. That is, audio signal processing performance of the smartphone 1000A and the AI speaker 1000B may be different from each other.

The electronic apparatus 1000 and/or the server 2000 using the user authentication method according to an embodiment may use an apparatus characteristic parameter value for removing a deviation in user authentication performance due to a difference in audio signal processing performance between the electronic apparatuses 1000.

Figure 14:
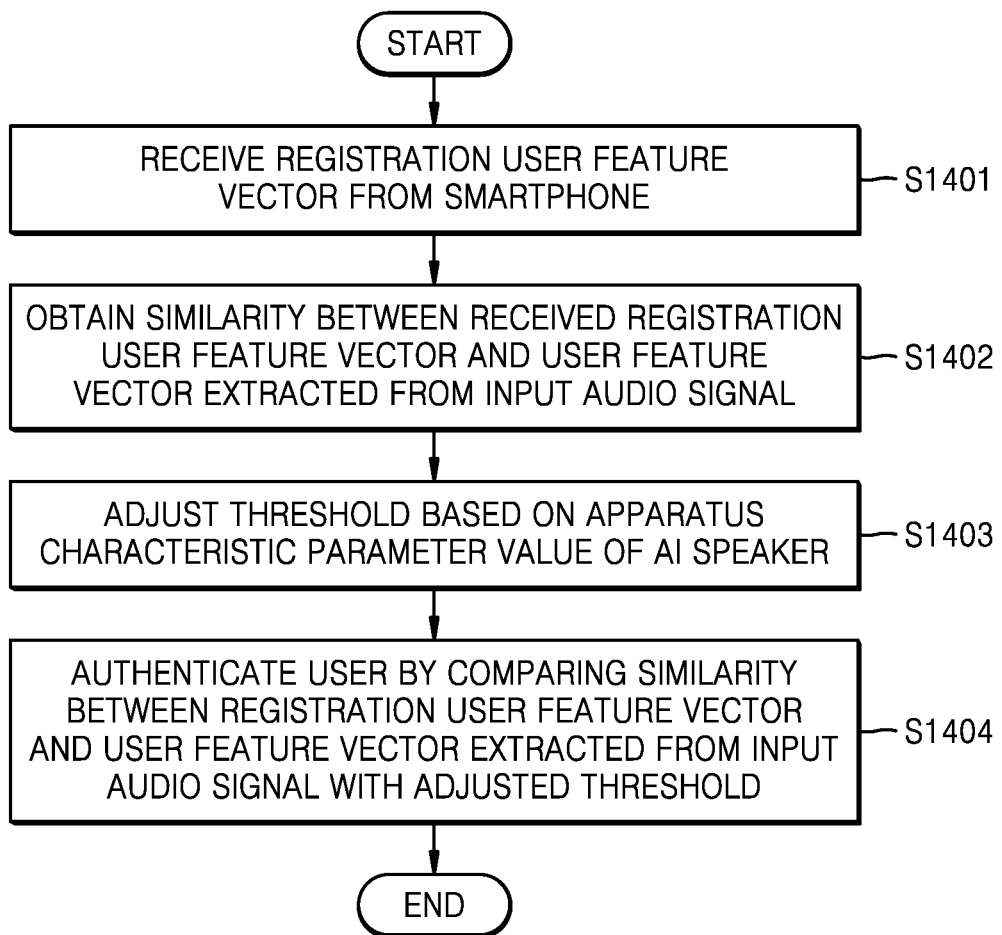
FIG. 14 is a flowchart illustrating a method of authenticating a user by using an adjusted threshold based on an apparatus characteristic parameter value, according to an embodiment.

FIG. 14 is a flowchart illustrating a method of authenticating a user using an adjusted threshold based on an apparatus characteristic parameter value according to an embodiment.

The apparatus characteristic parameter value may be set, for example, between different types of a plurality electronic apparatuses 1000.

The apparatus characteristic parameter value that may be used by the AI speaker 1000B may be, for example, previously set before a registration operation of the user 10, by measuring a difference in the audio signal processing performance of the smartphone 1000A and the AI speaker 10006.

For example, the smartphone 1000A may obtain a first audio signal based on a first utterance input of the user. The smartphone 1000A may obtain a user feature vector from the first audio signal. The smartphone 1000A may obtain a similarity between the user feature vector obtained from the first audio signal and a reference user feature vector. For example, the similarity between the user feature vectors obtained by the smartphone 1000A may have a scalar value of 0.99.

Meanwhile, the AI speaker 1000B may obtain, for example, a second audio signal based on the first utterance input of the user. The AI speaker 10006 may obtain the user feature vector from the second audio signal. The AI speaker 1000B may obtain a similarity between the user feature vector obtained from the second audio signal and the reference user feature vector. For example, the similarity between the user feature vectors obtained by the AI speaker 10006 may have a scalar value of 0.5.

The apparatus characteristic parameter value may be set, for example, based on a scalar value of 0.49 that is a deviation of the similarity of 0.99 between the user feature vectors obtained by the smartphone 1000A and the similarity of 0.5 between the user feature vectors obtained by the AI speaker 10006, with respect to the same first utterance input of the user.

Meanwhile, the smartphone 1000A may obtain, for example, a third audio signal in an environment in which the user does not perform an utterance input. The smartphone 1000A may obtain an environment feature vector from the third audio signal. The smartphone 1000A may obtain a similarity between the environment feature vector obtained from the third audio signal and a reference environment feature vector. For example, the similarity between the environmental feature vectors obtained by the smartphone 1000A may have a scalar value of 0.98.

Meanwhile, the AI speaker 1000B may obtain, for example, a fourth audio signal in the environment in which the user does not perform an utterance input. The AI speaker 10006 may obtain an environment feature vector from the fourth audio signal. The AI speaker 1000B may obtain a similarity between the environment feature vector obtained from the fourth audio signal and the reference environment feature vector. For example, the similarity between the environmental feature vectors obtained by the AI speaker 10006 may have a scalar value of 0.5.

The apparatus characteristic parameter value may be set, for example, based on a scalar value of 0.48 that is a deviation of the similarity of 0.98 between the environment feature vectors obtained by the smartphone 1000A and the similarity of 0.5 between the environment feature vectors obtained by the AI speaker 10006, with respect to the same environment in which the user does not perform an utterance input.

The apparatus characteristic parameter value may be set, for another example, based on a similarity between the environment feature vector obtained by the smartphone 1000A and the environment feature vector obtained by the AI speaker 1000B, with respect to the same environment in which the user does not perform an utterance input.

The apparatus characteristic parameter value that may be used by the AI speaker 1000B may be set or updated, for another example, by measuring a difference in the audio signal processing performance of the smartphone 1000A and the AI speaker 10006 after the registration operation of the user 10. In this case, the reference user feature vector and the reference environment feature vector used to set or update the apparatus characteristic parameter value may be the registration user feature vector and the registration environment feature vector obtained by the smartphone 1000A in the user registration operation.

Referring to FIG. 14, in operation S1401, the AI speaker 1000B that has obtained the input audio signal 101 may receive the registration user feature vector from the smartphone 1000A.

The AI speaker 1000B may receive, for example, the user DB 1311 from the smartphone 1000A. The AI speaker 1000B may obtain the registration user feature vector from the user DB 1311 received from the smartphone 1000A.

When the input audio signal 101 is obtained, the AI speaker 1000B may obtain an audio signal of an utterance section from the input audio signal 101 and extract a user feature vector from the audio signal of the utterance section.

In operation S1402, the AI speaker 1000B may obtain a similarity between the registration user feature vector and the user feature vector extracted from the input audio signal 101.

In operation S1403, the AI speaker 1000B may adjust a threshold used for user authentication based on the apparatus characteristic parameter value of the AI speaker 1000B. For example, the AI speaker 1000B may confirm that a type of the electronic apparatus 1000 that generates the user DB 1311 is the smartphone 1000A, based on the electronic apparatus ID information included in the user DB 1311 received from the smartphone 1000A.

The AI speaker 1000B which has confirmed that the type of the electronic apparatus 1000 that generates the user DB 1311 is the smartphone 1000A may adjust, for example, the threshold used for user authentication, based on the apparatus characteristic parameter value previously set in response to the difference in the user authentication performance of the smartphone 1000A and the AI speaker 1000B.

Meanwhile, considering even that the same type of electronic apparatuses 1000 may have a difference in the audio signal processing performance for each entity, the electronic apparatus 1000 may use the apparatus characteristic parameter value to remove a variation of user authentication performance between the same type of electronic apparatuses 1000.

The apparatus characteristic parameter value to remove the variation of the user authentication performance between the same type of electronic apparatuses 1000 may be set using the same method as a method of setting the apparatus characteristic parameter value to remove the deviation of the user authentication performance between the different types of electronic apparatuses 1000 described above.

For example, the electronic apparatus 1000 may adjust the threshold according to Equation 5 below.

$$TH_{final}=(TH_{base}+TH_{bias}+TH_{spk,bias})(1.0-w_s(1.0--S_r)-w_e(1.0-E_r)^2)$$ [Equation 5]

In Equation 5 above, $E_r$ denotes the energy ratio, $w_e$ denotes the weighted coefficient of the energy ratio, St denotes the similarity between the environment feature vectors, $w_s$ denotes the weighted coefficient of the similarity between the environment feature vectors, $TH_{base}$ denotes the one threshold selected from the threshold table, $TH_{spk\_bias}$ denotes a user characteristic parameter value, and $TH_{final}$ denotes the adjusted threshold.

Meanwhile, in other embodiments, the setting of the apparatus characteristic parameter value and the adjustment of the threshold based on the set apparatus characteristic parameter value may be performed by the server 2000. A specific example in which the setting of the apparatus characteristic parameter value and the adjustment of the threshold value based on the set apparatus characteristic parameter value is performed by the server 2000 will be described later with reference to the embodiments of FIG. 22 and FIG. 23.

Figure 15:
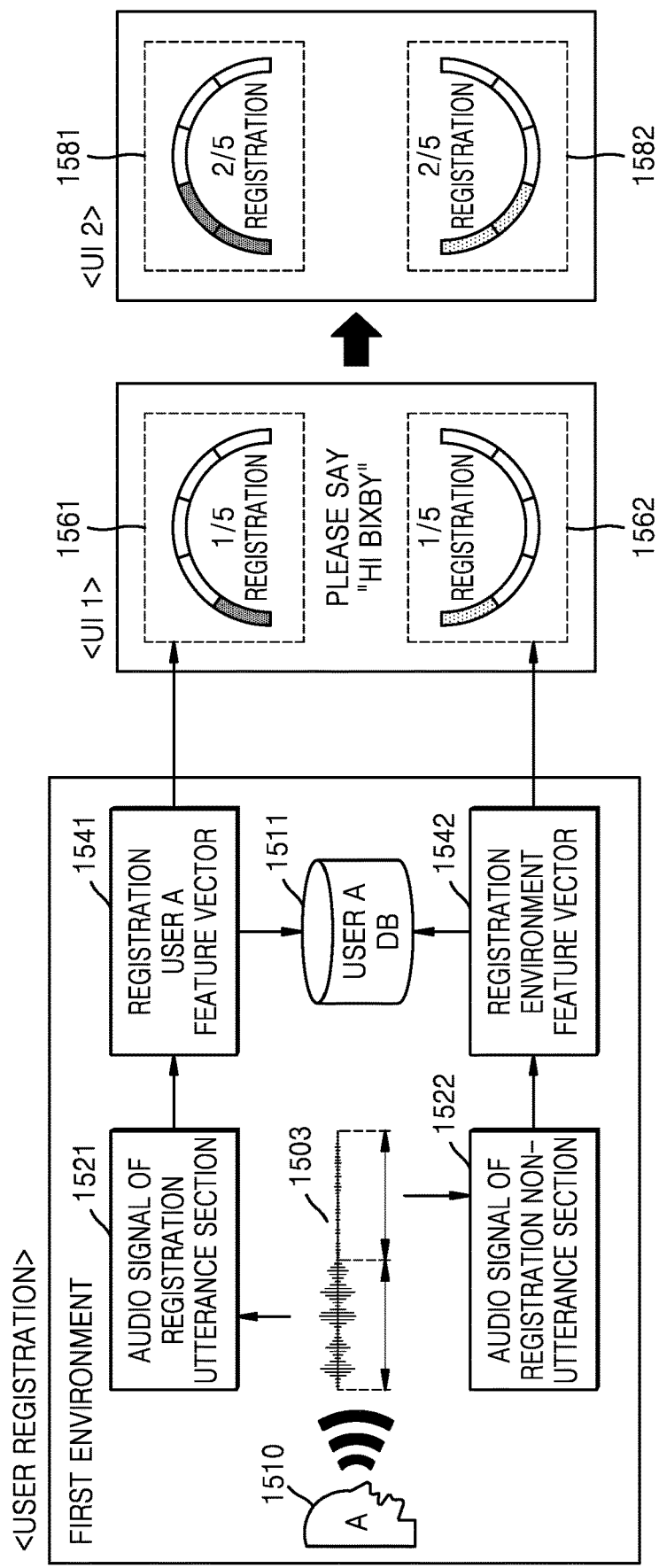
FIG. 15 is a diagram illustrating a user interface used in a user registration operation, according to an embodiment.

FIG. 15 is a diagram illustrating a user interface used in a user registration operation according to an embodiment.

Referring to FIG. 15, the electronic apparatus 1000 according to an embodiment may obtain a registration audio signal 1503 based on an utterance input of a user A 1510 in a first environment in a user registration operation.

The electronic apparatus 1000 may obtain an audio signal 1521 of a registration utterance section from the registration audio signal 1503. The electronic apparatus 1000 may obtain a registration user A feature vector 1541 from the obtained audio signal 1521 of the registration utterance section.

Meanwhile, the electronic apparatus 1000 may obtain an audio signal 1522 of a registration non-utterance section from the registration audio signal 1503. The electronic apparatus 1000 may obtain a registration environment feature vector 1542 from the obtained audio signal 1522 of the registration non-utterance section.

The electronic apparatus 1000 may generate the user A DB 1511 based on the registration user A feature vector 1541 obtained from the audio signal 1521 of the registration utterance section and the registration environment feature vector 1542 obtained from the audio signal 1522 of the registration non-utterance section.

For example, the electronic apparatus 1000 may display an interface relating to the user registration operation on a display of the electronic apparatus 1000 in a process of generating the user A DB 1511.

For example, the electronic apparatus 1000 may receive an utterance input corresponding to the registration audio signal 1503 from the user A 1510 of the first environment, thereby displaying through the interface that the audio signal 1521 of the registration utterance section necessary for generating the user A DB 1511 is normally obtained.

For another example, the electronic apparatus 1000 may receive an utterance input corresponding to the registration audio signal 1503 from the user A 1510 of the first environment, thereby displaying through the user interface that the registration user A feature vector 1541 necessary for generating the user A DB 1511 is normally obtained.

For example, while receiving the utterance input corresponding to the registration audio signal 1503 several times from the user A 1510 in the first environment, the electronic apparatus 1000 may display at least one of a message or a gauge indicating the normal obtaining number of times of the registration user A feature vector 1541 through the user interface stepwise at operation 1561 and operation 1581.

Meanwhile, for example, the electronic apparatus 1000 receives the utterance input corresponding to the registration audio signal 1503 from the user A 1510 of the first environment, thereby displaying that the audio signal 1522 of the registration non-utterance section necessary for generating the user A DB 1511 is normally obtained.

For another example, the electronic apparatus 1000 may receive the utterance input corresponding to the registration audio signal 1503 from the user A 1510 of the first environment, thereby displaying through the user interface that the registration environment feature vector 1542 necessary for generating the user A DB 1511 is normally obtained.

For example, while receiving the utterance input corresponding to the registration audio signal 1503 several times from the user A 1510 in the first environment, the electronic apparatus 1000 may display at least one of a message or a gauge indicating the normal obtaining number of times of the registration environment feature vector 1542 through the user interface stepwise at operation 1562 and operation 1582.

Figure 16:
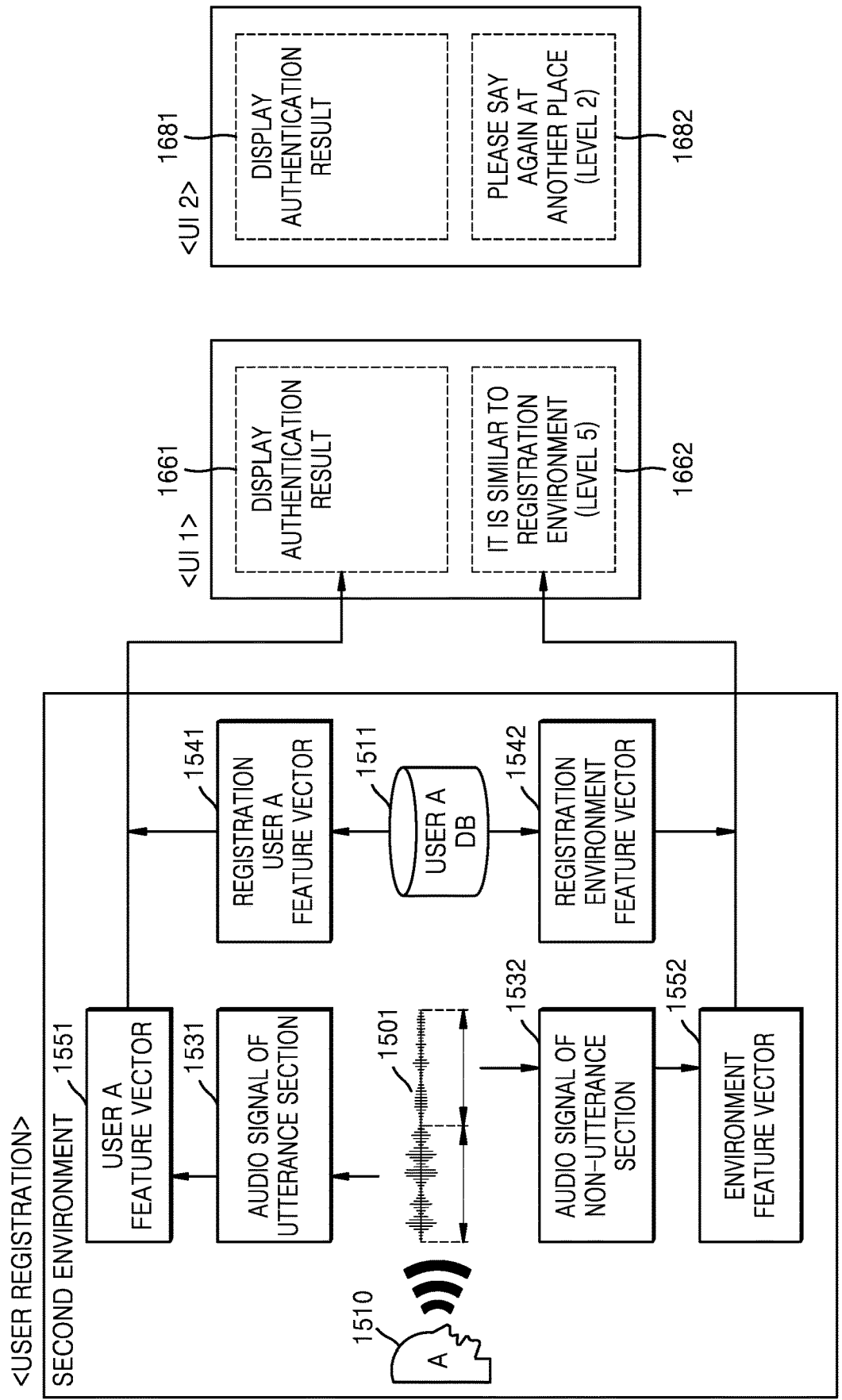
FIG. 16 is a diagram illustrating a user interface used in a user authentication process, according to an embodiment.

FIG. 16 is a diagram illustrating a user interface used in a user authentication process according to an embodiment.

Referring to FIG. 16, the electronic apparatus 1000 according to an embodiment may obtain an input audio signal 1501 based on an utterance input of the user A 1510 in a second environment in a user authentication operation.

The electronic apparatus 1000 may obtain an audio signal 1531 of an utterance section from the input audio signal 1501. The electronic apparatus 1000 may extract a user A feature vector 1551 from the obtained audio signal 1531 of the utterance section.

When the input audio signal 1501 is obtained, the electronic apparatus 1000 may obtain the registration user A feature vector 1541 from the user A DB 1511 generated previously in the user registration operation.

The electronic apparatus 1000 may obtain a similarity between the user A feature vector 1551 extracted from the audio signal 1531 of the utterance section and the registration user A feature vector 1541 obtained from the user A DB 1511, and perform authentication on the user A 1510.

For example, the electronic apparatus 1000 may display an interface related to the user authentication process on a display of the electronic apparatus 1000 in the process of performing authentication on the user A 1510. For example, the electronic apparatus 1000 may display an authentication result with respect to the user A 1510 through the interface at operation 1661 and operation 1681.

Meanwhile, the electronic apparatus 1000 may obtain an audio signal 1532 of a non-utterance section from the input audio signal 1501. The electronic apparatus 1000 may extract an environment feature vector 1552 from the obtained audio signal 1532 of the non-utterance section.

When the input audio signal 1501 is obtained, the electronic apparatus 1000 may obtain the registration environment feature vector 1542 from the user A DB 1511 generated previously in the user registration operation.

The electronic apparatus 1000 may obtain a similarity between the environment feature vector 1552 extracted from the audio signal 1532 of the non-utterance section and the registration environment feature vector 1542 obtained from the user A DB 1511, and determine a degree of similarity between the first environment and the second environment.

For example, the electronic apparatus 1000 may display a determination result with respect to the degree of similarity between the first environment and the second environment through the interface.

For example, the electronic apparatus 1000 may display a degree of similarity between the environment feature vector 1552 and the registration environment feature vector 1542 in units of levels at operation 1662 and operation 1682. For example, the electronic apparatus 1000 may display the degree of similarity between the environment feature vector 1552 and the registration environment feature vector 1542 as any one level between a level 1 having the lowest degree of similarity and a level 5 having the highest degree of similarity.

For example, the electronic apparatus 1000 may display a message requesting the user A 1510 to again input the input audio signal 1501 on the user interface based on the degree of similarity between the environment feature vector 1552 and the registration environment feature vector 1542.

For example, as a result of comparing the environment feature vector 1552 and the registration environment feature vector 1542, the electronic apparatus 1000 may determine that the degree of similarity between the environment feature vector 1552 and the registration environment feature vector 1542 is lower than a certain reference level.

Based on the result of determination, the electronic apparatus 1000 may display a message 'Please say again at another place' requesting the user A 1510 to again perform an utterance input in an environment other than the second environment on the user interface at operation 1682.

Figure 17:
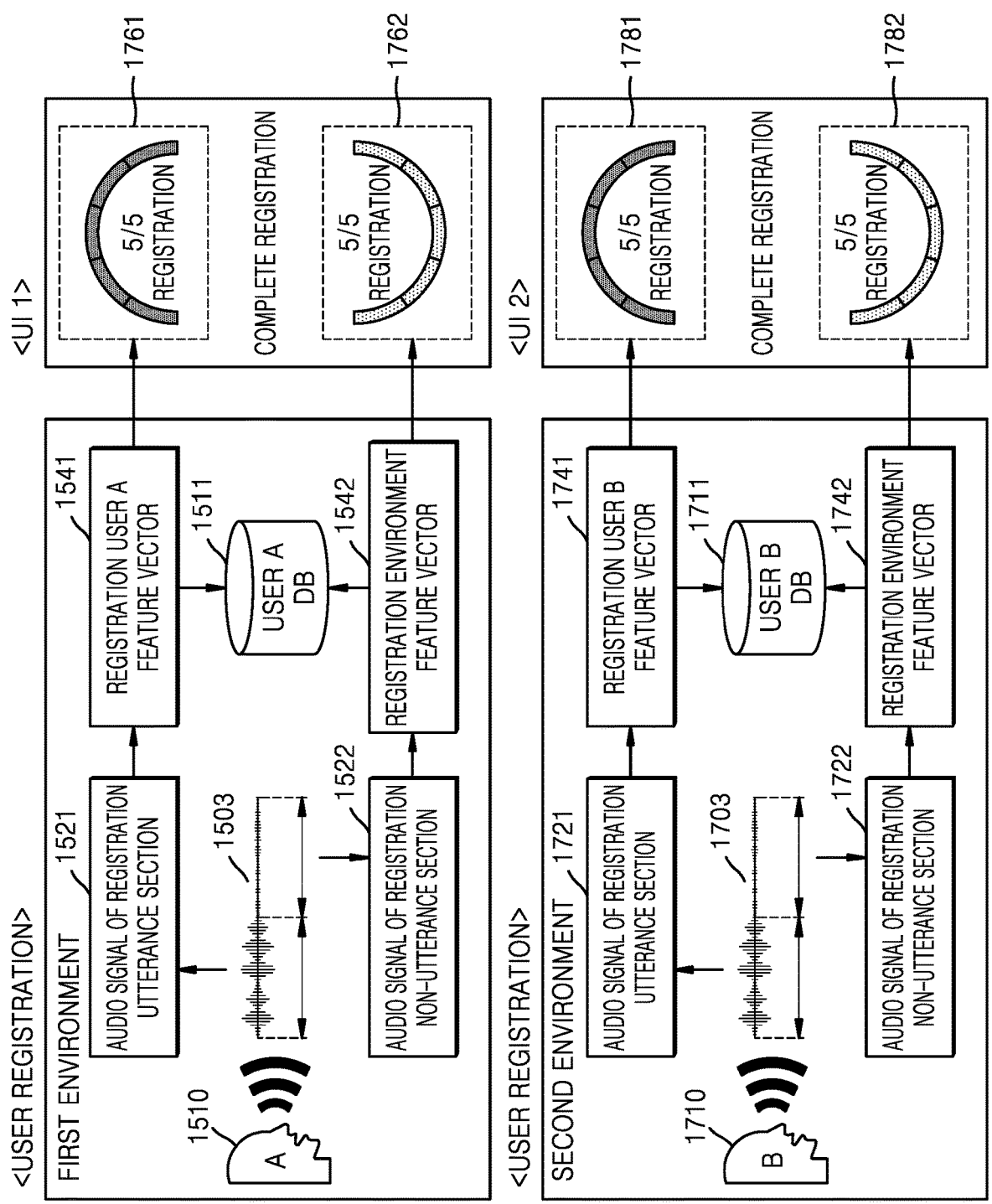
FIG. 17 is a diagram illustrating a user registration operation with respect to a plurality of users, according to an embodiment.

FIG. 17 is a diagram illustrating a user registration operation with respect to a plurality of users according to an embodiment.

Referring to FIG. 17, the electronic apparatus 1000 according to an embodiment may obtain the registration audio signal 1503 based on an utterance input of the user A 1510 in a first environment during a user registration process.

The electronic apparatus 1000 may obtain the obtained audio signal 1521 of the registration utterance section from the registration audio signal 1503. The electronic apparatus 1000 may extract the registration user A feature vector 1541 from the obtained audio signal 1521 of the registration utterance section.

Meanwhile, the electronic apparatus 1000 may obtain the audio signal 1522 of the registration non-utterance section from the registration audio signal 1503. The electronic apparatus 1000 may obtain the registration environment feature vector 1542 from the obtained audio signal 1522 of the registration non-utterance section.

The electronic apparatus 1000 may generate the user A DB 1511 based on the registration user A feature vector 1541 obtained from the audio signal 1521 of the registration utterance section and the registration environment feature vector 1542 obtained from the audio signal 1522 of the registration non-utterance section.

For example, the electronic apparatus 1000 may receive an utterance input corresponding to the registration audio signal 1503 from the user A 1510 of the first environment, thereby displaying through the interface that the registration user A feature vector 1541 and the registration environment feature vector 1542 are normally obtained.

For example, the electronic apparatus 1000 that receives the utterance input corresponding to the registration audio signal 1503 five times from the user A 1510 in the first environment may display at least one of a gauge indicating the obtaining number of times the registration user A feature vector 1541 and the registration environment feature vector 1542 or a message indicating the registration completion through the user interface at operation 1761 and operation 1762.

Referring to FIG. 17 again, the electronic apparatus 1000 according to an embodiment may obtain a registration audio signal 1703 based on an utterance input of a user B 1710 in a second environment during a user registration process.

The electronic apparatus 1000 may obtain an audio signal 1721 of the registration utterance section from the registration audio signal 1703. The electronic apparatus 1000 may extract a registration user B feature vector 1741 from the obtained audio signal 1721 of the registration utterance section.

Meanwhile, the electronic apparatus 1000 may obtain an audio signal 1722 of the registration non-utterance section from the registration audio signal 1703. The electronic apparatus 1000 may obtain a registration environment feature vector 1742 from the obtained audio signal 1722 of the registration non-utterance section.

The electronic apparatus 1000 may generate a user B DB 1711 based on the registration user B feature vector 1741 obtained from the audio signal 1721 of the registration utterance section and the registration environment feature vector 1742 obtained from the audio signal 1722 of the registration non-utterance section.

For example, the electronic apparatus 1000 may receive an utterance input corresponding to the registration audio signal 1703 from the user B 1710 of the second environment, thereby displaying through the interface that the registration user B feature vector 1741 and the registration environment feature vector 1742 are normally obtained.

For example, the electronic apparatus 1000 that receives the utterance input corresponding to the registration audio signal 1703 five times from the user B 1710 in the second environment may display at least one of a gauge indicating the obtaining number of times the registration user B feature vector 1741 and the registration environment feature vector 1742 or a message indicating the registration completion through the user interface at operation 1781 and operation 1782.

FIG. 15, FIG. 16, and FIG. 17 illustrate embodiments in which the electronic apparatus 1000 displays information about obtaining a user feature vector and an environment feature vector on an interface through a message and a gauge but the information about obtaining the user feature vector and the environment feature vector may be transmitted by information transmitting means such as symbols, sentences, colors, and voices, in addition to the messages and the gauge and the embodiments are not limited thereto.

Figure 18:
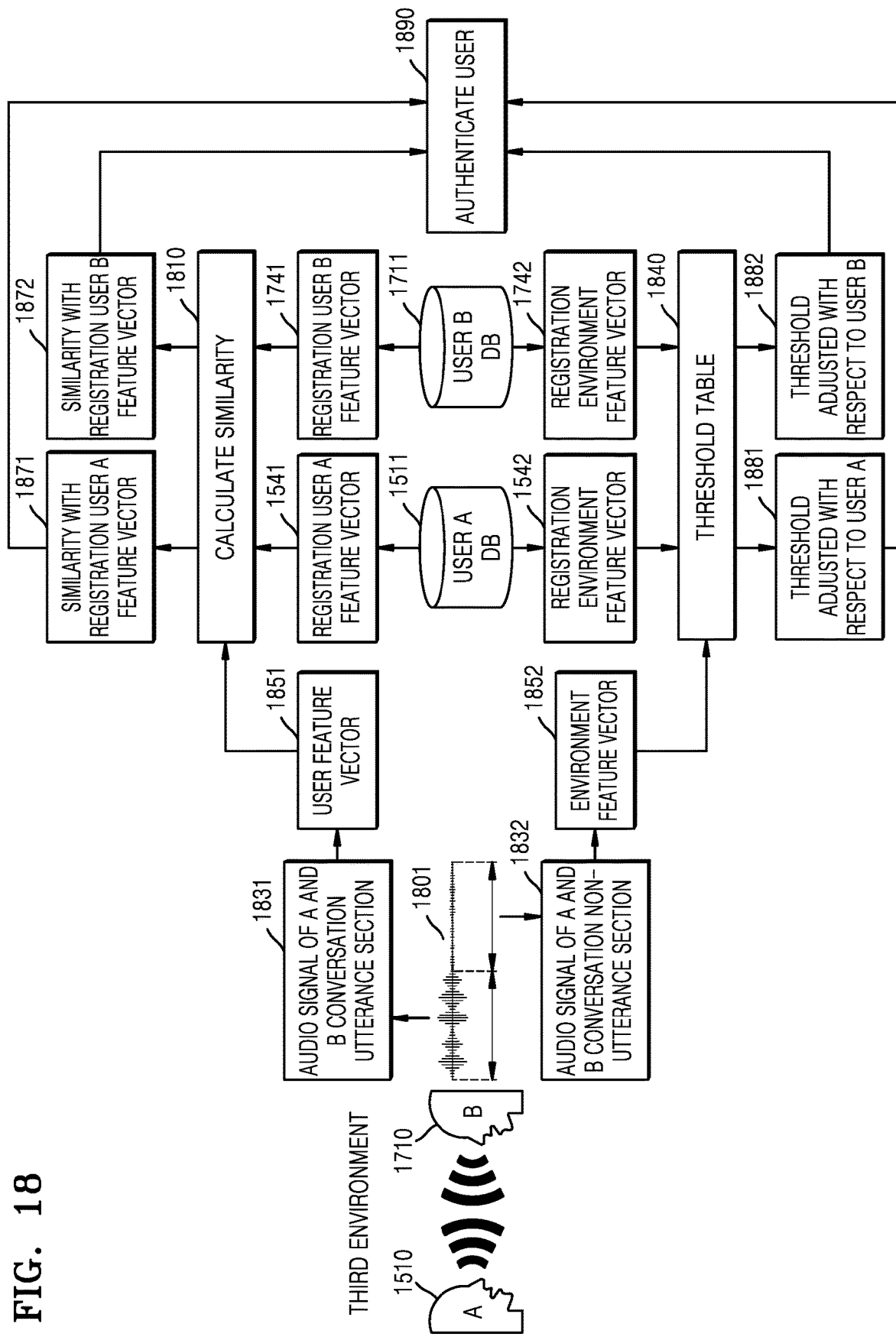
FIG. 18 is a diagram illustrating a user authentication process based on conversation of a plurality of users, according to an embodiment.

FIG. 18 is a diagram illustrating a user authentication process based on conversation of a plurality of users according to an embodiment.

Referring to FIG. 17 and FIG. 18, the electronic apparatus 1000 according to an embodiment may perform user authentication based on an utterance input by a conversation between the user A 1510 and the user B 1710 in a third environment, other than a first environment and a second environment in which user registration on each of the user A 1510 and the user B 1710 is performed.

That is, in an embodiment, the first environment and the second environment in which the electronic apparatus 1000 receives the utterance input from the user A 1510 and the user B 1710 may be different environments, and the third environment in which the electronic apparatus 1000 receives the utterance input by the conversation between the user A 1510 and the user B 1710 may also be different from the first environment and the second environment.

For example, the electronic apparatus 1000 may distinguish and obtain an audio signal 1831 of an A and B conversation utterance section and an audio signal 1832 of an A and B conversation non-utterance section from an input audio signal 1801 obtained based on the utterance input by the conversation between the user A 1510 and the user B 1710. The audio signal 1831 of the A and B conversation utterance section may include, for example, at least one of an audio signal by utterance of the user A 1510 or an audio signal by utterance of the user B 1710.

The electronic apparatus 1000 may extract an audio feature from the audio signal 1831 of the A and B conversation utterance section, and obtain a user feature vector 1851 from the extracted audio feature.

The electronic apparatus 1000 may compare the user feature vector 1851 obtained with respect to the audio signal 1831 of the A and B conversation utterance section with each of the registration user A feature vector 1541 obtained from the user A DB 1511 and the registration user B feature vector 1741 obtained from the user B DB 1711 to calculate similarity at operation 1810.

For example, the electronic apparatus 1000 may obtain the user feature vector 1851 from an audio signal in units of a certain frame included in the audio signal 1831 of the A and B conversation utterance section. The electronic apparatus 1000 may compare the obtained user feature vector 1851 with each of the registration user A feature vector 1541 and the registration user B feature vector 1741 to obtain a similarity 1871 with a registration user B feature vector and a similarity 1872 with a registration user B feature vector.

For another example, the electronic apparatus 1000 may obtain a user feature vector 1651 from an audio signal of an utterance unit included in an audio signal 1631 of the A and B conversation utterance sections. The electronic apparatus 1000 may compare the obtained user feature vector 1851 with each of the registration user A feature vector 1541 and the registration user B feature vector 1741 to obtain the similarity 1871 with the registration user A feature vector and the similarity 1872 with the registration user B feature vector.

Meanwhile, the electronic apparatus 1000 may extract an audio feature from the audio signal 1832 of the A and B conversation non-utterance sections, and obtain an environment feature vector 1852 from the extracted audio feature.

For example, the electronic apparatus 1000 may compare the environment feature vector 1852 obtained with respect to the audio signal 1832 of the A and B conversation non-utterance sections and the registration environment feature vector of the user A 1542 obtained from the user A DB 1511 to obtain similarity.

The electronic apparatus 1000 may adjust any one threshold selected from a threshold table 1840, based on the similarity between the environment feature vector 1852 and the registration environment feature vector of the user A1542, to obtain an adjusted threshold 1881 with respect to the user A 1510.

Meanwhile, for example, the electronic apparatus 1000 may compare the environment feature vector 1852 obtained with respect to the audio signal 1832 of the A and B conversation non-utterance section and the registration environment feature vector 1742 of the user B obtained from the user B DB 1711 to obtain similarity.

The electronic apparatus 1000 may adjust any one threshold selected from the threshold table 1840 based on the similarity between the environment feature vector 1852 and the registration environment feature vector 1742 of the user B, and to obtain an adjusted threshold 1882 with respect to the user B 1710.

The electronic apparatus 1000 may perform user authentication by comparing the similarity 1871 with the registration user B feature vector and the similarity 1872 with the registration user B feature vector with an adjusted threshold with respect to each user at operation 1890.

For example, the electronic apparatus 1000 may perform user identification by comparing the obtained similarity 1871 with the registration user A feature vector and the similarity 1872 with the registration user B feature vector. That is, the electronic apparatus 1000 may determine which user's utterance input between the user A 1510 and the user B 1710 corresponds to an audio signal corresponding to the user feature vector 1851.

For example, the electronic apparatus 1000 may perform user authentication on the user A 1510 and the user B 1710 based on a user identification result.

For example, when it is determined that the audio signal corresponding to the user feature vector 1851 corresponds to an utterance input of the user A 1510, the electronic apparatus 1000 may perform authentication on the user A 1510 by comparing the similarity 1871 with the registration user A feature vector with respect to the user feature vector 1851 and the adjusted threshold 1881 with respect to the user A 1510.

For example, when it is determined that the audio signal corresponding to the user feature vector 1851 corresponds to an utterance input of the user B 1710, the electronic apparatus 1000 may perform authentication on the user B 1710 by comparing the similarity 1872 with the registration user B feature vector with respect to the user feature vector 1651 and the adjusted threshold 1882 with respect to the user B 1710.

As such, the electronic apparatus 1000 and/or the server 2000 using the user authentication method according to an embodiment may individually adjust a threshold used for authentication on each user based on an environment feature vector corresponding to a registration environment of each user, with respect to a plurality of users who input audio signals, thereby preventing a degradation of user authentication performance due to a difference in the user registration environment of each user.

On the other hand, in other embodiments, at least one of user authentication operations based on the utterance input by conversation between the user A 1510 and the user B 1710 in the third environment of FIG. 18 may be performed by the server 2000.

Figure 19:
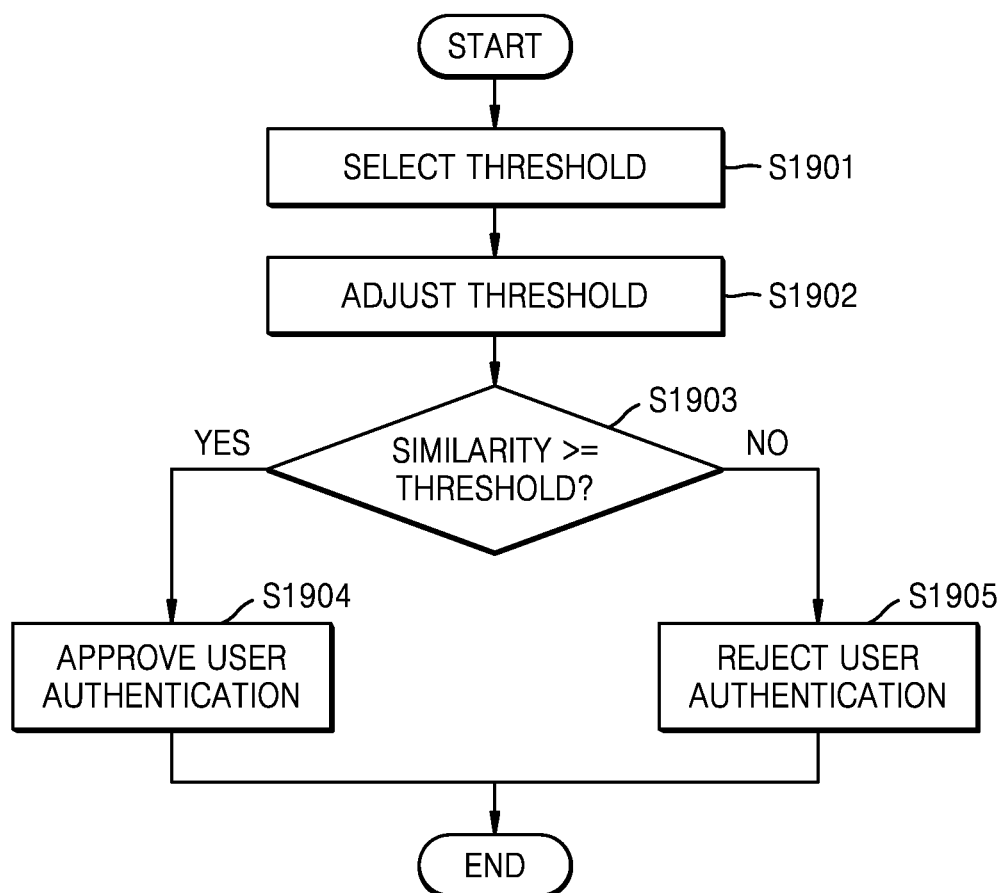
FIG. 19 is a flowchart illustrating a method of authenticating a user by using an adjusted an authentication criterion, according to an embodiment.

FIG. 19 is a flowchart illustrating a method of authenticating a user using an adjusted threshold according to an embodiment.

In operation S1901, the electronic apparatus 1000 may select any one threshold from a threshold table.

In operation S1902, the electronic apparatus 1000 may adjust any one threshold selected from the threshold table based on at least one threshold adjustment method of threshold adjustment methods according to the embodiments of FIG. 11 to FIG. 14.

In operation S1903, the electronic apparatus 1000 may compare a similarity between a user feature vector obtained from an audio signal of an utterance section of the input audio signal 101 and a registration user feature vector obtained from an audio signal of a registration utterance section of the registration audio signal 103 and the threshold adjusted in operation S1902.

As a result of comparison, when the calculated similarity is greater than or equal to a preset threshold, the electronic apparatus 1000 may approve user authentication in operation S1904.

For example, when the calculated similarity is greater than or equal to the preset threshold, the electronic apparatus 1000 may determine that a user who performs an utterance input corresponding to the registration audio signal 103 and a user who performs an utterance input corresponding to the input audio signal 101 are the same user and approve user authentication.

Conversely, as a result of comparison, when the calculated similarity is less than the preset threshold, the electronic apparatus 1000 may reject user authentication in operation S1905.

For example, when the calculated similarity is less than the preset threshold, the electronic apparatus 1000 may determine that the user who performs an utterance input corresponding to the registration audio signal 103 and the user who performs an utterance input corresponding to the input audio signal 101 are not the same user and reject user authentication.

Meanwhile, in other embodiments, at least one of threshold selection at operation S1901 to user authentication approval at operation S1904, or user authentication rejection at operation S1905 of FIG. 19 may be performed by the server 2000.

Figure 20:
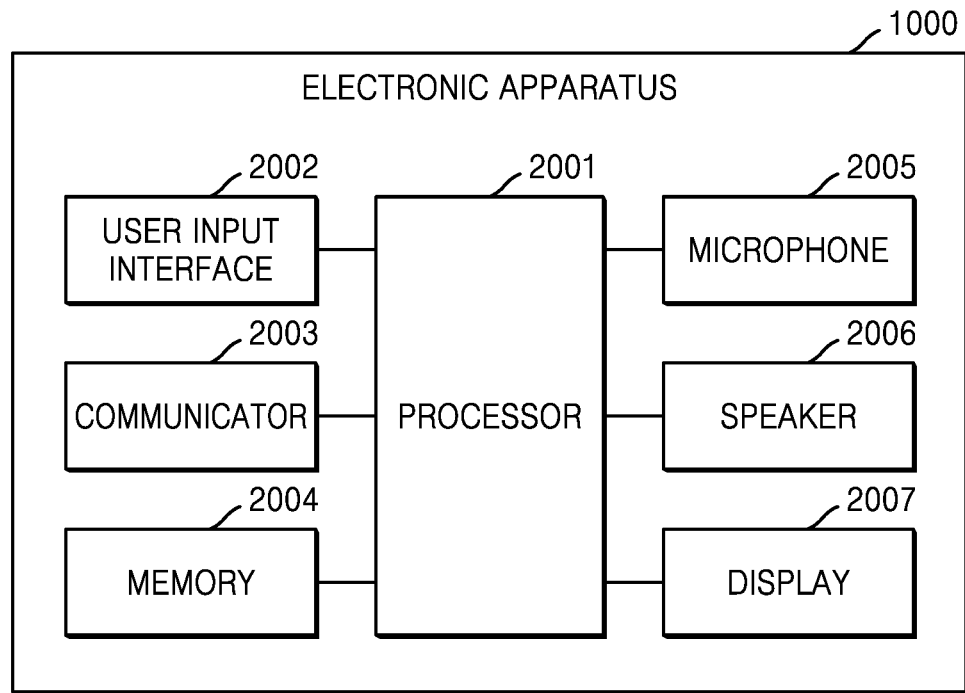
FIG. 20 is a block diagram of a configuration of an electronic apparatus according to an embodiment.

FIG. 20 is a block diagram of a configuration of the electronic apparatus 1000 according to an embodiment.

Referring to FIG. 20, the electronic apparatus 1000 according to an embodiment may include a processor 2001, a user input interface 2002, a communicator 2003, a memory 2004, a microphone 2005, a speaker 2006, and a display 2007.

The user input interface 2002 may receive a user input for controlling an operation of the electronic apparatus 1000. For example, the user input interface 2002 may include a key pad, a microphone, a dome switch, a touch pad (for example a contact capacitance type, a pressure resistive type, an infrared ray detection type, a surface ultrasonic wave conduction type, an integral tension measurement type, a piezo effect type, etc.), a jog wheel, a jog switch, and the like, but the disclosure is not limited thereto.

The communicator 2003 may include one or more communication modules for communicating with a server. For example, the communicator 2003 may include at least one of a short-range wireless communicator or a mobile communicator.

The short-range wireless communicator may include a Bluetooth communicator, a Bluetooth low energy (BLE) communicator, a near field communicator, a WLAN communicator, a WLAN (WiFi) communicator, a Zigbee communicator, an infrared data association (IrDA) communicator, a Wi-Fi direct (WFD) communicator, an ultra wideband (UWB) communicator, an Ant+ communicator, etc., but the disclosure is not limited thereto.

The mobile communicator may transmit and receive a radio signal to and from at least one of a base station, an external terminal, or a server on a mobile communication network. Here, the radio signal may include various types of data according to a speech call signal, a video call signal, or a text/multimedia message transmission/reception.

The memory 2004 may store programs for controlling the operation of the electronic apparatus 1000. The memory 2004 may include at least one instruction for controlling the operation of the electronic apparatus 1000. The programs stored in the memory 2004 may be classified into a plurality of modules according to their functions.

The memory 2004 may store, for example, a user DB corresponding to a registration user. The user DB may include, for example, at least one of a registration audio signal, a registration user feature vector corresponding to a user who inputs the registration audio signal, or a registration environment feature vector indicating an environment in which an utterance input corresponding to the registration audio signal is received.

The memory 2004 may store, for example, an AM for distinguishing an audio signal into an audio signal of an utterance section and an audio signal of a non-utterance section, a DNN model for obtaining a user feature vector from the audio signal of the utterance section, a DNN model used to remove an environment component from the user feature vector, a DNN model for obtaining an environment feature vector, etc.

The memory 2004 may store, for example, a threshold table including a plurality of thresholds used for user authentication and a threshold table used for updating the user DB.

For example, the memory 120 may include at least one type storage medium of a flash memory type, a hard disk type, a multimedia card micro type, a card type memory (e.g., SD or XD memory, etc.), random access memory (RAM), static random access memory (SRAM), read only memory (ROM), electrically erasable programmable read-only memory (EEPROM), programmable read-only memory (PROM), a magnetic memory, a magnetic disk, or an optical disk but is not limited thereto.

The microphone 2005 may receive sound around the electronic apparatus 1000. When a user performs an utterance input, the sound input through the microphone 2005 may include, for example, at least one of a speech of the user or noise around the electronic apparatus 1000.

The speaker 2006 may output an audio signal received from the communicator 2003 or stored in the memory 2004 as sound. The speaker 2006 may output a signal related to a function (e.g., a call signal reception sound, a message reception sound, and a notification sound) performed by the electronic apparatus 1000 as sound.

The display 2007 may display and output information processed by the electronic apparatus 1000. For example, the display 2007 may display an interface for controlling the electronic apparatus 1000, an interface for displaying a state of the electronic apparatus 1000, etc.

The display 2007 may display, for example, a result of performing user authentication, that is, a result message regarding user authentication approval and user authentication rejection.

Meanwhile, if the display 2007 and a touch pad are configured for example as a touch screen in a layer structure, the display 2007 may be used as an input apparatus in addition to as an output apparatus.

The processor 2001 may generally control the overall operation of the electronic apparatus 1000. For example, the processor 2001 may generally control the user input interface 2002, the communicator 2003, the memory 2004, the microphone 2005, the speaker 2006, and the display 2007 by executing the programs stored in the memory 2004.

The processor 2001 may obtain an input audio signal based on an utterance input of the user 10. The processor 2001 may distinguish at least one audio signal of an utterance section and at least one audio signal of a non-utterance section from the input audio signal.

The processor 2001 may generate environment information indicating a situation in which an utterance input is received based on the audio signal of the non-utterance section. The processor 2001 may adjust an authentication criterion for authenticating the user 10, based on a comparison result of the generated environment information and registration environment information indicating an environment in which an utterance input corresponding to a previously registered registration audio signal with respect to the user 10 is received. The processor 2001 may authenticate the user 10 based on the adjusted authentication criterion and the input audio signal.

The processor 2001 may split the input audio signal into units of preset frames, extract audio features of the split frames, and based on the extracted audio features, distinguish or obtain frames corresponding to the utterance section and frames corresponding to the non-utterance section among the split frames. The processor 2001 may generate the environment information by using audio features of the frames corresponding to the non-utterance section.

The processor 2001 may obtain a previously registered registration audio signal to authenticate the user, obtain an audio signal of a registration utterance section from the registration audio signal, and compare the audio signal of the utterance section with the obtained audio signal of the registration utterance section to authenticate the user.

For example, the registration audio signal may include at least one audio signal of a registration utterance section and at least one audio signal of a registration non-utterance section and the audio signal of the registration non-utterance section may be used to generate registration environment information indicating a situation in which an utterance input corresponding to the registration audio signal is received.

The processor 2001 may adjust a threshold of similarity between the audio signal of the utterance section and the audio signal of the registration utterance section.

The processor 2001 may select any one threshold corresponding to a length of the utterance section and a length of the registration utterance section from the preset threshold table, and adjust the selected threshold, based on a comparison result of the environment information and the registration environment information.

The processor 2001 may adjust the selected threshold based on a similarity between a vector corresponding to the environment information and a vector corresponding to the registration environment information.

The processor 2001 according to an embodiment, may, for example, perform an AI operation. The processor 2001 may be, for example, any one of a central processing unit (CPU), a graphics processing unit (GPU), a neural processing unit (NPU), a field programmable gate array (FPGA), and an application specific integrated circuit (ASIC), but is not limited thereto.

Figure 21:
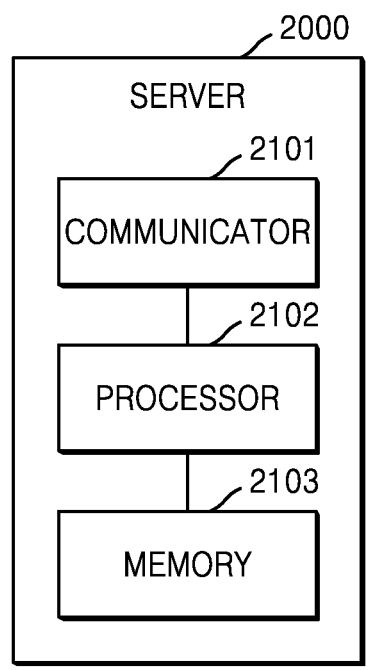
FIG. 21 is a block diagram illustrating a configuration of a server according to an embodiment.

FIG. 21 is a block diagram illustrating a configuration of the server 2000 according to an embodiment.

A user authentication method according to an embodiment may be performed by the electronic apparatus 1000 and/or the server 2000 connected to the electronic apparatus 1000 through wired or wireless communication.

Referring to FIG. 21, the server 2000 according to an embodiment may include a communicator 2101, a processor 2102, and a memory 2103.

Specific examples in which the user authentication method according to an embodiment are performed by the electronic apparatus 1000 and the server 2000 connected to the electronic apparatus 1000 through wired or wireless communication will be described later with reference to FIG. 22 and FIG. 23.

The communicator 2101 may include one or more communication modules for communicating with the electronic apparatus 1000. For example, the communicator 2101 may include at least one of a short-range wireless communicator or a mobile communicator.

The short-range wireless communicator may include a Bluetooth communicator, a Bluetooth low energy (BLE) communicator, a near field communicator, a WLAN communicator, a WLAN (WiFi) communicator, a Zigbee communicator, an infrared data association (IrDA) communicator, a Wi-Fi direct (WFD) communicator, an ultra wideband (UWB) communicator, an Ant+ communicator, etc., but the disclosure is not limited thereto.

The mobile communicator may transmit and receive a radio signal to and from at least one of a base station, an external terminal, or a server on a mobile communication network. Here, the radio signal may include various types of data according to a speech call signal, a video call signal, or a text/multimedia message transmission/reception.

The memory 2103 may store programs for controlling an operation of the server 2000. The memory 2103 may include at least one instruction for controlling the operation of the server 2000.

The memory 2103 may store, for example, a user DB corresponding to a registration user. The user DB may include, for example, at least one of a registration audio signal, a registration user feature vector corresponding to a user who inputs the registration audio signal, or a registration environment feature vector indicating an environment in which an utterance input corresponding to the registration audio signal is received.

The memory 2103 may store, for example, an AM for distinguishing an audio signal into an audio signal of an utterance section and an audio signal of a non-utterance section, a DNN model for obtaining a user feature vector from the audio signal of the utterance section, a DNN model used to remove an environment component from the user feature vector, a DNN model for obtaining an environment feature vector, etc.

The memory 2103 may store, for example, a threshold table including a plurality of thresholds used for user authentication and a threshold table used for updating the user DB.

The processor 2102 may generally control the overall operation of the server 2000. For example, the processor 2102 may generally control the communicator 2101 and the memory 2103 by executing the programs stored in the memory 2103.

The processor 2102 may obtain an input audio signal based on an utterance input of the user 10. The processor 2102 may distinguish at least one audio signal of an utterance section and at least one audio signal of a non-utterance section from the input audio signal.

The processor 2102 may generate environment information indicating a situation in which an utterance input is received based on the audio signal of the non-utterance section. The processor 2102 may adjust an authentication criterion for authenticating the user 10, based on a comparison result of the generated environment information and registration environment information indicating an environment in which an utterance input corresponding to a previously registered registration audio signal with respect to the user 10 is received. The processor 2102 may authenticate the user 10 based on the adjusted authentication criterion and the input audio signal.

The processor 2102 may split the input audio signal into units of preset frames, extract audio features of the split frames, and based on the extracted audio features, distinguish or obtain frames corresponding to the utterance section and frames corresponding to the non-utterance section among the split frames. The processor 2102 may generate the environment information by using audio features of the frames corresponding to the non-utterance section.

The processor 2102 may obtain a previously registered registration audio signal to authenticate the user 10, obtain an audio signal of a registration utterance section from the registration audio signal, and compare the audio signal of the utterance section with the obtained audio signal of the registration utterance section to authenticate the user 10.

For example, the registration audio signal may include at least one audio signal of a registration utterance section and at least one audio signal of a registration non-utterance section and the audio signal of the registration non-utterance section may be used to generate registration environment information indicating a situation in which an utterance input corresponding to the registration audio signal is received.

The processor 2102 may adjust a threshold of similarity between the audio signal of the utterance section and the audio signal of the registration utterance section.

The processor 2102 may select any one threshold corresponding to a length of the utterance section and a length of the registration utterance section from the preset threshold table, and adjust the selected threshold, based on a comparison result of the environment information and the registration environment information.

The processor 2102 may adjust the selected threshold based on a similarity between a vector corresponding to the environment information and a vector corresponding to the registration environment information.

The processor 2102 according to an embodiment, may, for example, perform an AI operation. The processor 2102 may be, for example, any one of a CPU, a GPU, a NPU, a FPGA, and an ASIC, but is not limited thereto.

Figure 22:
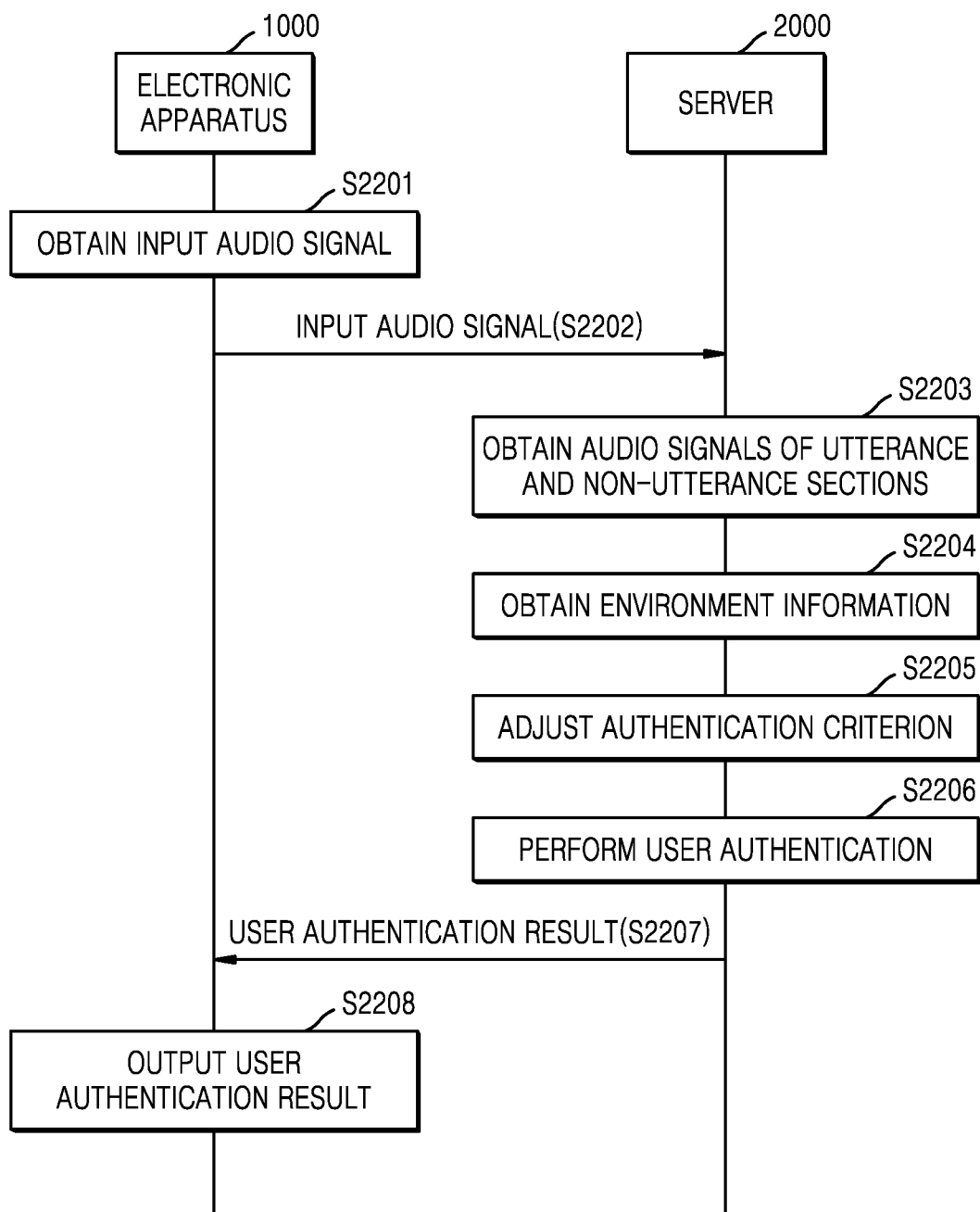
FIG. 22 is a flowchart illustrating a method performed by an electronic apparatus of performing user authentication through a server, according to an embodiment.

FIG. 22 is a flowchart illustrating a method performed by the electronic apparatus 1000 of performing user authentication through the server 2000 according to an embodiment.

Referring to FIG. 22, in operation S2201, the electronic apparatus 1000 may obtain the input audio signal 101 based on an utterance input of a user. In operation S2202, the electronic apparatus 1000 may transmit the obtained input audio signal 101 to the server 2000.

In operation S2203, the server 2000 that receives the input audio signal 101 from the electronic apparatus 1000 may obtain at least one audio signal of an utterance section and at least one audio signal of a non-utterance section from the input audio signal 101.

For example, the server 2000 may split the input audio signal 101 into units of preset frames. The server 2000 may distinguish and obtain the audio signal of the utterance section and the audio signal of the non-utterance section from the input audio signal 101 split into units of frames.

In operation S2204, the server 2000 may obtain environment information indicating a situation in which an utterance input corresponding to the input audio signal 101 is received, based on the obtained audio signal of the non-utterance section.

For example, the server 2000 may obtain an environment feature vector as environment information indicating the environment in which the utterance input corresponding to the input audio signal 101 is received, from the audio signal of the non-utterance section.

For example, the server 2000 may obtain the environment feature vector as environment information indicating an environment in which an utterance input corresponding to the registration audio signal 103 is received, from a user DB stored previously in a user registration operation.

In operation S2205, the server 2000 may adjust an authentication criterion for authenticating the user based on the generated environment information.

For example, the server 2000 may adjust any one threshold selected from a threshold table to authenticate the user, based on a similarity between an environment feature vector and a registration environment feature vector.

Meanwhile, for example, the server 2000 may adjust any one threshold selected from the threshold table to authenticate the user, based on a user characteristic parameter vector.

For example, the server 2000 may obtain a similarity between a user feature vector obtained with respect to a specific user and an average user feature vector obtained from a UBM during the user registration operation, and set the user characteristic parameter value with respect to the corresponding user based on the obtained similarity. For example, the server 2000 may store the set user characteristic parameter value in the user DB with respect to the corresponding user.

The server 2000 may adjust any one threshold selected from the threshold table, based on the user characteristic parameter vector obtained from the previously stored user DB.

Meanwhile, for example, the server 2000 may adjust any one threshold selected from the threshold table to authenticate the user, based on an apparatus characteristic parameter vector.

For example, the server 2000 may generate the user DB in the user registration operation and simultaneously store electronic apparatus ID information for identifying an electronic apparatus that obtains the registration audio signal.

For example, when the electronic apparatus ID information obtained from the electronic apparatus that obtains the input audio signal does not match the electronic apparatus ID information obtained from the electronic apparatus that obtains the registration audio signal, the server 2000 may adjust any one threshold selected from the threshold table, based on apparatus characteristic parameter values corresponding to the electronic apparatus that obtains the input audio signal and electronic apparatus that obtains the registration audio signal.

The apparatus characteristic parameter value that may be used by the server 2000 may be, for example, previously set before the user registration operation, by measuring a difference in the audio signal processing performance between electronic apparatuses.

Upon describing with reference to the configuration of the embodiment of the disclosure of FIG. 14, for example, the server 2000 may receive a first audio signal obtained by the smartphone 1000A based on a first utterance input of the user. The server 2000 may obtain a user feature vector from the first audio signal. The server 2000 may obtain a similarity between the user feature vector obtained from the first audio signal and a reference user feature vector.

For example, the server 2000 may receive a second audio signal obtained by the AI speaker 1000B based on the utterance input of the user. The server 2000 may obtain the user feature vector from the second audio signal. The server 2000 may obtain a similarity between the user feature vector obtained from the second audio signal and the reference user feature vector.

For example, the server 2000 may set the apparatus characteristic parameter value based on a deviation of a similarity between the user feature vector obtained from the first audio signal and the reference user feature vector, and a similarity between the user feature vector obtained from the second audio signal and the reference user feature vector, with respect to the same first utterance input of the user.

Meanwhile, the server 2000 may obtain, for example, a third audio signal obtained by the smartphone 1000A in an environment in which the user does not perform an utterance input. The server 2000 may obtain an environment feature vector from the third audio signal. The server 2000 may obtain a similarity between the environment feature vector obtained from the third audio signal and a reference environment feature vector.

Meanwhile, the server 2000 may receive, for example, a fourth audio signal obtained by the AI speaker 1000B in the environment in which the user does not perform an utterance input. The server 2000 may obtain an environment feature vector from the fourth audio signal. The server 2000 may obtain a similarity between the environment feature vector obtained from the fourth audio signal and the reference environment feature vector.

For example, the server 2000 may set the apparatus characteristic parameter value based on a deviation of a similarity between the environment feature vector obtained from the third audio signal and the reference environment feature vector, and a similarity between the environment feature vector obtained from the fourth audio signal and the reference environment feature vector, with respect to the same environment in which the user does not perform an utterance input.

For another example, the server 2000 may set the apparatus characteristic parameter value based on a similarity between the environment feature vector obtained from the third audio signal and the environment feature vector obtained from the fourth audio signal, with respect to the same environment in which the user does not perform an utterance input.

The apparatus characteristic parameter value that may be used by the server 2000 may be set or updated, for another example, by measuring a difference in the audio signal processing performance of the smartphone 1000A and the AI speaker 1000B after the registration operation of the user. In this case, the reference user feature vector and the reference environment feature vector used to set or update the apparatus characteristic parameter value may be the registration user feature vector and the registration environment feature vector obtained by the server 2000 in the user registration operation.

In operation S2206, the server 2000 may authenticate the user based on the adjusted authentication criterion and the audio signal.

For example, the server 2000 may perform user authentication based on the registration user feature vector obtained from the user DB and the user feature vector obtained from the audio signal of the utterance section. For example, the server 2000 may obtain a similarity between the registration user feature vector and the user feature vector, and compare the obtained similarity with an adjusted threshold to perform user authentication.

In operation S2207, the server 2000 may transmit a result of user authentication to the electronic apparatus 1000.

In operation S2208, the electronic apparatus 1000 may output the result of user authentication received from the server 2000.

For example, the electronic apparatus 1000 may transmit the result of user authentication to the user by outputting the result of user authentication as a sound or an image through at least one of the speaker 2006 or the display 2007.

Figure 23:
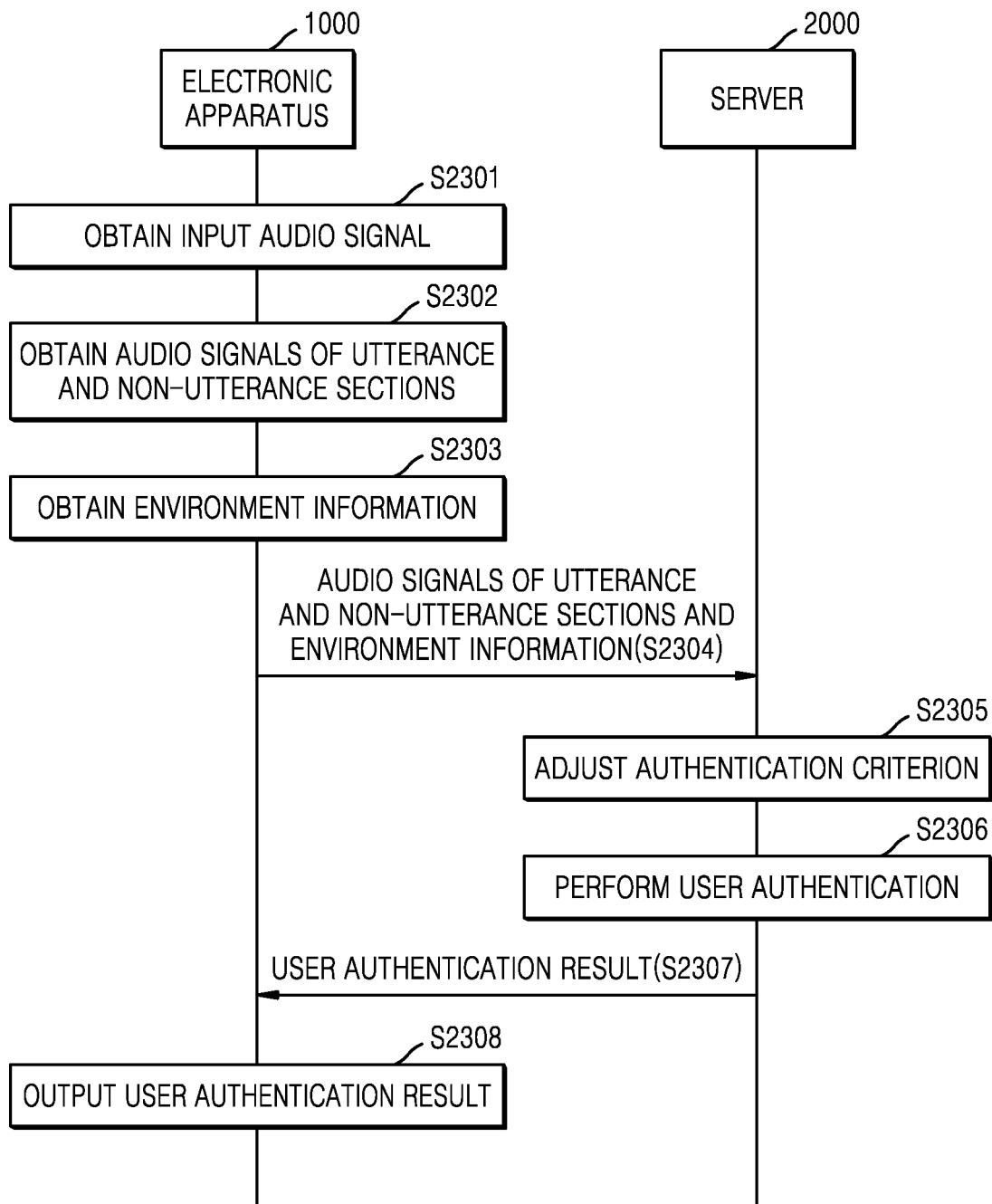
FIG. 23 is a flowchart illustrating a method performed by a server of performing user authentication through an electronic apparatus, according to an embodiment.

FIG. 23 is a flowchart illustrating a method performed by the server 2000 of performing user authentication through the electronic apparatus 1000 according to an embodiment.

Referring to FIG. 23, in operation S2301, the electronic apparatus 1000 may obtain the input audio signal 101 based on an utterance input of a user. In operation S2302, the electronic apparatus 1000 may obtain at least one audio signal of an utterance section and at least one audio signal of a non-utterance section from the input audio signal 101.

For example, the electronic apparatus 1000 may split the input audio signal 101 into units of preset frames. The server 2000 may distinguish and obtain the audio signal of the utterance section and the audio signal of the non-utterance section from the input audio signal 101 split into units of frames.

In operation S2303, the electronic apparatus 1000 may obtain environment information indicating a situation in which an utterance input corresponding to the input audio signal 101 is received, based on the obtained audio signal of the non-utterance section.

For example, the electronic apparatus 1000 may obtain an environment feature vector as environment information indicating the environment in which the utterance input corresponding to the input audio signal 101 is received, from the audio signal of the non-utterance section.

In operation S2304, the electronic apparatus 1000 may transmit the audio signal of the utterance section, the audio signal of the non-utterance section, and the environment information to the server 2000. For example, the electronic apparatus 1000 may transmit, to the server 2000, an environment feature vector obtained from the audio signal of the non-utterance section.

For example, the server 2000 may obtain the environment feature vector as environment information indicating an environment in which an utterance input corresponding to the registration audio signal 103 is received, from a user DB stored previously in a user registration operation.

In operation S2305, the server 2000 may adjust an authentication criterion for authenticating the user based on the environment information received from the electronic apparatus 1000.

For example, the server 2000 may adjust any one threshold selected from a threshold table to authenticate the user, based on a similarity between an environment feature vector obtained from the audio signal of the non-utterance section and a registration environment feature vector obtained from the user DB.

Meanwhile, for example, the server 2000 may adjust any one threshold selected from the threshold table to authenticate the user, based on a user characteristic parameter vector.

Meanwhile, for example, the server 2000 may adjust any one threshold selected from the threshold table to authenticate the user, based on an apparatus characteristic parameter vector.

A specific method performed by the server 2000 of adjusting the threshold based on the user characteristic parameter value and the apparatus characteristic parameter value may be the same as the method performed by the server 2000 of adjusting the threshold of FIG. 22 described above, and thus a detailed description thereof is omitted.

In operation S2306, the server 2000 may authenticate the user based on the adjusted authentication criterion and the audio signal.

For example, the server 2000 may perform user authentication based on the registration user feature vector obtained from the user DB and the user feature vector obtained from the audio signal of the utterance section. For example, the server 2000 may obtain a similarity between the registration user feature vector and the user feature vector, and compare the obtained similarity with an adjusted threshold to perform user authentication.

In operation S2307, the server 2000 may transmit a result of user authentication to the electronic apparatus 1000.

In operation S2308, the electronic apparatus 1000 may output the result of user authentication received from the server 2000.

For example, the electronic apparatus 1000 may transmit the result of user authentication to the user by outputting the result of user authentication as a sound or an image through at least one of the speaker 2006 or the display 2007.

Figure 24:
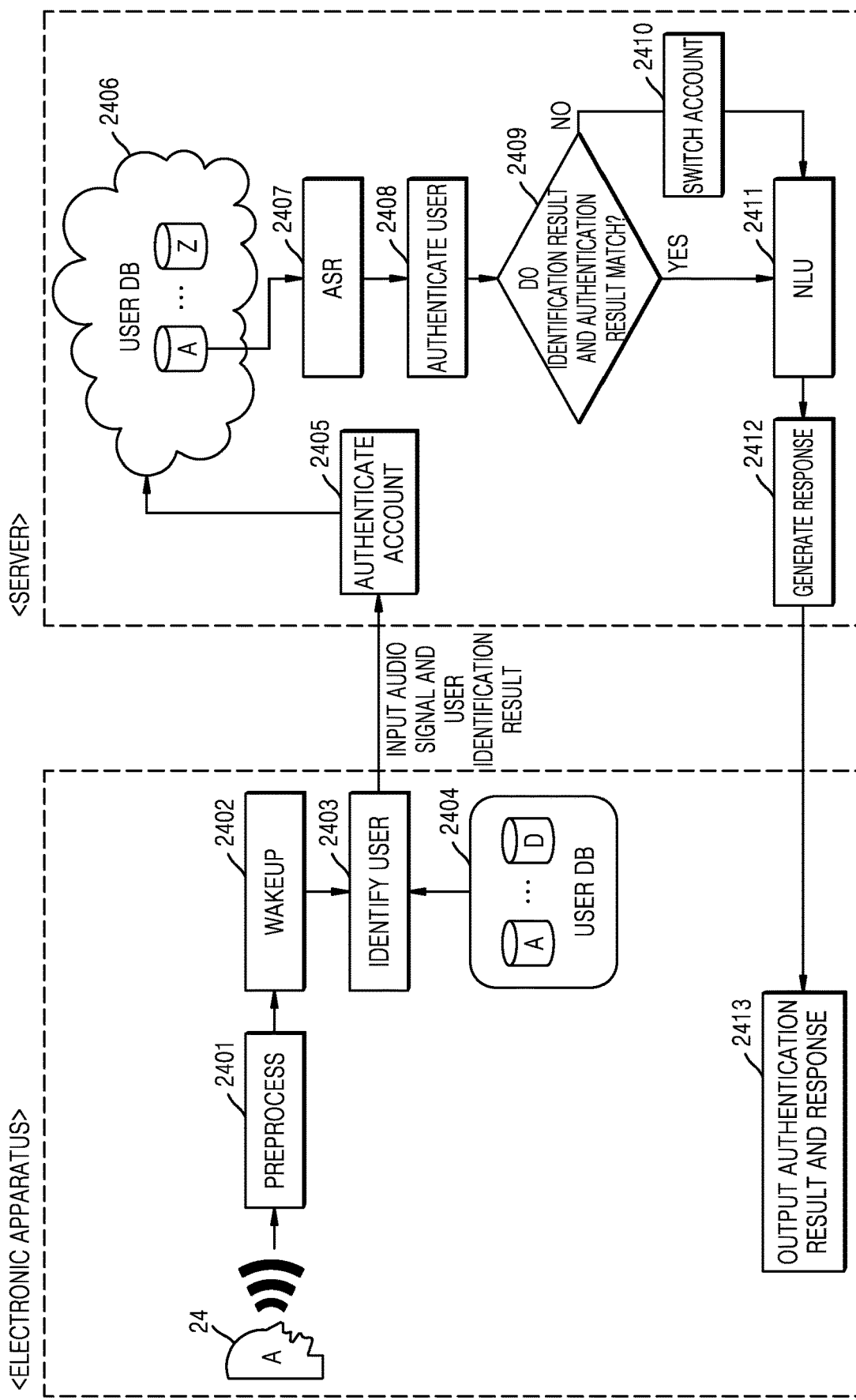
FIG. 24 is a flowchart illustrating a method performed by an electronic apparatus and a server of performing user identification and user authentication, according to an embodiment.

FIG. 24 is a flowchart illustrating a method performed by the electronic apparatus 1000 and the server 2000 of performing user identification and user authentication according to an embodiment.

Referring to FIG. 24, the electronic apparatus 1000 according to an embodiment may obtain the input audio signal 101 based on an utterance input of a user 24, and perform preprocessing on the input audio signal 101 at operation 2401. Preprocessing on the input audio signal 101 may include a process of extracting an audio feature from the input audio signal 101.

The electronic apparatus 1000 may detect a wakeup sentence from the input audio signal 101 on which preprocessing is performed, and start an authentication process on the user 24 based on the detected wakeup sentence at operation 2402. For example, the electronic apparatus 1000 may determine whether a specific keyword is included and detect the wakeup sentence from the input audio signal 101.

For example, the electronic apparatus 1000 may first detect a speech of the user 24 through a voice activity detection (VAD) method using a first wakeup module. For example, the electronic apparatus 1000 may set the first wakeup module to an always on state in which a low power driving method is used.

The electronic apparatus 1000 may continuously detect the utterance input of the user 24 using the first wakeup module, thereby determining whether the speech of the user 24 is included in the input audio signal 101 corresponding to the utterance input.

When it is determined that the speech of the user 24 is included in the input audio signal 101, for example, the electronic apparatus 1000 may determine whether a keyword is included in the input audio signal 101 using the first wakeup module.

When it is determined that the keyword is included in the input audio signal 101 as a result of determination using the first wakeup module, the electronic apparatus 1000 may activate a second wakeup module. The electronic apparatus 1000 may again determine whether the keyword is included in the input audio signal 101 using the second wakeup module.

For example, the electronic apparatus 1000 may determine whether the audio signal includes the keyword through the second wakeup module that uses a keyword detection model. An example of specific training method of the keyword detection model used by the second wakeup module will be described later with reference to FIG. 25.

When the wakeup sentence is detected from the input audio signal 101, the electronic apparatus 1000 may perform user identification on the user 24 who inputs the audio signal based on a plurality of user DBs 2404 at operation 2403.

The electronic apparatus 1000 may perform user identification using, for example, at least a part of the input audio signal 101 and the plurality of user DBs 2404.

For example, the electronic apparatus 1000 may obtain a user feature vector corresponding to the wakeup sentence as the at least a part of the input audio signal 101, and compare the obtained user feature vector with a user feature vector obtained from each of the plurality of user DBs 2404 to calculate a similarity.

For another example, the electronic apparatus 1000 may compare a user feature vector obtained from the entirety of the input audio signal 101 with the user feature vector obtained from each of the plurality of user DBs 2404 to calculate the similarity.

For example, the electronic apparatus 1000 may obtain a user feature vector from the at least a part or the entirety of the input audio signal 101 using a DNN model for obtaining the user feature vector.

For example, the electronic apparatus 1000 may confirm that a user DB including a user feature vector having the highest similarity is a user A DB, and identify that the user 24 who performs the utterance input corresponding to the input audio signal 101 is a user A.

Meanwhile, when user identification of the electronic apparatus 1000 is completed, the server 2000 may receive the input audio signal 101 and a user identification result from the electronic apparatus 1000.

For example, the server 2000 may receive the input audio signal 101 on which preprocessing is performed at operation 2401 and the user identification result from the electronic apparatus 1000. For another example, the server 2000 may receive the input audio signal 101 on which preprocessing is not performed and the user identification result from the electronic apparatus 1000.

The server 2000 may perform account authentication based on the user identification result received from the electronic apparatus 1000 at operation 2405. For example, when the electronic apparatus 1000 determines the user 24 that performs the utterance input corresponding to the input audio signal 101 as the user A, the server 2000 may perform account authentication on the user A.

A plurality of user DBs 2406 stored in the server 2000 may include the plurality of user DBs 2404 used by the electronic apparatus 1000. The server 2000 may obtain the user A DB from the plurality of user DBs 2406 stored in the server 2000 through account authentication on the user A.

The server 2000 may perform automatic speech recognition (ASR) on all sentences of the input audio signal 101 based on the input audio signal 101 received from the electronic apparatus 1000 and the user A DB obtained from the plurality of user DBs 2406 at operation 2407.

The server 2000 may distinguish and identify the wakeup sentence included in the input audio signal 101 and a sentence for executing a certain function, as a result of ASR which uses a personalized language model (PLM) with respect to each registration user.

The server 2000 may perform user authentication based on the input audio signal 101 received from the electronic apparatus 1000 and the user A DB obtained from the plurality of user DBs 2406 at operation 2408. The server 2000 may perform user authentication on the input audio signal 101 through the user authentication method of the disclosure described above with reference to FIG. 1 through FIG. 23.

For example, the server 2000 may obtain the user feature vector from the at least a part or the entirety of the input audio signal 101 using a DNN model for obtaining the user feature vector.

For example, the server 2000 may obtain the user feature vector from the at least a part or the entirety of the input audio signal 101 using the DNN model for obtaining the user feature vector. The DNN model used by the server 2000 to obtain the user feature vector may be, for example, the same as or different from the DNN model used by the electronic apparatus 1000 for obtaining the user feature vector.

The server 2000 may perform user authentication based on a similarity between the obtained user feature vector and a registration user feature vector obtained from the obtained user A DB. For example, the server 2000 may compare the similarity between the obtained user feature vector and the obtained registration user feature vector obtained from the obtained user A DB with a threshold, and determine whether the user 24 who performs the utterance input corresponding to the input audio signal 101 corresponds to the user A.

Meanwhile, the server 2000 may determine whether the user identification result and a user authentication result match according to a result of user authentication at operation 2408. For example, when the electronic apparatus 1000 determines the user 24 that performs the utterance input corresponding to the input audio signal 101 as the user A, the server 2000 may determine whether the user 24 who performs the utterance input corresponding to the input audio signal 101 actually corresponds to the user A through the user authentication result at operation 2409.

As a result of the determination at operation 2409, when the user 24 who performs the utterance input corresponding to the input audio signal 101 corresponds to the user A, the server 2000 may generate a response corresponding to a command of the user A through a natural language understanding (NLU) model 2411 at operation 2412.

For example, when the user 24 who performs the utterance input corresponding to the input audio signal 101 corresponds to the user A, and the input audio signal 101 corresponds to a sentence relating to weather information such as "Hi, Bixby, today's weather.", the server 2000 may generate a response for transmitting weather information such as "Today's weather is sunny." by executing a function of providing weather information in response to a command of the user A.

For another example, when the user 24 who performs the utterance input corresponding to the input audio signal 101 corresponds to the user A, and the input audio signal 101 corresponds to a sentence relating to personal schedule information such as "Hi, Bixby, today's schedule.", the server 2000 may generate a response for transmitting schedule information of the user A such as "Today, we have three scheduled jobs." by executing a function of providing schedule information in response to the command of the user A.

Meanwhile, as a result of the determination at operation 2409, although it is determined that the user 24 who performs the utterance input corresponding to the input audio signal 101 corresponds to the user A, when a similarity between an environment feature vector obtained from the input audio signal 101 and a registration environment feature vector obtained from the user A DB is less than a certain threshold for requesting the user 24 to again input the input audio signal 101, the server 2000 may generate a response for requesting the user 24 to again perform the utterance input.

For example, although the input audio signal 101 corresponds to a payment approval sentence such as "Hi, Bixby, accept the payment.", and it is determined that the user 24 who performs the utterance input corresponding to the input audio signal 101 corresponds to the user A, when the similarity between the environment feature vector obtained from the input audio signal 101 and the registration environment feature vector obtained from the user A DB is less than the certain threshold for requesting the user 24 to again input the input audio signal 101, the server 2000 may generate a response for notifying that it is necessary to again input an audio signal such as "Sorry, please try again in other place." by executing a payment security enhancement function.

For another example, although the input audio signal 101 corresponds to the payment approval sentence such as "Hi, Bixby, accept the payment.", and it is determined that the user 24 who performs the utterance input corresponding to the input audio signal 101 corresponds to the user A, when the similarity between the environment feature vector obtained from the input audio signal 101 and the registration environment feature vector obtained from the user A DB is less than the certain threshold for requesting the user 24 to again input the input audio signal 101, the server 2000 may generate a response for requesting removal of ambient noise such as "Sorry, please reduce the noise around you" by executing the payment security enhancement function.

Meanwhile, as a result of the determination at operation 2409, when the user 24 who performs the utterance input corresponding to the input audio signal 101 does not correspond to the user A, the server 2000 may switch a user account determined according to the authorization at operation 2405 of the account authentication from the user A to a general user at operation 2410. The server 2000 that determines that the user 24 who performs the utterance input corresponding to the input audio signal 101 corresponds to the general user may generate a response corresponding to a command of the general user through the natural language understanding model 2411 at operation 2412.

For example, when the user 24 who performs the utterance input corresponding to the input audio signal 101 does not correspond to the user A, and the input audio signal 101 corresponds to the sentence relating to the weather information such as "Hi, Bixby, today's weather.", the server 2000 may generate the response for transmitting the weather information such as "Today's weather is sunny." by executing the function of providing the weather information in response to the command of the general user, in the same manner as the case where the user 24 who performs the utterance input corresponding to the input audio signal 101 corresponds to the user A.

However, for another example, when the user 24 who performs the utterance input corresponding to the input audio signal 101 does not correspond to the user A, and the input audio signal 101 corresponds to the sentence relating to the personal schedule information such as "Hi, Bixby, today's schedule.", the server 2000 may generate a response for notifying that user authentication is required such as "Sorry, user authentication is required." by executing a personal information protection function, unlike the case where the user 24 who performs the utterance input corresponding to the input audio signal 101 corresponds to the user A.

Meanwhile, as a result of the determination at operation 2409, the user 24 who performs the utterance input corresponding to the input audio signal 101 does not correspond to the user A, the server 2000 may generate a response for requesting the user 24 to again perform the utterance input. The server 2000 may transmit the generated response to the electronic apparatus 1000.

For example, when the user 24 who performs the utterance input corresponding to the input audio signal 101 does not correspond to the user A, and the input audio signal 101 corresponds to the sentence for obtaining the personal schedule information such as "Hi, Bixby, today's schedule.", the server 2000 may generate a response for notifying that it is necessary to again input the audio signal such as "Sorry, please try again.", by executing the personal information protection function.

As described above, the user authentication method according to an embodiment, in consideration of a difference in the operation performance of the electronic apparatus 1000 and the server 2000, the electronic apparatus 1000 may perform module activation and user identification based on a wakeup phrase, and perform user authentication through the server 2000, thereby preventing degradation in operation speed and user authentication performance.

In addition, the user authentication method according to an embodiment may generate a response based on a user identification result, a user authentication result, and content of a user command, thereby protecting personal information of a user and simultaneously promptly providing information necessary for a successfully authenticated user.

The server 2000 may transmit the generated response and a result of user authentication to the electronic apparatus 1000.

The electronic apparatus 1000 may output the generated response and the result of user authentication received from the server 2000 at operation 2413. For example, the electronic apparatus 1000 may transmit the generated response and the result of user authentication to the user by outputting the generated response and the result of user authentication as a sound or an image through at least one of the speaker 2006 or the display 2007.

Figure 25:
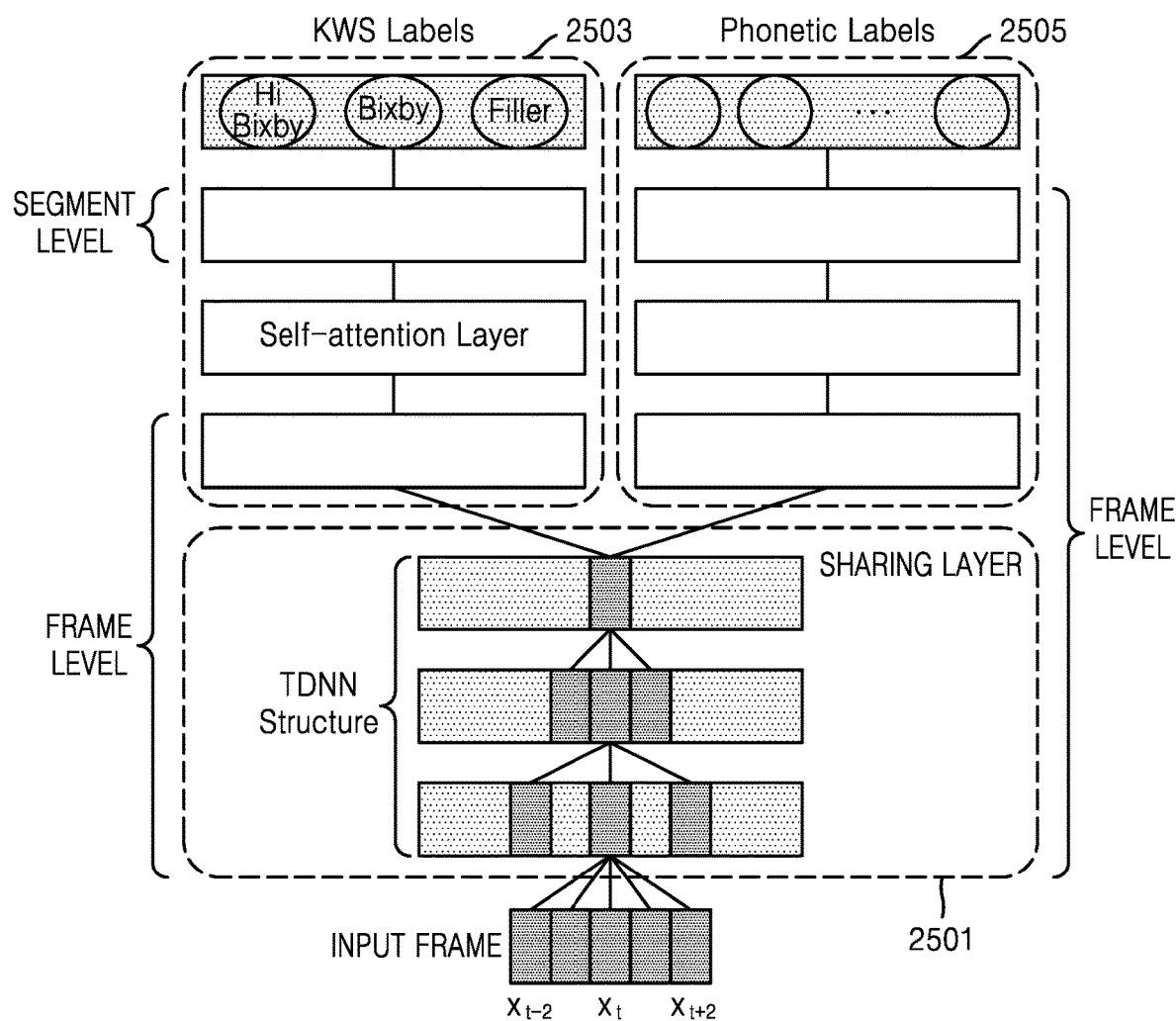
FIG. 25 is a diagram illustrating a method of training a keyword detection model, according to an embodiment.

FIG. 25 is a diagram illustrating a method of training a keyword detection model according to an embodiment.

Referring to FIG. 25, the keyword detection model used by the electronic apparatus 1000 according to an embodiment may be trained through a multi-task training method.

The keyword detection model used by the electronic apparatus 1000 may be trained through, for example, the multi-task training method using a keyword detection as a main task and an automatic speech recognition as an auxiliary task. Multi-task training may use a training method in which one or more auxiliary tasks are trained along with the main task, and may train a model corresponding to each task by using a separate layer with respect to each task in addition to a sharing layer.

Multi-task training may be training for increasing the generalization performance between tasks having a similar property, and assumes that there is an association between all tasks. Multi-task training may constitute a highly reliable training model by learning separate tasks simultaneously and partially sharing each other's information.

Referring to FIG. 25, a sharing layer 2501 used for training the keyword detection model according to an embodiment may be shared for training the keyword detection which may be a main task, and training the automatic speech recognition which may be an auxiliary task. The sharing layer 2501 may include, for example, a time delay neural network (TDNN).

The TDNN may be a multidimensional artificial neural network, which is a neural network modeling a context in each layer of a neural network. For example, the TDNN may use an audio feature vector of a previous frame and an audio feature vector of a subsequent frame, in addition to an audio feature vector of a specific frame, to use a context of successive frames of an audio signal.

Figure 26:
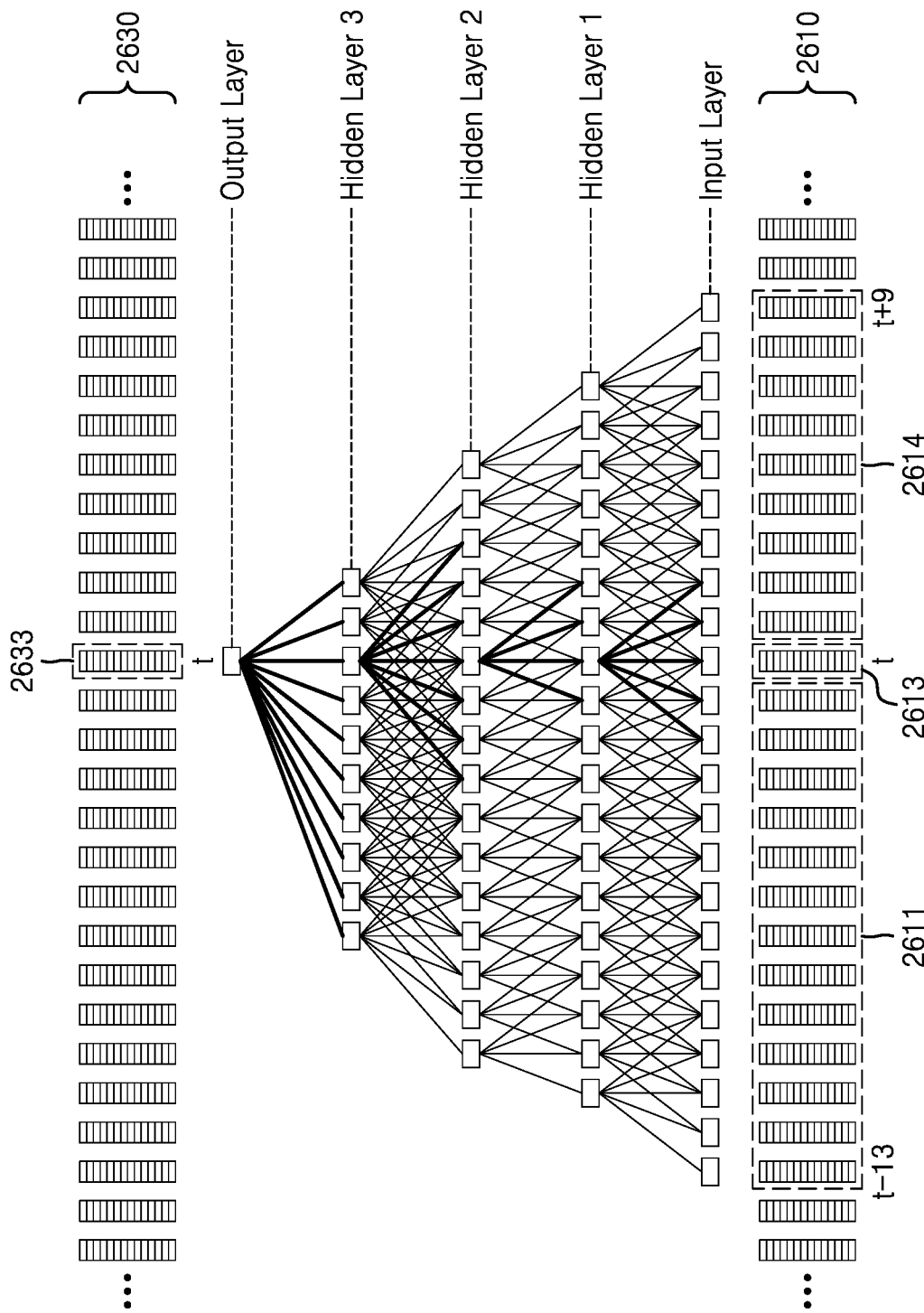
FIG. 26 is a diagram illustrating an audio feature vector processing method of a time delay neural network (TDNN), according to an embodiment.

FIG. 26 is a diagram illustrating an audio feature vector processing method of a TDNN according to an embodiment.

Referring to FIG. 26, the TDNN may receive an audio feature vector 2610 obtained from each frame of an audio signal through an input layer.

For example, the TDNN may use, in addition to an audio feature vector 2613 of a t-th frame of the audio signal, all of an audio feature vector 2611 of a t−13th frame to a t−1th frame and an audio feature vector 2614 of a t+1th frame to t+9th frame to obtain a frame unit representation that will be described later, with respect to the audio feature vector 2613 of the t-th frame.

Referring to FIG. 26 again, a path into which the audio feature vector 2613 of the t-th frame which is input to an input layer of the TDNN is input to a node of a first hidden layer, along with an audio feature vector of a t−2th frame, an audio feature vector of a t−1th frame, an audio feature vector of a t+1th frame, and an audio feature vector of a t+2th frame, is shown in a bold solid line. The path shown with respect to the audio feature vectors of the five frames indicates that the audio feature vector of the respective frames are concatenated with each other and input to a node of an upper layer.

All paths from the input layer to the first hidden layer indicate that the audio feature vector of the t−13th frame to an audio feature vector of a t+9th frame are concatenated in five frame units and input to the node of the first hidden layer, in the same manner as the audio feature vector of the t−2th frame to the audio feature vector of the t+2th frame. The concatenated audio feature vectors passing through the hidden layer may be converted by, for example, an activation function of each node of the hidden layer.

The audio feature vector of the t−13th frame to the audio feature vector of the t+9th frame may be concatenated and converted in a process of passing through the first hidden layer to a third hidden layer, and output in a frame unit representation 2633 corresponding to the t-th frame through an output layer.

The output of the frame unit representation 2633 corresponding to the audio feature vector 2613 of the t-th frame of the TDNN may be sequentially performed in the same manner on the audio feature vector of the t+1th frame. That is, the TDNN may sequentially output a frame unit representation 2630 corresponding to each frame of the audio signal.

As such, the TDNN may output a frame unit representation corresponding to an audio feature vector of a specific frame using the audio feature vector of the previous frame and the audio feature vector of the subsequent frame, in addition to the audio feature vector of the specific frame, and thus the context of the audio signal may be maintained in a training process.

Referring to FIG. 25 again, a keyword training layer 2503 for the main task and an automatic speech recognition training layer 2505 for the auxiliary task may be stacked on the sharing layer 2501 used for training the keyword detection model.

The frame unit representation output from the sharing layer 2501 may be input to the keyword training layer 2503.

Figure 27:
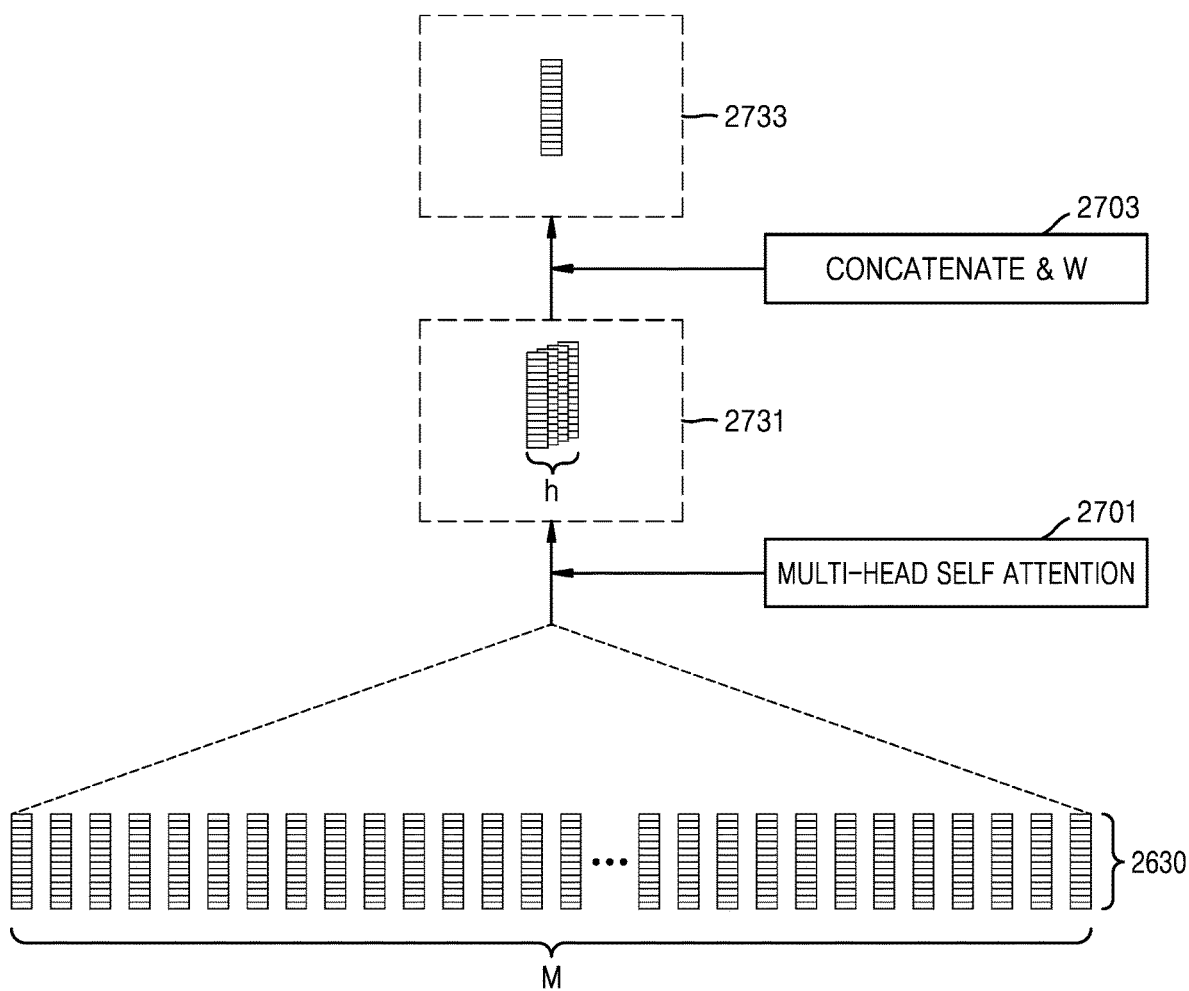
FIG. 27 is a diagram illustrating a process of processing a frame unit representation output from a sharing layer of a keyword training layer, according to an embodiment.

FIG. 27 is a diagram illustrating a process of processing a frame unit representation output from the sharing layer 2501 of the keyword training layer 2503 according to an embodiment.

In some embodiments, data for training a keyword detection which is a main task may be input to the sharing layer 2501. The keyword training layer 2503 may include, for example, a self attention layer for the keyword detection.

A specific keyword may correspond to an audio feature vector obtained from a plurality of consecutive frames of an audio signal. The data for training the keyword detection may include, for example, information about the specific keyword and a plurality of audio feature vectors corresponding to the specific keyword.

The self attention layer included in the keyword training layer 2503 may use a plurality of frame unit representations output from the sharing layer 2501, to determine whether the audio feature vector obtained from the plurality of consecutive frames corresponds to the specific keyword.

Referring to FIG. 27, the sharing layer 2501 that receives an audio feature vector with respect to M frames of the audio signal may output M frame unit representations 2630. The M frame unit representations 2630 output from the sharing layer 2501 may be input to the self attention layer included in the keyword training layer 2503.

The self attention layer, for example, may use a multi head self attention mechanism 2701 that combines and uses information present in different frame unit representations to emphasize multiple points to obtain h segment unit representations 2731 as many as the number of heads from the M frame unit representations 2630.

The self attention layer may obtain, for example, one segment unit representation 2733 by combining the h segment unit representations 2731 and applying a weight matrix 2703 for adjusting the size of an audio feature vector.

Referring to FIG. 25 again, a segment unit representation output through the self attention layer may be input to a SOFTMAX layer that outputs a probability with respect to a label corresponding to the specific keyword. The segment unit representation in the SOFTMAX layer may be converted, for example, into a probability with respect to each of keyword nodes corresponding to keywords 'Hi Bixby' and 'Bixby' and a filler node corresponding to a non-keyword.

As such, the keyword detection model according to an embodiment may be trained by adjusting weights of the sharing layer 2501 and the keyword training layer 2503 based on the data for training the keyword detection.

Meanwhile, in an embodiment, data for training automatic speech recognition which is an auxiliary task may be input to the sharing layer 2501. The data for training automatic speech recognition may include, for example, information about a specific phoneme string and an audio feature vector corresponding to the specific phoneme string. The phoneme string used for training of automatic speech recognition is an array of phonemes, for example, may be a triphone including three phonemes.

The frame unit representation output from the sharing layer 2501 may be input to an automatic speech recognition training layer 2505.

The frame unit representation output from the sharing layer 2501 may be input to a plurality of feed forward layers in which a rectified linear unit (ReLU) which is an activation function included in the automatic speech recognition training layer 2505 is activated. A feed forward layer has a feature of inputting an output of a lower hidden layer into only an upper hidden layer without inputting the output of the hidden layer into the same hidden layer again.

The frame unit representation in the feed forward layers of the automatic speech recognition training layer 2505 may be converted, for example, into a probability with respect to each output node corresponding to a label of a specific triphone.

That is, unlike a keyword, because the triphone having a shorter utterance length than the keyword may correspond to an audio feature vector obtained from a single frame, the automatic speech recognition training layer 2505 may train automatic speech recognition that obtains a probability that one frame unit representation corresponds to the specific triphone.

As such, the keyword detection model according to an embodiment may be trained by adjusting weights of the sharing layer 2501 and the automatic speech recognition training layer 2505 based on automatic speech recognition training data.

As such, the electronic apparatus 1000 according to an embodiment may increase the reliability of keyword detection for detecting a wakeup phrase, by using a keyword detection model trained using multi-task training and self attention mechanism.

Meanwhile, in an embodiment, when training of the keyword detection model is completed, the electronic apparatus 1000 may perform an operation for keyword detection using the keyword detection model from which the automatic speech recognition training layer 2505 is removed.

After the electronic apparatus 1000 is trained through the multi-task training method, the electronic apparatus 1000 may use the keyword detection model from which the automatic speech recognition training layer 2505 for training the auxiliary task is removed, thereby increasing the reliability of keyword detection and simultaneously reducing an amount of operation.

Referring to descriptions of FIG. 20 through FIG. 25, the user authentication method according to an embodiment may not be performed solely by any one of the electronic apparatus 1000 and the server 2000, and one of ordinary skill in the art will easily understand that each operation of the user authentication method may be performed by at least one of the electronic apparatus 1000 or the server 2000.

An embodiment may be embodied in the form of a recording medium including instructions executable by a computer, such as a program module, being executed by a computer. The non-transitory computer readable medium may be any recording medium that can be accessed by a computer, and may include volatile and nonvolatile media, removable and non-removable media. The non-transitory computer readable medium may also include computer storage media. Examples of the computer storage medium include all volatile and non-volatile media and separable and non-separable media, which are implemented by an arbitrary method or technology, for storing information such as computer-readable instructions, data structures, program modules, or other data.

Also, in this specification, the term "unit" may be a hardware component such as a processor or a circuit, and/or a software component executed by a hardware component such as a processor.

Descriptions of an embodiment of the disclosure are examples, and it may be understood by one of ordinary skill in the art that various changes in form and details may be made therein without departing from the spirit and scope of the disclosure as defined by the appended claims. Thus, an embodiment of the disclosure is merely examples in every aspect and should not be construed as being limited to the embodiment set forth herein. For example, components that are described as a single piece may be separated, and components that are described as being separated may be integrated.

According to the disclosure, an authentication criterion used for user authentication is adjusted by comparing an environment upon user registration and an environment upon user authentication with each other, thereby providing a user authentication method and apparatus capable of preventing a degradation of user authentication performance.

While the disclosure has been particularly shown and described with reference to embodiments thereof, it will be understood by those of ordinary skill in the art that various changes in form and details may be made therein without departing from the spirit and scope of the disclosure as defined by the following claims.

What is claimed is:
1. A user authentication method, performed by an electronic apparatus, of authenticating a user based on an utterance input, the user authentication method comprising:
obtaining an input audio signal based on the utterance input of the user;
obtaining, from the input audio signal, at least one audio signal of an utterance section and at least one audio signal of a non-utterance section;
calculating a first average energy value of the at least one audio signal of the utterance section, wherein the first average energy value is related to a distance between the user and the electronic apparatus;
calculating a second average energy value of the at least one audio signal of a registration utterance input;
adjusting a threshold for user authentication based on a result of a comparison between the first average energy value and the second average energy value; and
authenticating the user based on the adjusted threshold and the input audio signal.

2. The user authentication method of claim 1, wherein the obtaining of the at least one audio signal of the utterance section and the at least one audio signal of the non-utterance section comprises:
splitting the input audio signal into a plurality of frames;
extracting an audio feature of the plurality of frames; and
based on the extracted audio feature, distinguishing frames corresponding to the utterance section from frames corresponding to the non-utterance section among the plurality of frames.

3. The user authentication method of claim 1, wherein the registration utterance input is generated based on speech of the user included in a previously registered registration audio signal.

4. The user authentication method of claim 1, wherein the adjusting of the threshold for user authentication further comprises calculating an energy ratio between the first average energy value and the second average energy value, and
wherein the threshold is adjusted based on the energy ratio.

5. The user authentication method of claim 1, wherein the authenticating of the user comprises:
obtaining a previously registered registration audio signal;
obtaining an audio signal of a registration utterance section from the registration audio signal; and
authenticating the user by comparing the at least one audio signal of the utterance section and the audio signal of the registration utterance section.

6. The user authentication method of claim 5, wherein the registration audio signal comprises the at least one audio signal of the registration utterance section and at least one audio signal of a registration non-utterance section.

7. The user authentication method of claim 6, further comprises adjusting the threshold corresponding to a similarity between the at least one audio signal of the utterance section and the at least one audio signal of the registration utterance section.

8. The user authentication method of claim 6, wherein the adjusting of the threshold comprises:
selecting the threshold from a preset threshold table based on a length of the utterance section and a length of the registration utterance section; and
adjusting the threshold based on the result of the comparison between the first average energy value and the second average energy value.

9. The user authentication method of claim 8, wherein the threshold is adjusted based on at least one of a parameter value previously set based on a timbre of a voice of the user or a parameter value previously set based on a characteristic of the electronic apparatus.

10. An electronic apparatus comprising:
a microphone;
a memory; and
at least one processor,
wherein the at least one processor is configured to:
obtain an input audio signal based on an utterance input of a user received through the microphone,
distinguish, from the input audio signal, at least one audio signal of an utterance section and at least one audio signal of a non-utterance section,
calculate a first average energy value of the at least one audio signal of the utterance section, wherein the first average energy value is related to a distance between the user and the electronic apparatus,
calculate a second average energy value of the at least one audio signal of a registration utterance input;
adjust a threshold for user authentication based on a result of a comparison between the first average energy value and the second average energy value; and
authenticate the user based on the adjusted threshold and the input audio signal.

11. The electronic apparatus of claim 10, wherein the at least one processor is further configured to:
split the input audio signal into a plurality of frames,
extract an audio feature of the plurality of frames, and
based on the extracted audio feature, distinguish frames corresponding to the utterance section from frames corresponding to the non-utterance section among the plurality of frames.

12. The electronic apparatus of claim 10, wherein the registration utterance input is generated based on speech of the user included in a previously registered registration audio signal.

13. The electronic apparatus of claim 10, wherein the adjusting of the threshold for user authentication further comprises calculating an energy ratio between the first average energy value and the second average energy value, and
wherein the threshold is adjusted based on the energy ratio.

14. The electronic apparatus of claim 13, wherein the registration audio signal comprises at least one audio signal of a registration utterance section and at least one audio signal of a registration non-utterance section.

15. The electronic apparatus of claim 14, wherein the at least one processor is further configured to adjust the threshold corresponding to a similarity between the at least one audio signal of the utterance section and the at least one audio signal of the registration utterance section.

16. The electronic apparatus of claim 15, wherein the at least one processor is further configured to:
select the threshold from a preset threshold table based on a length of the utterance section and a length of the registration utterance section, and
adjust the threshold based on the result of the comparison between the first average energy value and the second average energy value.

17. The electronic apparatus of claim 10, wherein the at least one processor is further configured to:
obtain a previously registered registration audio signal;
obtain an audio signal of a registration utterance section from the registration audio signal; and
authenticate the user by comparing the at least one audio signal of the utterance section and the audio signal of the registration utterance section.

18. The electronic apparatus of claim 10, wherein the threshold is adjusted based on at least one of a parameter value previously set based on a timbre of a voice of the user or a parameter value previously set based on a characteristic of the electronic apparatus.

19. A non-transitory computer-readable recording medium having recorded thereon a program for executing a user authentication method, the user authentication method comprising:
obtaining an input audio signal based on an utterance input of a user;
obtaining, from the input audio signal, at least one audio signal of an utterance section and at least one audio signal of a non-utterance section;
calculating a first average energy value of the at least one audio signal of the utterance section, wherein the first average energy value is related to a distance between the user and the electronic apparatus;

calculating a second average energy value of the at least one audio signal of a registration utterance input;

adjusting a threshold for user authentication based on a result of a comparison between the first average energy value and the second average energy value; and authenticating the user based on the adjusted threshold and the input audio signal.

* * * * *